United States Patent
Itoh et al.

(10) Patent No.: US 7,636,110 B2
(45) Date of Patent: Dec. 22, 2009

(54) TERMINAL, CAMERA UNIT, AND TERMINAL CAMERA UNIT SYSTEM

(75) Inventors: Hiroki Itoh, Tokyo (JP); Toshiyuki Inui, Tokyo (JP); Akihiro Arisaka, Tokyo (JP)

(73) Assignee: Kyocera Corporation, Kyoto (JP)

( * ) Notice: Subject to any disclaimer, the term of this patent is extended or adjusted under 35 U.S.C. 154(b) by 756 days.

(21) Appl. No.: 11/116,527

(22) Filed: Apr. 27, 2005

(65) Prior Publication Data

US 2005/0243191 A1    Nov. 3, 2005

(30) Foreign Application Priority Data

| Apr. 28, 2004 | (JP) | ............. P.2004-132879 |
| Aug. 27, 2004 | (JP) | ............. P.2004-248189 |
| Aug. 30, 2004 | (JP) | ............. P.2004-251110 |

(51) Int. Cl.
H04N 5/76 (2006.01)
H04M 1/00 (2006.01)
H04N 5/232 (2006.01)

(52) U.S. Cl. ............... 348/231.99; 455/556.1; 348/211.9

(58) Field of Classification Search ............ 348/231.99, 348/221.99, 372–376; 455/557, 66.1, 566.1, 455/572, 556.1, 556.2
See application file for complete search history.

(56) References Cited

U.S. PATENT DOCUMENTS

| 6,237,001 | B1 * | 5/2001 | Bamford et al. ............. 707/100 |
| 6,359,837 | B1 | 3/2002 | Tsukamoto |
| 6,952,223 | B2 * | 10/2005 | Terashita ............ 348/222.1 |
| 7,382,395 | B1 * | 6/2008 | Saburi et al. ............ 348/14.01 |
| 2002/0013161 | A1 | 1/2002 | Schaeffer et al. |
| 2002/0077069 | A1 * | 6/2002 | Heurtaux ............ 455/90 |
| 2002/0137542 | A1 * | 9/2002 | Masutani et al. ............ 455/556 |
| 2002/0178116 | A1 * | 11/2002 | Yamasaki ............ 705/39 |
| 2002/0191088 | A1 | 12/2002 | Misawa |
| 2003/0197790 | A1 | 10/2003 | Bae |
| 2004/0058714 | A1 | 3/2004 | Sawamura |
| 2006/0250356 | A1 | 11/2006 | Sawamura |

FOREIGN PATENT DOCUMENTS

| EP | 1376993 A2 | 1/2004 |
| JP | 06-205274 | 7/1994 |
| JP | 09-033793 | 2/1997 |
| JP | 11-136653 | 5/1999 |
| JP | 11-252197 | 9/1999 |
| JP | 11-266487 | 9/1999 |
| JP | 2002-335434 | 11/2002 |
| JP | 2003-032344 | 1/2003 |
| JP | 2003-309634 | 10/2003 |

OTHER PUBLICATIONS

European Search Report for corresponding European application No. 05009375.6-1228 lists the references above.

* cited by examiner

Primary Examiner—Jason Chan
Assistant Examiner—Tuan H Le
(74) Attorney, Agent, or Firm—Hogan & Hartson LLP

(57) ABSTRACT

A portable terminal selectively includes either a camera unit which has an image pickup section and is formed with an engagement part or a cover unit formed with the same engagement part as the camera unit. An attachment part for engaging with the engagement part is provided in a main body of the portable terminal.

8 Claims, 35 Drawing Sheets

FIG. 5

CAMERA INFORMATION TABLE

| CAMERA INFORMATION | NO CAMERA | LOW RESOLUTION | STANDARD RESOLUTION | HIGH RESOLUTION |
|---|---|---|---|---|
| FIRST BIT | H | H | L | L |
| SECOND BIT | H | L | H | L |

TERMINAL, CAMERA UNIT, AND TERMINAL CAMERA UNIT SYSTEM

CROSS-REFERENCE TO RELATED APPLICATIONS

This application is based upon and claims the benefit of priority from the prior Japanese Patent Applications No. P2004-132879 filed on Apr. 28, 2004, No. P2004-248189 filed on Aug. 27, 2004, and No. P2004-251110 filed on Aug. 30, 2004, the entire contents of which are incorporated herein by reference.

BACKGROUND OF THE INVENTION

1. Field of the Invention

This invention relates to a terminal, such as a mobile telephone, selectively including any one of camera units, etc., to which and from which the camera unit can be attached and detached, and a camera unit that can be attached to and can be detached from the terminal. The invention also relates to a terminal camera unit system having the terminal and the camera unit.

2. Description of the Related Art

<First Related Art>

Hitherto, for example, a mobile telephone or a PDA (Personal Digital Assistant) including an image pickup function has been available as a portable terminal including an image pickup function. As a first related art according to such a portable terminal, an image pickup section using an image pickup device such as a CCD (Charge Coupled Device) is fixed to a housing of a portable terminal.

<Second Related Art>

On the other hand, portability of the portable terminal having the image pickup section fixed to the housing as in the first related art is impaired because the housing is upsized as the image pickup section is provided. Thus, as a second related art, an image pickup section is made detachable and when the image pickup function is not used, the image pickup section is removed, so that portability is not impaired. (For example, refer to JP-A-11-136653.)

<Third Related Art>

With the portable terminal having the image pickup section fixed to the housing as in the first related art, if the user takes his or her photograph, the user takes a photograph as he or she stretches his or her arm holding the portable terminal with the image pickup function while directing the image pickup direction toward him or her.

Thus, to solve a problem of being incapable of making the photographing distance in taking his or her own photograph longer than his or her arm, as a third related art, an image pickup section is made detachable from the main body of a housing and is made controllable by radio communications from the main body so that the user can also take a photograph from a distant position. (For example, refer to JP-A-2002-335434.)

<Fourth Related Art>

With the portable terminal having the image pickup section fixed to the housing as in the first related art, if the portable terminal includes a communication function like a mobile telephone with an image pickup function, the image pickup section, a display section, and the like are fixed integrally to the housing. Thus, unlike a picture phone, it is impossible to take a photograph of the user's face and make conversation while seeing an image of the associated party. Thus, as a fourth related art, the image pickup section and the display section are made detachable from the main body of a housing so that the portable terminal can be used as a picture phone. (For example, refer to JP-A-2003-32344.)

<Fifth Related Art>

Some portable terminals having an image pickup section fixed to a housing as in the first related art are provided with a flash section such as a strobe flash together with the image pickup section. However, some users may consider that such flash section is unnecessary and that the image pickup section is also unnecessary.

In such a case, when the portable terminal having the flash section and the image pickup section includes any other function required for the user than the image pickup function, if the flash section and the image pickup section are not required, the user must purchase the portable terminal having the section because there is no room for selection. Then, as a fifth related art, attention is focused on the fact that a battery cover is detachable from the main body of a portable terminal, and the flash section, the image pickup section, etc., is selectively provided on the battery cover and the battery cover can be replaced with another one, extending the range of user's choices.

<Sixth Related Art>

Unlike the portable terminals as in the first and second related arts, a video camera has a lens unit made detachable as the camera unit is detachable from the portable terminal in the second related art, and enables the user to replace the detachable lens unit with a different type of lens unit as a sixth related art. (For example, refer to JP-A-9-33793.)

Each of the video camera and the lens unit according to the sixth related art includes a microcomputer and when the lens unit is attached to the video camera, the microcomputer of the lens unit and the microcomputer of the video camera are connected as circuitry.

The microcomputer of the lens unit retains peculiar information concerning the lens unit in an internal storage section and transmits the peculiar information to the video camera connected as circuitry. Thus, the video camera can acquire the peculiar information concerning any lens unit attachable to the video camera and can perform given processing operation corresponding to the lens unit.

<Seventh Related Art>

Hitherto, an intelligent remote monitor system including a plurality of predetermined cameras installed for monitoring the sites and spots of factories, buildings, etc., at remote locations, a camera unit for receiving video signals directly from the plurality of predetermined cameras, and a monitoring personal computer and a monitor support apparatus connected to the camera unit through the Internet has been available. (For example, refer to JP-A-11-266487.)

In the intelligent remote monitor system, the camera unit causes the predetermined cameras to perform given operation based on an operation signal received from the monitoring personal computer and performs predetermined processing for any of videos photographed by the cameras and then transmits a signal of the video to the monitoring personal computer and the monitor support apparatus.

Therefore, in the intelligent remote monitor system, the monitoring personal computer is installed in a guardroom or overnight accommodations separate from a control room, whereby the sites and spots of the factories, buildings, etc., at remote locations can be monitored from the guardroom or overnight accommodations. The monitor support apparatus saves the received videos in sequence and detects whether or not situation change occurs based on the most recent video and its immediately preceding video.

Hitherto, a crime prevention camera apparatus including a camera unit having an image pickup camera, memory, a communication modem, etc., and an anomaly detection section of a vibration detector, a door opening/closing sensor, etc., has been available. This crime prevention camera apparatus is installed so that the image pickup camera of the camera unit photographs the surroundings of the object to be monitored, such as a vending machine, and the anomaly detection section detects an anomaly of the object to be monitored, and transmits image pickup data before and after detection of the anomaly or the like to a predetermined terminal.

Hitherto, an attachment that can be attached to and detached from a predetermined mobile telephone and includes a specific site storage section storing the address of a specific site on a communication network, a specific site connection button, and a login program storage section storing a predetermined program for accessing the specific site has been available. If the user presses the specific site connection button with the attachment attached to a predetermined mobile telephone, the attachment enables the user to easily connect to the specific site.

Hitherto, an image management method and system have been available wherein a content identifier such as an image icon, for example, is previously associated with an image stored in a service provider on a communication network and access to the image stored in the service provider, executed using the content identifier is monitored, etc.

JP-A-11-136653, JP-A-2002-335434, JP-A-2003-32344, JP-A-9-33793 and JP-A-11-266487 are referred to as related art.

However, with the portable terminal having the image pickup section fixed to the housing as in the first related art, if the user wants to change only the image pickup section to that improved in performance or, for example, if the user wants to change the image pickup section to any selected from among those having image pickup devices with low resolution, standard resolution, and high resolution or having image pickup lenses of a wide-range lens and a super-telephoto lens, the user cannot replace the image pickup section only and must purchase a new portable terminal.

In the first related art, if the user using any other portable terminal including no image pickup section wants to use an image pickup section, the user must purchase a new portable terminal including the image pickup section.

In summary, in the portable terminal having the image pickup section fixed to the housing as in the first related art, the camera unit of the image pickup section is not attachable/detachable and the user cannot select or replace his or her desired one from among camera units different in the number of image pickup pixels.

For the portable terminal to and from which the camera unit is attached and detached as in the second related art, processing operation software for controlling the camera unit needs to be previously stored in the camera unit. If an attempt is made to make it possible to attach the camera unit to different types of portable terminals, different types of the software also need to be previously stored in response to the types of portable terminals.

In the portable terminals according to the second to fourth related arts, the image pickup section can be attached to and detached from the main body of the housing, but the image pickup section can be attached to and detached from the main body only in the individual relationship; if another image pickup section having different performance, etc., is attached to a specific main body, harmonization between the main body and the image pickup section is not guaranteed.

With the portable terminal according to the fifth related art, if the battery cover is provided with not only the image pickup section, but also any other device than the image pickup section, such as the flash section, even if the user wants to replace the image pickup section only, the user must replace the whole battery cover together with any other device such as the flash section and therefore the portable terminal according to the fifth related art involves a similar problem to that involved in the portable terminal according to the first related art with the image pickup section fixed to the housing.

In the portable terminal according to the fifth related art, if a battery cover having the image pickup section having different performance, etc., is attached to a specific main body, harmonization between the main body and the image pickup section is not guaranteed as in the second to fourth related arts.

SUMMARY OF THE INVENTION

The invention provides a terminal selectively having a camera unit having an image pickup section and an engagement part, or a cover unit having an engagement part same as the engagement part of the camera unit, wherein an attachment part for engaging with the engagement part is provided in a main body of the terminal.

In the terminal, the camera unit is one of camera units having the same engagement part and having the same or different image pickup section.

In the terminal, the camera unit includes a storage section for storing camera information concerning the image pickup section; and a camera control section for controlling the image pickup section upon reception of an instruction about photograph from the main body and outputting image data obtained by the image pickup section to the main body, and the main body includes: a camera information acquisition section for acquiring camera information of a camera unit attached to the terminal; a main body control section for outputting an instruction about photograph corresponding to the camera information to the attached camera unit when an operation for picking up an image is performed; an image data acquisition section for acquiring image data picked up by the camera unit; a display section for displaying the image data acquired by the image data acquisition section; and a power supply section for supplying power to the attached camera unit.

In the terminal, the main body includes a first housing and a second housing which are foldably joined to each other, the attachment part is provided in the first housing, when the attachment part and the camera unit engage with each other, a part of the camera unit projects from a surface of the first housing opposed to the second housing and an image pickup lens is exposed, and the second housing has a recess part in a predetermined shape at a position corresponding to the attachment part on the surface opposed to the first housing.

The invention also provides a camera unit that enables to be attached to and detached from a main body of a terminal, having: an image pickup section having an image pickup lens and an image pickup device; a storage section for storing camera information concerning the image pickup section; and a camera control section for controlling the image pickup section upon reception of an instruction about photograph corresponding to the camera information from the main body and outputting image data obtained by the image pickup section to the main body.

According to the terminal and the camera unit, the user can replace only an image pickup section with another image pickup section different in performance, etc. The user can newly add only an image pickup section to the terminal if an image pickup section is not provided to the terminal.

The invention also provides a terminal camera unit system having a camera unit and a terminal to which the camera unit enables to be attached, wherein the camera unit includes: an image pickup section; and a camera storage section for storing address information specifying a predetermined communication destination, the terminal includes: a communication section; an information acquisition section for acquiring the address information from the camera storage section; and a terminal storage section for storing the address information, and if the address information stored in the terminal storage section is different from the address information acquired by the information acquisition section, the communication section of the terminal performs a communication processing with the communication destination indicated by the address information acquired by the information acquisition section.

In the terminal camera unit system, the terminal may further include detection section for detecting attachment of the camera unit, and if the detection section detects attachment of the camera unit, the terminal may determine whether or not the address information stored in the terminal storage section is different from the address information acquired by the information acquisition section.

The invention also provides a terminal camera unit system having a camera unit and a terminal to which the camera unit enables to be attached, wherein the camera unit includes: an image pickup section; and a camera storage section for storing identification information identifying the camera unit, the terminal includes: a communication section; an information acquisition section for acquiring the identification information from the camera storage section; and a terminal storage section for storing the identification information, and if the identification information stored in the terminal storage section is different from the identification information acquired by the information acquisition section, the communication section of the terminal performs a communication processing with a predetermined communication destination.

In the terminal camera unit system, the terminal may further include detection section for detecting attachment of the camera unit, and if the detection section detects attachment of the camera unit, the terminal may determine whether or not the identification information stored in the terminal storage section is different from the identification information acquired by the information acquisition section.

In the terminal camera unit system, the terminal may acquire address information stored in the camera unit and may perform a communication processing with the communication destination indicated by the address information.

In the terminal camera unit system, the terminal may further include control section for controlling the camera unit, the terminal may acquire a program or data for controlling the camera unit by performing the communication processing, and the control section may control the camera unit based on the acquired program or data.

In the terminal camera unit system, the terminal further includes a telephone function provided in the communication section, and if the terminal determines that the address information stored in the terminal storage section is different from the address information acquired by the information acquisition section while the communication section executes the telephone function, the communication section performs the communication processing with the communication destination after the execution of the telephone function terminates.

The invention also provides a terminal camera unit system having a camera unit having an image pickup section, and a terminal in which the camera unit enables to be attached to and detached from the terminal and enables to be replaced, wherein the camera unit includes: a camera storage section for storing address information specifying a predetermined communication destination; and a camera control section for controlling the image pickup section and reading the address information from the camera storage section to output the address information, and the terminal includes: a terminal storage section having an address information temporary storing area for temporarily storing the address information, and an address information continuous storing area for previously continuously storing address information; an information acquisition section for acquiring the address information output from the camera control section, and storing the address information in the address information temporary storing area; a comparison section for comparing between the address information stored in the address information temporary storing area and the address information stored in the address information continuous storing area to determine whether or not those address information are different each other, and outputting the comparison result; a communication section that enables to connect to a network; and a terminal control section, upon reception of the comparison result indicating that the address information stored in the address information temporary storing area is different from the address information stored in the address information continuous storing area output from the comparison section, for controlling the communication section so as to perform a predetermined communication processing with a communication destination indicated by the address information stored in the address information temporary storing area, and controlling so as to store the address information stored in the address information temporary storing area into the address information continuous storing area.

The invention also provides a terminal camera unit system having a camera unit having an image pickup section, and a terminal in which the camera unit enables to be attached to and detached from the terminal and enables to be replaced, wherein the camera unit includes: a camera storage section for storing address information specifying a predetermined communication destination and identification information for identifying the camera unit; and a camera control section for controlling the image pickup section and reading the address information and the identification information from the camera storage section to output the address information and the identification information, and the terminal includes: a terminal storage section having an address information temporary storing area for temporarily storing the address information, an identification information temporary storing area for temporarily storing the identification information, and an identification information continuous storing area for continuously storing identification information; an information acquisition section for acquiring the address information and the identification information output from the camera control section, and storing the address information in the address information temporary storing area and the identification information in the identification information temporary storing area; a comparison section for comparing between the identification information stored in the identification information temporary storing area and the identification information stored in the identification information continuous storing area to determine whether or not those identification information are different each other, and outputting the comparison result; a communication section that enables to connect to a network; and a terminal control section, upon reception of the comparison result indicating that the identification information stored in the identification information temporary storing area is different from the identification information stored in the identification information continuous storing area output from the comparison section, for controlling the communication section so as to perform a predetermined communication processing with a communication destination indicated by the address information stored in the address information temporary storing area, and controlling so as to store the identification information stored in the identification information temporary storing area into the identification information continuous storing area.

The invention also provides a terminal camera unit system having a camera unit having an image pickup section, and a terminal in which the camera unit enables to be attached to and detached from the terminal and enables to be replaced, wherein the camera unit includes: a camera storage section for storing identification information for identifying the camera unit; and a camera control section for controlling the image pickup section and reading the identification information from the camera storage section to output the identification information, and the terminal includes: a terminal storage section having an identification information temporary storing area for temporarily storing the identification information, an identification information continuous storing area for continuously storing identification information, and an address information continuous storing area previously storing address information specifying a predetermined communication destination; an information acquisition section for acquiring the identification information output from the camera control section, and storing the identification information in the identification information temporary storing area; a comparison section for comparing between the identification information stored in the identification information temporary storing area and the identification information stored in the identification information continuous storing area to determine whether or not those identification information are different each other, and outputting the comparison result; a communication section that enables to connect to a network; and a terminal control section, upon reception of the comparison result indicating that the identification information stored in the identification information temporary storing area is different from the identification information stored in the identification information continuous storing area output from the comparison section, for controlling the communication section so as to perform a predetermined communication processing with a communication destination indicated by the address information, and controlling so as to store the identification information in the identification information temporary storing area into the identification information continuous storing area.

The invention also provides a camera unit which has an image pickup section, and enables to be attached to and detached from a predetermined terminal and enables to be replaced, having: a camera storage section for storing address information specifying a predetermined communication destination and/or identification information for identifying the camera unit; and a camera control section for controlling the image pickup section and reading the address information and/or the identification information from the camera storage section to output the address information and/or the identification information.

The invention also provides a terminal used for a terminal camera unit system having a camera unit and a terminal to which the camera unit enables to be attached, having: a communication section; an information acquisition section for acquiring address information stored in the camera unit; and a terminal storage section for storing the address information,: wherein if the address information stored in the terminal storage section is different from the address information acquired by the information acquisition section, the communication section of the terminal performs a communication processing with the communication destination indicated by the address information acquired by the information acquisition section.

The terminal may further include a detection section for detecting attachment of the camera unit, wherein if the detection section detects attachment of the camera unit, the terminal may determine whether or not the address information stored in the terminal storage section is different from the address information acquired by the information acquisition section.

The invention also provides a terminal used for a terminal camera unit system having a camera unit and a terminal to which the camera unit enables to be attached, having: a communication section; an information acquisition section for acquiring identification information stored in the camera unit; and a terminal storage section for storing the identification information, wherein if the identification information stored in the terminal storage section is different from the identification information acquired by the information acquisition section, the communication section of the terminal performs a communication processing with a predetermined communication destination.

The terminal may further include a detection section for detecting attachment of the camera unit, wherein if the detection section detects attachment of the camera unit, the terminal may determine whether or not the identification information stored in the terminal storage section is different from the identification information acquired by the information acquisition section.

In the terminal, the terminal acquires address information stored in the camera unit, and may performs the communication processing with a communication destination indicated by the address information.

The terminal may further include a control section for controlling the camera unit, wherein the terminal may acquire a program or data for controlling the camera unit by performing the communication processing, and the control section may control the camera unit based on the acquired program or data.

The terminal may further include a telephone function provided in the communication section, wherein if the terminal determines that the address information stored in the terminal storage section is different from the address information acquired by the information acquisition section while the communication section executes the telephone function, the communication section performs the communication processing with the communication destination after the execution of the telephone function terminates.

The invention also provides a terminal, in which a camera unit storing address information specifying a predetermined communication destination and having an image pickup section enables to be attached to and detached from the terminal and enables to be replaced, having: a storage section having an address information temporary storing area for temporarily storing the address information, and an address information continuous storing area for continuously storing address information; an information acquisition section for acquiring the address information stored in the camera unit, and storing the address information in the address information temporary storing area; a comparison section for comparing between the address information stored in the address information temporary storing area and the address information stored in the address information continuous storing area to determine whether or not those address information are different each other, and outputting the comparison result; a communication section that enables to connect to a network; and a control section, upon reception of the comparison result indicating that the address information stored in the address information temporary storing area is different from the address information stored in the address information continuous storing area output from the comparison section, for controlling the communication section so as to perform a predetermined communication processing with a communication destination indicated by the address information stored in the address information temporary storing area, and controlling so as to store the address information stored in the address information temporary storing area into the address information continuous storing area.

The invention also provides a terminal, in which a camera unit storing address information specifying a predetermined communication destination and identification information for identifying the camera unit and having an image pickup section enables to be attached to and detached from the terminal and enables to be replaced, having: a storage section having an address information temporary storing area for temporarily storing the address information, an identification information temporary storing area for temporarily storing the identification information, and an identification information continuous storing area for continuously storing identification information; an information acquisition section for acquiring the address information and the identification information stored in the camera unit, and storing the address information in the address information temporary storing area and the identification information in the identification information temporary storing area; a comparison section for comparing between the identification information stored in the identification information temporary storing area and the identification information stored in the identification information continuous storing area to determine whether or not those identification information are different each other, and outputting the comparison result; a communication section that enables to connect to a network; and a control section, upon reception of the comparison result indicating that the identification information stored in the identification information temporary storing area is different from the identification information stored in the identification information continuous storing area output from the comparison section, for controlling the communication section so as to perform a predetermined communication processing with a communication destination indicated by the address information stored in the address information temporary storing area, and controlling so as to store the identification information stored in the identification information temporary storing area into the identification information continuous storing area.

The invention also provides a terminal, in which a camera unit storing identification information for identifying the camera unit and having an image pickup section enables to be attached to and detached from the terminal and enables to be replaced, having: a storage section having an identification information temporary storing area for temporarily storing the identification information, an identification information continuous storing area for continuously storing identification information, and an address information continuous storing area previously storing address information specifying a predetermined communication destination; an information acquisition section for acquiring the identification information output from the camera unit, and storing the identification information in the identification information temporary storing area; a comparison section for comparing between the identification information stored in the identification information temporary storing area and the identification information stored in the identification information continuous storing area to determine whether or not those identification information are different each other, and outputting the comparison result; a communication section that enables to connect to a network; and a control section, upon reception of the comparison result indicating that the identification information stored in the identification information temporary storing area and is different from the identification information stored in the identification information continuous storing area output from the comparison section, for controlling the communication section so as to perform a predetermined communication processing with a communication destination indicated by the address information, and controlling so as to store the identification information in the identification information temporary storing area into the identification information continuous storing area.

In the terminal camera unit system, the terminal may further include detection section for detecting whether or not the camera unit is attached, and if the detection section does not detect that the camera unit is attached, the terminal control section may control the information acquisition section so as not to acquire the address information.

In the terminal camera unit system, the terminal may further include detection section for detecting whether or not the camera unit is attached, and if the detection section does not detect that the camera unit is attached, the terminal control section may control the information acquisition section so as not to acquire the address information and the identification information.

In the terminal camera unit system, the terminal may further include detection section for detecting whether or not the camera unit is attached, and if the detection section does not detect that the camera unit is attached, the terminal control section may control the information acquisition section so as not to acquire the identification information.

In the terminal camera unit system, the communication section may perform the predetermined communication processing, thereby acquiring the camera control information retained in the communication destination with which the predetermined communication processing is performed and storing the camera control information in the terminal storage section, and the terminal control section may control the camera control section so as to perform the processing operation based on the camera control information stored in the terminal storage section.

In the terminal camera unit system, the communication section may include a conversation function and if the terminal control section instructs the communication section to perform the predetermined communication processing when the communication section conducts conversation communications by the conversation function, the communication section may start the predetermined communication processing after completion of the conversation communications.

The terminal may further include detection section for detecting whether or not the camera unit is attached, and if the detection section does not detect that the camera unit is attached, the control section may control the information acquisition section so as not to acquire the address information.

The terminal may further include detection section for detecting whether or not the camera unit is attached, and if the detection section does not detect that the camera unit is attached, the control section may control the information acquisition section so as not to acquire the address information or the identification information.

The terminal may further include detection section for detecting whether or not the camera unit is attached, and if the detection section does not detect that the camera unit is attached, the control section may control the information acquisition section so as not to acquire the identification information.

In the terminal, the communication section may perform the predetermined communication processing, thereby acquiring the camera control information retained in the communication destination with which the predetermined communication processing is performed and storing the camera control information in the storage section, and the control section may control the camera unit so as to operate based on the camera control information stored in the storage section.

In the terminal, the communication section may include a conversation function and if the control section instructs the communication section to perform the predetermined communication processing when the communication section conducts conversation communications by the conversation function, the communication section may start the predetermined communication processing after completion of the conversation communications.

According to the terminal camera unit system, the terminal, and the camera unit used for the terminal camera unit system, the terminal to which the camera unit is attached can perform the optimum processing operation corresponding to the camera unit attached to the terminal.

The invention also provides a terminal camera unit system having a camera unit and a terminal to which the camera unit enables to be attached, wherein the camera unit includes: an image pickup section; an image processing section for outputting image data acquired by the image pickup section to the terminal; and a camera storage section for storing address information specifying a predetermined communication destination, and the terminal includes: a communication section; an image data acquisition section for acquiring the image data output from the image processing section; and an information acquisition section for acquiring the address information from the camera storage section, and the communication section of the terminal transmits the image data acquired by the image data acquisition section to a communication destination specified by the address information acquired by the information acquisition section.

The invention also provides a terminal camera unit system having a camera unit and a terminal to which the camera unit enables to be attached, wherein the camera unit includes: an image pickup section; an image processing section for outputting image data acquired by the image pickup section to the terminal; and a camera storage section for storing address information specifying a predetermined communication destination, and the terminal includes: a communication section; an image data acquisition section for acquiring the image data output from the image processing section; an information acquisition section for acquiring the address information from the camera storage section; and a terminal storage section for storing the address information, and if the address information stored in the terminal storage section is different from the address information acquired by the information acquisition section, the communication section of the terminal transmits the image data to a communication destination specified by the address information acquired by the information acquisition section.

In the terminal camera unit system, the terminal may further include detection section for detecting attachment of the camera unit, and if the detection section detects attachment of the camera unit, if power of the terminal is turned on, or if a processing for transmitting the image data is started, the terminal may determine whether or not the address information stored in the terminal storage section is different from the address information acquired by the information acquisition section.

The invention also provides a terminal camera unit system having a camera unit and a terminal to which the camera unit enables to be attached, wherein the camera unit includes: an image pickup section; an image processing section for outputting image data acquired by the image pickup section to the terminal; and a camera storage section for storing identification information identifying the camera unit, and the terminal includes:

a communication section; an image data acquisition section for acquiring the image data output from the image processing section; an information acquisition section for acquiring the identification information from the camera storage section; and a terminal storage section for storing the identification information, and if the identification information stored in the terminal storage section is different from the identification information acquired by the information acquisition section, the communication section of the terminal transmits the image data to a predetermined communication destination.

In the terminal camera unit system, the terminal may further include a detection section for detecting attachment of the camera unit, and if the detection section detects attachment of the camera unit, if power of the terminal is turned on, or if a processing for transmitting the image data is started, the terminal may determine whether or not the identification information stored in the terminal storage section is different from the identification information acquired by the information acquisition section.

In the terminal camera unit system, the terminal may acquire address information stored in the camera unit and transmit the image data acquired by the image data acquisition section to the communication destination specified by the address information.

The invention also provides a camera unit which has an image pickup section and enables to be attached to and detached from a predetermined terminal and enables to be replaced, having: a camera storage section for storing address information specifying a predetermined communication destination and/or identification information for identifying the camera unit; an image processing section for outputting image data acquired by the image pickup section to the terminal; and an information output section for reading the address information and/or the identification information from the camera storage section to output the address information and/or the identification information.

The invention also provides a terminal used for a terminal camera unit system comprising a camera unit having an image pickup section and a terminal to which the camera unit enables to be attached, having: a communication section; an image data acquisition section for acquiring image data picked up by the camera unit; an information acquisition section for acquiring address information stored in the camera unit; and a terminal storage section for storing the address information, wherein if the address information stored in the terminal storage section is different from the address information acquired by the information acquisition section, the communication section of the terminal transmits the image data to a communication destination specified by the address information acquired by the information acquisition section.

The terminal may further include a detection section for detecting attachment of the camera unit, wherein if the detection section detects attachment of the camera unit, if power is turned on, or if a processing for transmitting the image data is started, the terminal may determine whether or not the address information stored in the terminal storage section is different from the address information acquired by the information acquisition section.

The invention also provides a terminal used for a terminal camera unit system having a camera unit having an image pickup section and a terminal to which the camera unit enables to be attached, having: a communication section; an image data acquisition section for acquiring image data picked up by the camera unit; an information acquisition section for acquiring identification information stored in the camera unit; and a terminal storage section for storing the identification information, wherein if the identification information stored in the terminal storage section is different from the identification information acquired by the information acquisition section, the communication section of the terminal transmits the image data to a predetermined communication destination.

The terminal may further include a detection section for detecting attachment of the camera unit, wherein if the detection section detects attachment of the camera unit, if power is turned on, or if a processing for transmitting the image data is started, the terminal may determine whether or not the identification information stored in the terminal storage section is different from the identification information acquired by the information acquisition section.

In the terminal, the terminal may acquire address information stored in the camera unit and may transmit the image data acquired by the image data acquisition section to the communication destination specified by the address information.

The terminal may has a telephone function provided in the communication section, Wherein if the terminal determines that the address information stored in the terminal storage section is different from the address information acquired by the information acquisition section while the communication section executes the telephone function, the communication section transmits the image data acquired by the image data acquisition section to the communication destination after the execution of the telephone function terminates.

The terminal may further include an operation section for enabling the user to enter any address information, wherein if the address information entered through the operation section is different from the address information acquired by the information acquisition section, transmitting the image data acquired by the image data acquisition section may not be transmitted.

The terminal may further include an operation section for enabling the user to enter any address information, wherein if the address information entered through the operation section is different from the acquired address information, transmitting the image data acquired by the image data acquisition section may not be transmitted.

According to the terminal camera unit system, the terminal, and the camera unit used for the terminal camera unit system, a photographed image is prevented from leaking or dispersing against user's will.

The invention provides a camera unit system having a camera unit and a terminal to which the camera unit enables to be attached, wherein the camera unit includes: an image pickup section; a camera storage section for storing camera information concerning the image pickup section; and a camera control section for controlling the image pickup section upon reception of an instruction about photograph from the terminal and outputting image data obtained by the image pickup section to the terminal, and the terminal includes: a camera information acquisition section for acquiring the camera information from the camera storage section; a terminal control section for outputting an instruction about photograph corresponding to the camera information to the attached camera unit if an operation for picking up an image is performed; and an image data acquisition section for acquiring image data picked up by the camera unit.

In the camera unit system, the terminal selectively includes a camera unit having the image pickup section and a predetermined engagement part, or a cover unit having an engagement part same as the engagement part of the camera unit, and the terminal includes an attachment part for engaging with the engagement part.

In the camera unit system, the terminal includes a first housing and a second housing which are foldably joined to each other, the attachment part is provided in the first housing, when the attachment part and the camera unit engage with each other, a part of the camera unit projects from a surface of the first housing opposed to the second housing and an image pickup lens is exposed, and the second housing has a recess part in a predetermined shape at a position corresponding to the attachment part on the surface opposed to the first housing.

The invention also provides a camera unit system having a camera unit and a terminal to which the camera unit enables to be attached, wherein the camera unit includes: an image pickup section; and a camera storage section for storing address information specifying a predetermined communication destination and/or identification information identifying the camera unit, the terminal includes: a communication section; an information acquisition section for acquiring the address information and/or the identification information from the camera storage section; and a terminal storage section for storing the address information and/or the identification information.

In the camera unit system, if the address information stored in the terminal storage section is different from the address information acquired by the information acquisition section, the communication section of the terminal performs a communication processing with the communication destination indicated by the address information acquired by the information acquisition section.

In the camera unit system, if the identification information stored in the terminal storage section is different from the identification information acquired by the information acquisition section, the communication section of the terminal performs a communication processing with a predetermined communication destination.

In the camera unit system, the terminal acquires address information stored in the camera unit and performs a communication processing with the communication destination indicated by the address information.

In the camera unit system, the terminal further includes a control section for controlling the camera unit, the communication section acquires a program or data for controlling the camera unit by performing a communication processing with a communication destination indicated by the address information acquired by the information acquisition section, and the control section controls the camera unit based on the acquired program or data.

In the camera unit system, the camera unit further includes: an image processing section for outputting image data acquired by the image pickup section to the terminal, the terminal further includes: an image data acquisition section for acquiring the image data output from the image processing section, and if the address information stored in the terminal storage section is different from the address information acquired by the information acquisition section, the communication section of the terminal transmits the image data acquired by the image data acquisition section to a communication destination indicated by the address information acquired by the information acquisition section.

In the camera unit system, the camera unit further includes: an image processing section for outputting image data acquired by the image pickup section to the terminal, the terminal further includes: an image data acquisition section for acquiring the image data output from the image processing section, and if the identification information stored in the terminal storage section is different from the identification information acquired by the information acquisition section, the communication section of the terminal performs a communication processing with a predetermined communication destination.

In the camera unit system, the terminal acquires address information stored in the camera unit and transmits the image data acquired by the image data acquisition section to the communication destination indicated by the address information.

In the camera unit system, the terminal further includes a detection section for detecting attachment of the camera unit, and if the detection section detects attachment of the camera unit, if power of the terminal is turned on, or if a processing for transmitting the image data is started, the terminal determines whether or not the address information or the identification information stored in the terminal storage section is different from the address information or the identification information acquired by the information acquisition section.

The invention also provides a terminal to which a camera unit enables to be attached for a camera unit system comprising the camera unit and the terminal to which the camera unit enables to be attached, having: a communication section; an information acquisition section for acquiring address information specifying a predetermined communication destination and/or identification information identifying the camera unit stored in the camera unit; and a terminal storage section for storing the address information and/or the identification information.

In the terminal, if the address information stored in the terminal storage section is different from the address information acquired by the information acquisition section, the communication section of the terminal performs a communication processing with the communication destination indicated by the address information acquired by the information acquisition section.

In the terminal, if the identification information stored in the terminal storage section is different from the identification information acquired by the information acquisition section, the communication section of the terminal performs a communication processing with a predetermined communication destination.

In the terminal, the terminal acquires address information stored in the camera unit, and performs the communication processing with a communication destination indicated by the address information.

The terminal further has: a control section for controlling the camera unit, wherein the communication section acquires a program or data for controlling the camera unit by performing a communication processing with a communication destination indicated by the address information acquired by the information acquisition section, and the control section controls the camera unit based on the acquired program or data.

The terminal further has: an image data acquisition section for acquiring image data picked up by the camera unit, wherein if the address information stored in the terminal storage section is different from the address information acquired by the information acquisition section, the communication section transmits the image data acquired by the image data acquisition section to a communication destination indicated by the address information acquired by the information acquisition section.

The terminal further has: an image data acquisition section for acquiring image data picked up by the camera unit, wherein if the identification information stored in the terminal storage section is different from the identification information acquired by the information acquisition section, the communication section transmits the image data acquired by the image data acquisition section to a communication destination indicated by the address information acquired by the information acquisition section.

The terminal further has: a detection section for detecting attachment of the camera unit, wherein if the detection section detects attachment of the camera unit, if power of the terminal is turned on, or if a processing for transmitting the image data is started, the terminal determines whether or not the address information or the identification information stored in the terminal storage section is different from the address information or the identification information acquired by the information acquisition section.

BRIEF DESCRIPTION OF THE DRAWINGS

FIG. 5 is a drawing to show a camera information table stored in a camera storage section 128 shown in FIG. 4;

DETAILED DESCRIPTION OF THE PREFERRED EMBODIMENTS

First Embodiment

A first embodiment of a portable terminal according to the invention will be specifically explained based on the accompanying drawings.

FIGS. 1 to 6 are drawings referenced for describing a mobile telephone 12 (corresponding to portable terminal) and a camera unit 14 according to the first embodiment of the invention.

Figure 1:
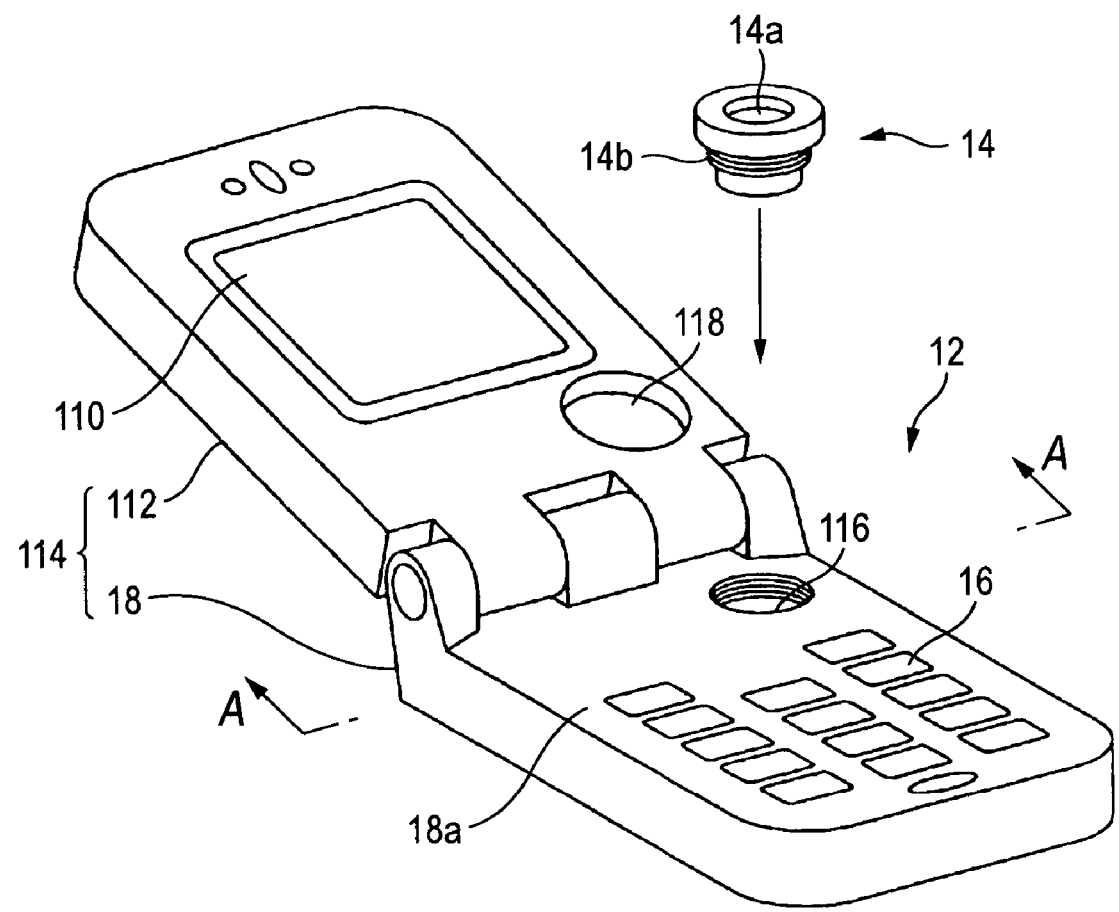
FIG. 1 is a perspective view to show a camera unit 14 and a main body 114 of a mobile telephone 12 according to first embodiment of the invention.

As shown in FIG. 1, the mobile telephone 12 according to the first embodiment includes a first housing 18 having an operation section 16 made up of a ten-key numeric pad, etc., and a second housing 112 having a display section 110 such as an LCD (liquid crystal display), the first and second housings being joined to each other in a foldable manner. The first housing 18 and the second housing 112 make up a main body 114 of the mobile telephone 12. The operation section 16 is placed on an operation face 18a of the first housing 18.

Although not shown, when the first housing 18 and the second housing 112 are placed in a fold state, the operation face 18a and the display face of the display section 110 face each other and are prevented from being exposed to the outside.

As shown in FIG. 1, the mobile telephone 12 includes the camera unit 14 that can be attached to and detached from the mobile telephone 12. The camera unit 14 has an image pickup device such as a CCD (not shown) and an image pickup lens 14a, and the image pickup device is placed inside the camera unit 14. The image pickup lens 14a is placed on one end face of the length of the camera unit 14 on the image pickup axis of the image pickup device and in the image pickup axis direction and is exposed to the outside. The camera unit 14 has a male screw part 14b (corresponding to engagement part) on the outer periphery of the intermediate part of the length in the image pickup axis direction.

A female screw part 116 (corresponding to attachment part) corresponding to the male screw part 14b of the camera unit 14 is provided in the first housing 18 so as to open to the operation face 18a. The camera unit 14 is inserted into the female screw part 116 from the end part opposite to the end part on the side of the image pickup lens 14a and the male screw part 14b and the female screw part 116 are fastened, whereby the camera unit 14 is attached to the first housing 18.

Figure 2:
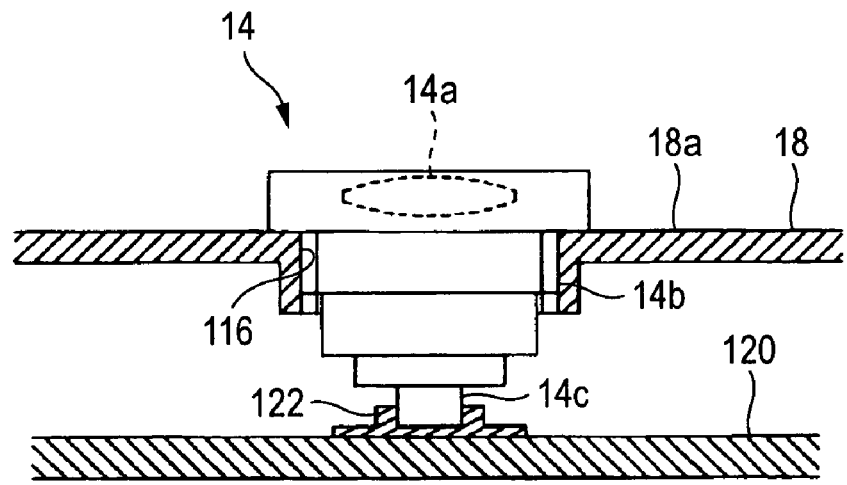
FIG. 2 is a sectional view taken on line A-A in FIG. 1 when the camera unit 14 is attached to a female screw part 116 of the main body 114.

When the camera unit 14 is attached to the first housing 18, the end part on the side of the image pickup lens 14a in the image pickup axis direction is fixed in a state in which the end part projects from the operation face 18a (see FIG. 2). Thus, the second housing 112 is formed with a recess part 118 of a predetermined shape at the position corresponding to the female screw part 116 on the face opposed to the operation face 18a of the first housing 18 when the mobile telephone 12 is folded, as shown in FIG. 1. The internal space of the recess part 118 is formed so as to be able to house the end part on the side of the image pickup lens 14a projecting from the operation face 18a of the camera unit 14 when the first housing 18 and the second housing 112 are folded mutually.

As shown in FIG. 2, the camera unit 14 has a connector 14c at the end part opposite to the end part on the side of the image pickup lens 14a in the image pickup axis direction, and the connector 14c engages with a connector 122 provided on a wiring board 120 in the first housing 18 for conduction of electricity.

Figure 3:
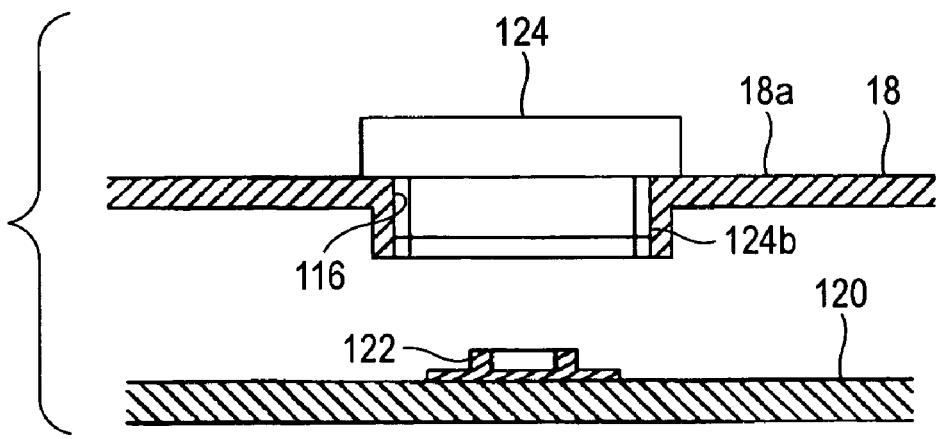
FIG. 3 is a sectional view taken on line A-A in FIG. 1 when a cover unit 124 is attached to the female screw part 116 of the main body 114.

As shown in FIG. 3, if the user does not attach the camera unit 14 to the first housing 18 because of not using the image pickup function, the user can attach a cover unit 124 to the first housing 18 in place of the camera unit 14.

The cover unit 124 is formed with a male screw part 124b (corresponding to engagement part) which is the same as the male screw part 14b of the camera unit 14 and thus can be fastened to the female screw part 116 of the first housing 18 by the screw as with the camera unit 14.

Figure 4:
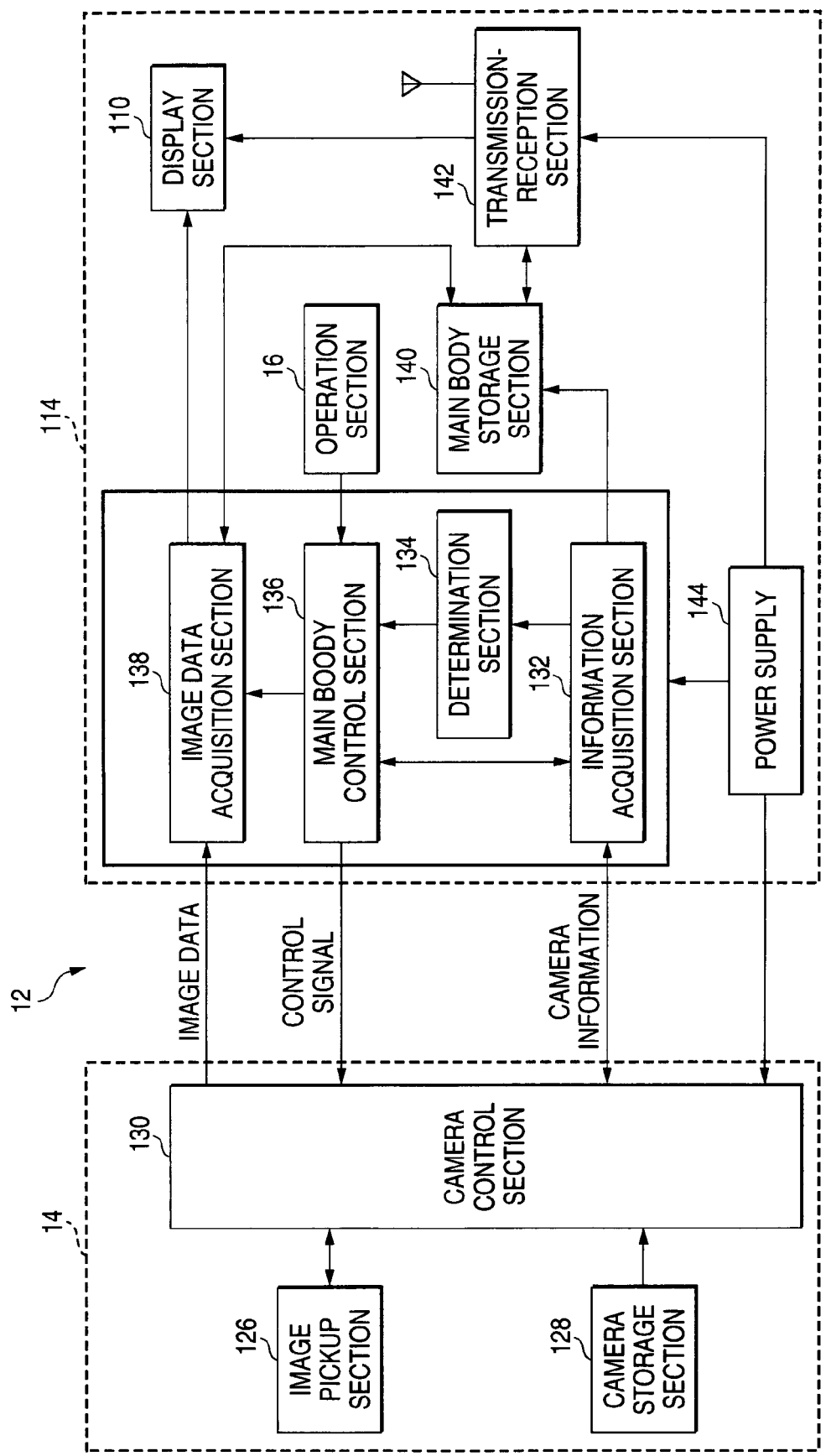
FIG. 4 is a block diagram of the camera unit 14 and the main body 114 of the mobile telephone 12 in the first embodiment of the invention.

Next, the circuit configuration of the camera unit 14 and the main body 114 of the mobile telephone 12 will be explained. FIG. 4 is a block diagram to show the circuit configuration in a state in which the camera unit 14 is attached to the mobile telephone 12.

The camera unit 14 includes an image pickup section 126, a camera storage section 128, and a camera control section 130 for controlling them. The image pickup section 126 is made up of the image pickup lens 14a previously described with reference to FIG. 1, an image pickup device (not shown), etc. The camera unit 14 has the image pickup section 126 having any of three types of image pickup devices with low resolution, standard resolution, and high resolution and enables the user to selectively attach any of the three types of camera units 14 to the main body 114.

The camera storage section 128 shown in FIG. 4 is nonvolatile memory for storing a camera information table concerning the image pickup section 126 as shown in FIG. 5. As shown in the figure, the camera storage section 128 has as a part of the camera information, two-bit information indicating that the image pickup device of the image pickup section 126 has low resolution, standard resolution, or high resolution as combination of the first and second bits set to H (high) and L (low), L and H, or L and L.

The camera storage section 128 can store not only the information about the resolution of the image pickup device, but also address information to specify a predetermined communication destination (called party) as another part of the camera information. The address information contains not only information specifying the location of a home page on the Internet such as URL (Uniform Resource Locator), but also any other notation to specify the location of an information source that can be connected via a communication network.

The camera information refers to information concerning the camera unit 14 such as resolution, angle of view, super-telephoto lens or wide-angle lens, manufacturer, standard, operation environment, image data capture control, image processing, and operation menu in addition to the camera information described above.

If the camera control section 130 receives an instruction of operation start, termination, etc., from the main body 114, the camera control section 130 controls the image pickup section 126 based on the instruction. The camera control section 130 performs AE (Auto Exposure) processing or AWB (Auto White Balance) processing for RGB raw data concerning color output as data for each pixel from the image pickup section 126 and outputs the processing result to the main body 114.

The AE processing refers to processing of optimizing exposure, and the AWB processing refers to processing of preventing display of white in an image from taking on any other color with reception of the effect of a light source, etc., by adjusting a red gain, a blue gain, etc.

Next, the main body 114 includes a camera information acquisition section 132, a determination section 134, a main body control section 136, an image data acquisition section 138, a main body storage section 140, a transmission-reception section 142, and a power supply 144 in addition to the operation section 16 and the display section 110 previously described.

As shown in FIG. 2, when the camera unit 14 is attached to the main body 114 (first housing 18) and the connector 14c of the camera unit 14 engages with the connector 122 of the wiring board 120, the camera information acquisition section 132, the main body control section 136, and the image data acquisition section 138 of the main body 114 shown in FIG. 4 are connected to the camera control section 130 of the camera unit 14 as circuitry. When the camera unit 14 is attached to the main body 114, the power supply 144 is connected to the camera unit 14 for supplying a current thereto in addition to the circuitry in the main body 114.

When the camera information acquisition section 132 is connected to the camera control section 130 as circuitry, the camera information acquisition section 132 fetches the camera information in the camera storage section 128 through the camera control section 130 and retains the camera information. If the camera information in the camera storage section 128 contains address information, the camera information acquisition section 132 outputs the address information to the main body storage section 140.

If the camera information acquisition section 132 acquires the camera information, the determination section 134 determines that the camera unit 14 is attached to the main body 114, and outputs an attachment signal to the effect that the camera unit 14 is attached to the main body 114 to the main body control section 136.

An optical sensor, a magnetic sensor, a mechanical switch, or the like for directly detecting that the camera unit 14 is attached to the main body 114 and outputting an attachment signal indicating the fact may be provided as the detection section 134 as a different embodiment from the first embodiment instead of determining by the determination section 134 that the camera unit 14 is attached to the main body 114 depending on whether or not the camera information acquisition section 132 acquires the camera information.

After the attachment signal is received and after the user operates the operation section 16 to start a camera mode, the main body control section 136 issues an instruction about photograph output to the camera unit 4 corresponding to the camera information stored in the camera information acquisition section 132. The main body control section 136 instructs the image data acquisition section 138 to perform image data processing corresponding to the camera information of the camera information acquisition section 132.

Upon reception of the instruction from the main body control section 136, the image data acquisition section 138 calculates the data corresponding to the camera information of the camera information acquisition section 132, and selects and fetches the program, etc., corresponding to the camera control information from among the programs, etc., previously stored in the main body storage section 140. Upon reception of image data from the camera unit 14, the image data acquisition section 138 performs image data processing based on the data, the program, etc.

That is, the image data acquisition section 138 changes, etc., the image data fetch clock frequency, JPEG compression rate, electronic zoom ratio, the thinning-out rate in displaying on the display section 110, etc., corresponding to the camera information of the camera information acquisition section 132 and processes the image data.

The image data acquisition section 138 displays the image data received from the camera unit 14 or data provided by performing predetermined processing for the image data on the display section 110 or stores the image data or the data in the main body storage section 140. The image data can also be stored in external storage section (not shown) and can also be retained in an external server through the transmission-reception section 142.

In particular, the main body storage section 140 is made up of SDRAM (Synchronous Dynamic Random Access Memory) and flash memory although not shown. If the image data is stored in the main body storage section 140, the image data received from the camera unit 14 is once stored in the SDRAM and then the image data acquisition section 138 performs JPEG compression processing for the image data in the SDRAM before storage of the image data in the flash memory.

Upon reception of the address information from the camera information acquisition section 132, the main body storage section 140 stores the address information and also outputs the address information to the transmission-reception section 142 and causes the transmission-reception section 142 to automatically start communications with the predetermined communication destination specified by the address information and then receive the predetermined program, etc., corresponding to the camera information. The program, etc., received by the transmission-reception section 142 is stored in the main body storage section 140.

Therefore, if the program, etc., corresponding to the camera information of the camera information acquisition section 132 is not previously stored in the main body storage section 140, the program received by the transmission-reception section 142 corresponding to the address information in the camera information is newly added to the main body storage section 140, so that the image data acquisition section 138 can always fetch the program, etc., corresponding to the camera information of the camera information acquisition section 132 from the main body storage section 140 and can perform appropriate processing for the image data of the camera unit 14.

Figure 6:
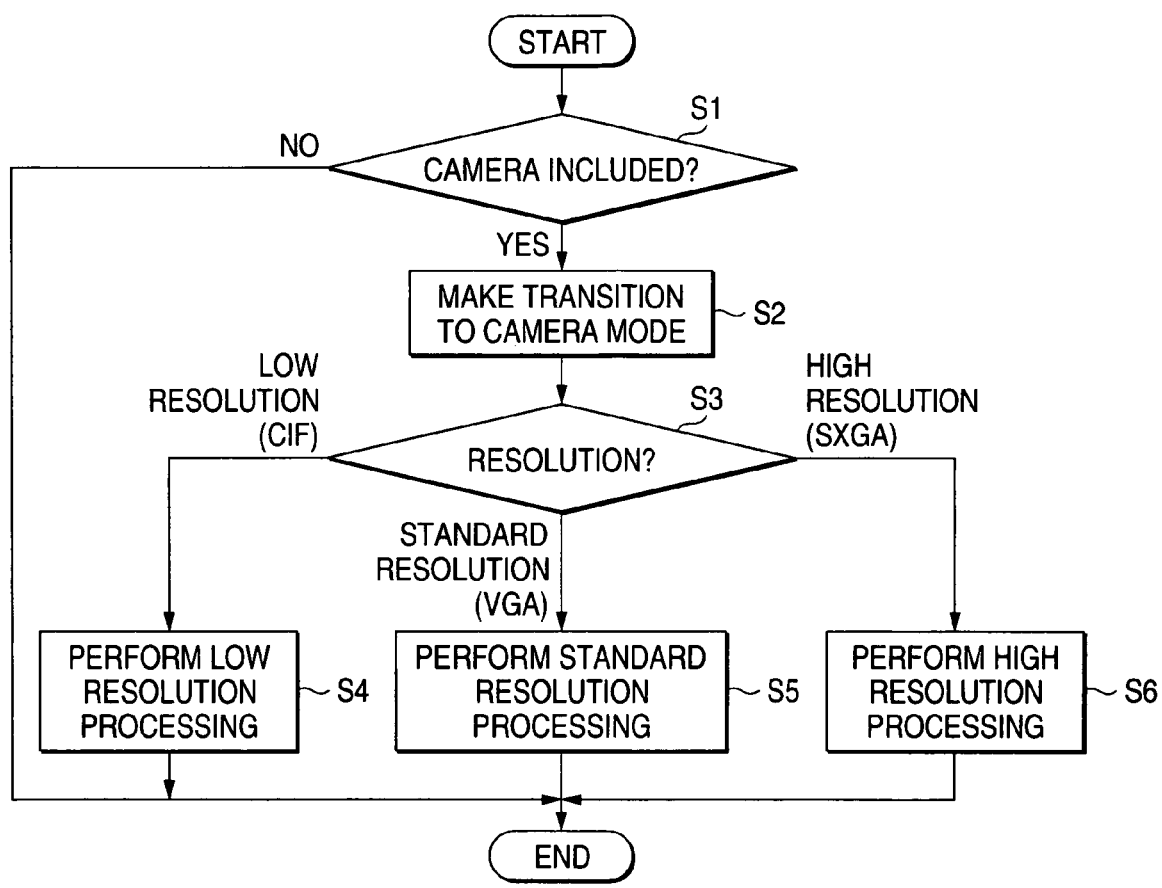
FIG. 6 is a flowchart to show the processing operation of a main body control section 136 shown in FIG. 4.

Next, the processing operation of the main body control section 136 when the user operates the operation section 16 to start the camera mode to use the image pickup function of the mobile telephone 12 will be explained based on a flowchart of FIG. 6.

If the user operates the operation section 16 to select the camera mode from among various functions of the mobile telephone 12 after the camera unit 14 is attached to the main body 114, the main body control section 136 makes a transition to the camera mode based on the camera information stored in the camera information acquisition section 132 (YES at step S1 and step S2).

If the camera unit 14 is not attached to the main body 114 or the cover unit 124 rather than the camera unit 14 is attached, the camera information acquisition section 132 does not retain the camera information and therefore the main body control section 136 does not make a transition to the camera mode and terminates the processing operation (NO at step S1).

When the main body control section 136 makes a transition to the camera mode at step S2, the main body control section 136 determines which of low resolution, standard resolution, and high resolution the attached camera unit 14 has based on the camera information of the camera information acquisition section 132 (step S3). After step S3, the main body control section 136 performs the processing procedure corresponding to the determined resolution (any of steps S4 to S6).

According to the mobile telephone 12 and the camera unit 14 according to the first embodiment, the user can replace only the camera unit 14 with a camera unit of different performance, etc., and if the camera unit 14 is not required, the user can attach the cover unit 124 rather than the camera unit 14. If the mobile telephone does not include the camera unit 14, the user can attach only a new camera unit 14 to the mobile telephone 12.

A part of the camera unit 14 projects from the operation face 18a of the first housing 18 in the main body 114, but the second housing 112 is formed with the recess part 118, whereby complicating or upsizing of the outer shape of the mobile telephone 12 can be prevented and impairing of portability can be avoided.

In the first embodiment, if the camera unit 14 is attached to the female screw part 116 of the main body 114, the image pickup device of the camera unit 14 has any of low resolution, standard resolution, or high resolution. However, as another embodiment, the camera unit 14 may have any of a super-telephoto lens, a standard lens, or a wide-angle lens as the image pickup lens. In such a case, the camera information shown in FIG. 5 is defined corresponding to the type of image pickup lens.

A plurality of combinations of the image pickup section 126 of different resolutions and different types of image pickup lenses 4a may be provided as different types of camera units 14 and the user may attach any of the camera units 14 or the cover unit 124 to the female screw part 116.

A plurality of combinations of other elements different in performance, etc., than the image pickup section 126 of different resolutions or different types of image pickup lenses 14a may be provided as different types of camera units 14 and the user may attach any of the camera units 14 or the cover unit 124 to the female screw part 116. A plurality of combinations of other elements different in performance, etc., than the image pickup section 126 of different resolutions or different types of image pickup lenses 14a and the image pickup section 126 of different resolutions and different types of image pickup lenses 14a may be provided as different types of camera units 14.

That is, the user can also replace the camera unit 14 having the image pickup section 126 different in resolution, angle of view, type of image pickup lens (super-telephoto lens, wide-angle lens, etc.,), manufacturer, standard, etc.

In the first embodiment, the invention is applied to the mobile telephone 12, but can also be applied to any other portable terminal such as a PDA. The invention can also be applied to other digital home electric appliances that can include an image pickup function, such as a personal computer and an audio machine including an image pickup function.

Second to fifth embodiments of a portable terminal camera unit system and a portable terminal and a camera unit used with the portable terminal camera unit system according to the invention will be specifically explained based on the accompanying drawings.

The first object of the first embodiment of the invention is to provide a terminal for enabling a user to replace only an image pickup section with another image pickup section different in performance, etc., and enabling the user to newly add only an image pickup section to the terminal if no image pickup section is provided to the terminal, and a camera unit used with the terminal.

Second Embodiment

FIGS. 7 to 12 are drawings referenced for describing a mobile telephone camera unit system (corresponding to portable terminal camera unit system) and a mobile telephone 22 (corresponding to portable terminal) and a camera unit 24 used with the mobile telephone camera unit system according to the second embodiment of the invention.

Figure 7:
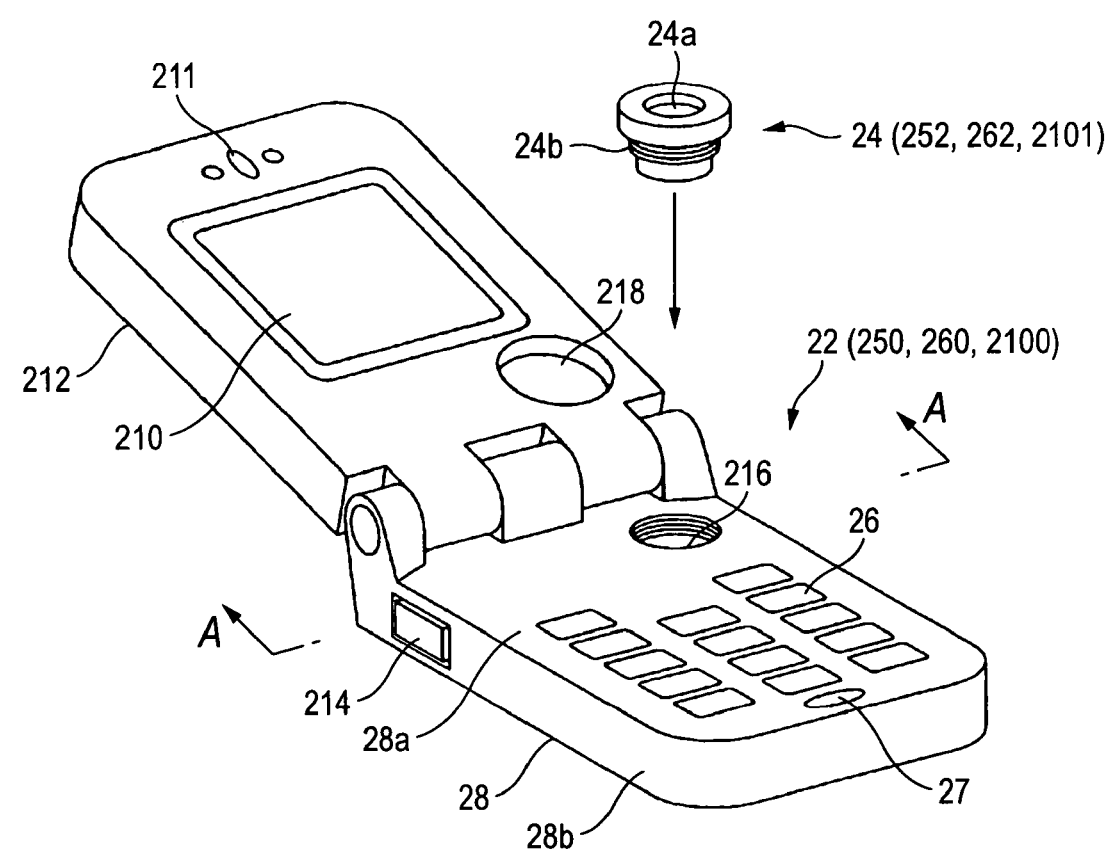
FIG. 7 is a perspective view to show mobile telephone 22, 250, 260, 2100 and camera unit 24, 252, 262, 2101 according to second to fifth embodiments of the invention.

As shown in FIG. 7, the mobile telephone 22 according to the second embodiment includes a first housing 28 having an operation section 26 made up of a ten-key numeric pad, etc., and a microphone 27 and a second housing 212 having a display section 210 such as an LCD (liquid crystal display) and a loudspeaker 211, the first and second housings being joined to each other in a foldable manner.

The operation section 26 is placed on an operation face 28a of the first housing 28. A release switch 214 for causing the camera unit 24 to perform the photographing operation is provided on a side face 28b parallel in the length direction of the first housing 28 and adjacent with the operation face 28a.

Although not shown, when the first housing 28 and the second housing 212 are placed in a fold state, the operation face 28a and the display face of the display section 210 face each other and are prevented from being exposed to the outside.

As shown in FIG. 7, the camera unit 24 can be attached to and detached from the mobile telephone 22 and the mobile telephone 22 also enables the user to replace the camera unit 24 with another type of camera unit.

The camera unit 24 has an image pickup device such as a CCD (not shown) and an image pickup lens 4a, and the image pickup device is placed inside the camera unit 24. The image pickup lens 24a is placed on one end face of the length of the camera unit 24 on the image pickup axis of the image pickup device and in the image pickup axis direction and is exposed to the outside. The camera unit 24 has a male screw part 24b (corresponding to engagement part) on the outer periphery of the intermediate part of the length in the image pickup axis direction.

A female screw part 216 (corresponding to attachment part) corresponding to the male screw part 24b of the camera unit 24 is provided in the first housing 28 so as to open to the operation face 28a. The camera unit 24 is inserted into the female screw part 216 from the end part opposite to the end part on the side of the image pickup lens 24a and the male screw part 24b and the female screw part 216 are fastened, whereby the camera unit 24 is attached to the first housing 28.

Figure 8:
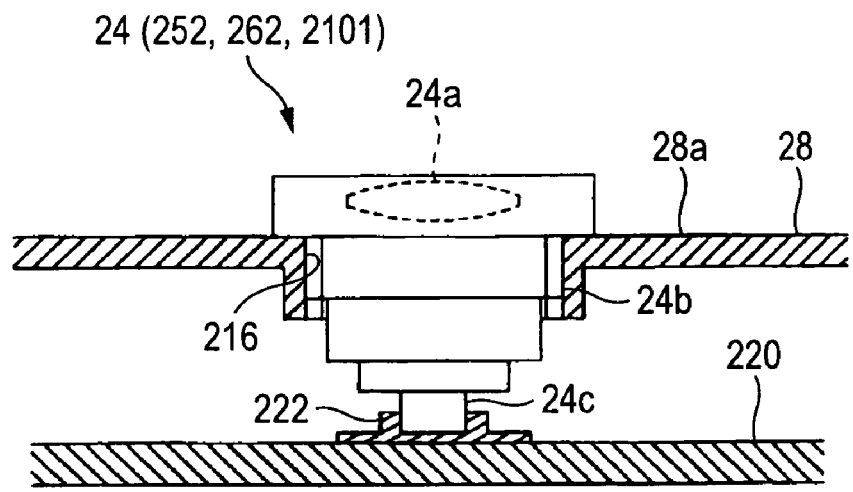
FIG. 8 is a sectional view taken on line A-A in FIG. 7 to show a state in which the camera unit 24, 252, 262, 2101 is attached to a female screw part 216 of the mobile telephone 22, 250, 260, 2100 according to the second to fifth embodiments of the invention.

When the camera unit 24 is attached to the first housing 28, the end part on the side of the image pickup lens 24a in the image pickup axis direction is fixed in a state in which the end part projects from the operation face 28a (see FIG. 8). Thus, the second housing 212 is formed with a recess part 218 of a predetermined shape at the position corresponding to the female screw part 216 on the face opposed to the operation face 28a of the first housing 28 when the mobile telephone is folded, as shown in FIG. 7. The internal space of the recess part 218 is formed so as to be able to house the end part on the side of the image pickup lens 24a projecting from the operation face 28a of the camera unit 24 when the first housing 28 and the second housing 212 are folded mutually.

As shown in FIG. 8, the camera unit 24 has a connector 24c at the end part opposite to the end part on the side of the image pickup lens 24a in the image pickup axis direction, and the connector 24c engages with a connector 222 provided on a wiring board 220 in the first housing 28 for conduction of electricity.

Figure 9:
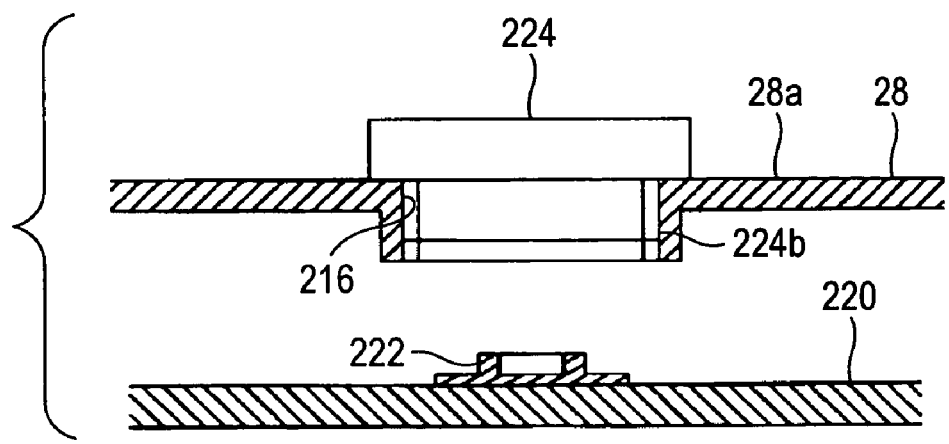
FIG. 9 is a sectional view taken on line A-A in FIG. 7 to show a state in which a cover unit 224 is attached to the female screw part 216 of the mobile telephone 22, 250, 260, 2100 according to the second to fifth embodiments of the invention.

As shown in FIG. 9, if the user does not attach the camera unit 24 to the first housing 28 because of not using the image pickup function, the user can attach a cover unit 224 to the first housing 28 in place of the camera unit 24.

The cover unit 224 is formed with a male screw part 224b (corresponding to engagement part) which is the same as the male screw part 24b of the camera unit 24 and thus can be fastened to the female screw part 216 of the first housing 28 by the screw as with the camera unit 24.

Figure 10:
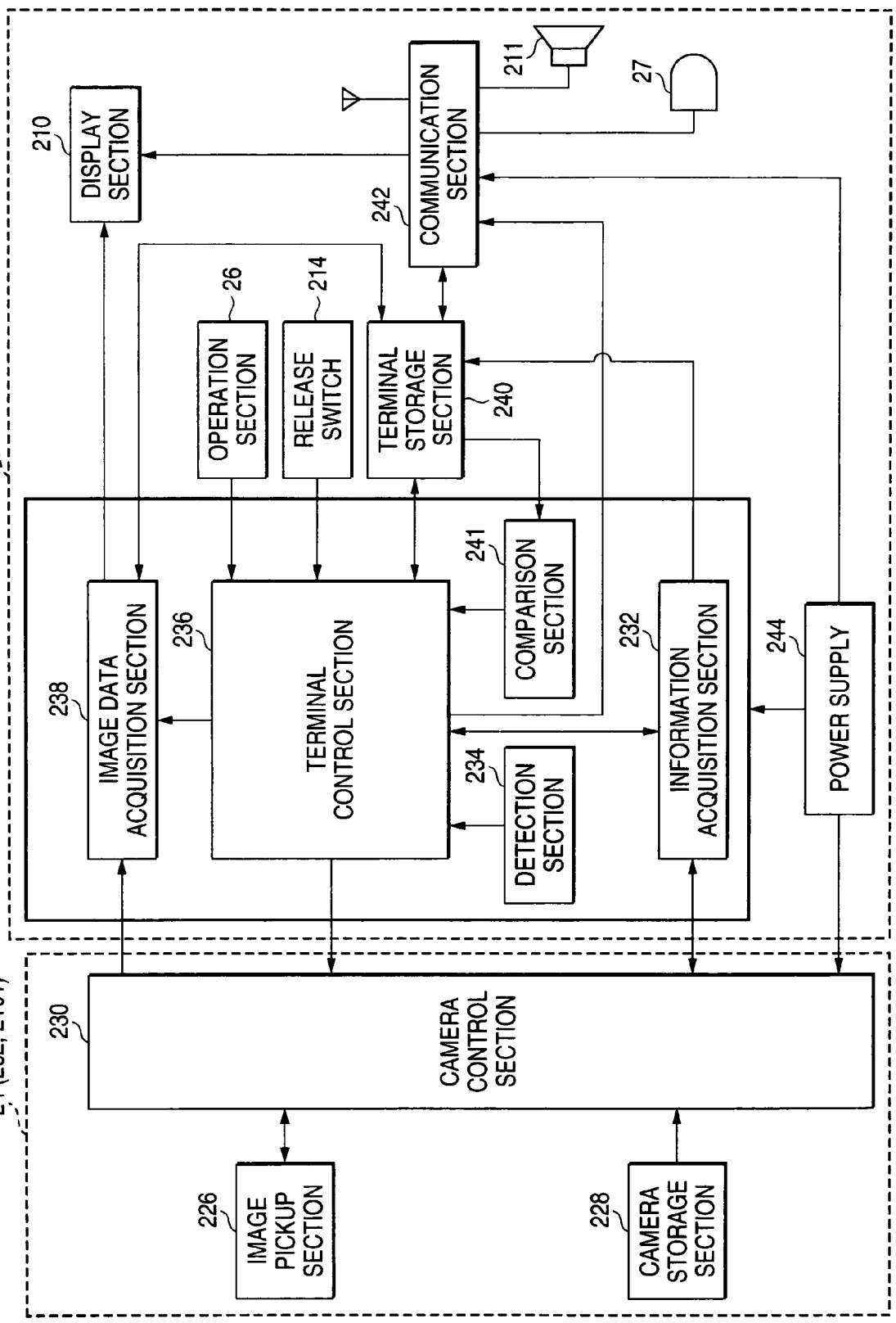
FIG. 10 is a circuit block diagram of the mobile telephone 22, 260, 2100 and the camera unit 24, 262, 2101 according to the second, fourth, and fifth embodiments of the invention.

Next, the circuit configuration of the mobile telephone 22 and the camera unit 24 will be explained. FIG. 10 is a block diagram to show the circuit configuration in a state in which the camera unit 24 is attached to the mobile telephone 22.

The camera unit 24 includes an image pickup section 226, a camera storage section 228, and a camera control section 230 for controlling them. The image pickup section 226 is made up of the image pickup lens 24a previously described with reference to FIG. 7, an image pickup device (not shown), etc.

The camera storage section 228 shown in FIG. 10 is nonvolatile memory for storing address information to specify a predetermined communication destination (called party). The address information contains not only information specifying the location of a home page on the Internet such as URL (Uniform Resource Locator), but also a specific telephone number and any other notation to specify the location of an information source that can be connected via a communication network like specification of a specific server, etc., connected to the communication network.

If the camera control section 230 receives a signal for making a request to transfer the address information in the camera storage section 228 from an information acquisition section 232 of the mobile telephone 22 (described later), the camera control section 230 performs first processing operation of reading the address information from the camera storage section 228 and outputting the address information to the information acquisition section 232.

If the camera control section 230 receives an instruction from a terminal control section 236 of the mobile telephone 22 (described later), the camera control section 230 controls the image pickup section 226 based on the instruction. The camera control section 230 performs AE (Auto Exposure) processing or AWB (Auto White Balance) processing for RGB raw data concerning color output as data for each pixel from the image pickup section 226 and outputs the processing result to a image data acquisition section 238 of the mobile telephone 22 (described later) based on an instruction of the terminal control section 236.

The AE processing refers to processing of optimizing exposure, and the AWB processing refers to processing of preventing display of white in an image from taking on any other color with reception of the effect of a light source, etc., by adjusting a red gain, a blue gain, etc.

In the circuit configuration in FIG. 10, the mobile telephone 22 includes the information acquisition section 232, a detection section 234, the terminal control section 236, the image data acquisition section 238, a portable terminal storage section 240, a comparison section 241, a communication section 242, and a power supply 244 in addition to the operation section 26, the microphone 27, the display section 210, the loudspeaker 211, and the release switch 214 previously described.

As shown in FIG. 8, the camera unit 24 is attached to the female screw part 16 of the mobile telephone 22 (first housing 28), the connector 24c of the camera unit 24 engages with the connector 222 of the wiring board 220, and the information acquisition section 232, the terminal control section 236, and the image data acquisition section 238 are connected to the camera control section 230 of the camera unit 24 as circuitry. When the camera unit 24 is attached to the mobile telephone 22, the power supply 244 is connected to the camera unit 24 for supplying a current thereto in addition to the circuitry in the mobile telephone 22.

When the camera unit 24 is attached to the mobile telephone 22 as shown in FIG. 8 although not shown in FIG. 9, the detection section 234 detects the camera unit 24 being attached to the mobile telephone 22 and continuously outputs an attachment signal to the effect that the camera unit 24 has been attached to the terminal control section 236, as shown in FIG. 10.

If the cover unit 224 is attached to the female screw part 216 of the first housing 28 as shown in FIG. 9 or if nothing is attached to the female screw part 216 of the first housing 28 although not shown, the detection section 234 does not output an attachment signal to the terminal control section 236. An optical sensor, a magnetic sensor, a mechanical switch, or the like can be used as the detection section 234 for performing the operation.

Upon reception of an instruction from the terminal control section 236, the information acquisition section 232 of the mobile telephone 22 shown in FIG. 10 outputs a signal to the camera control section 230 for requesting the camera control section 230 to transfer (output) the address information in the camera storage section 228.

That is, the information acquisition section 232 reads the address information in the camera storage section 228 through the camera control section 230. The information acquisition section 232 stores the read address information in an address information temporary storing area 246a of a terminal storage section 240 later described with reference to FIG. 11.

Figure 11:
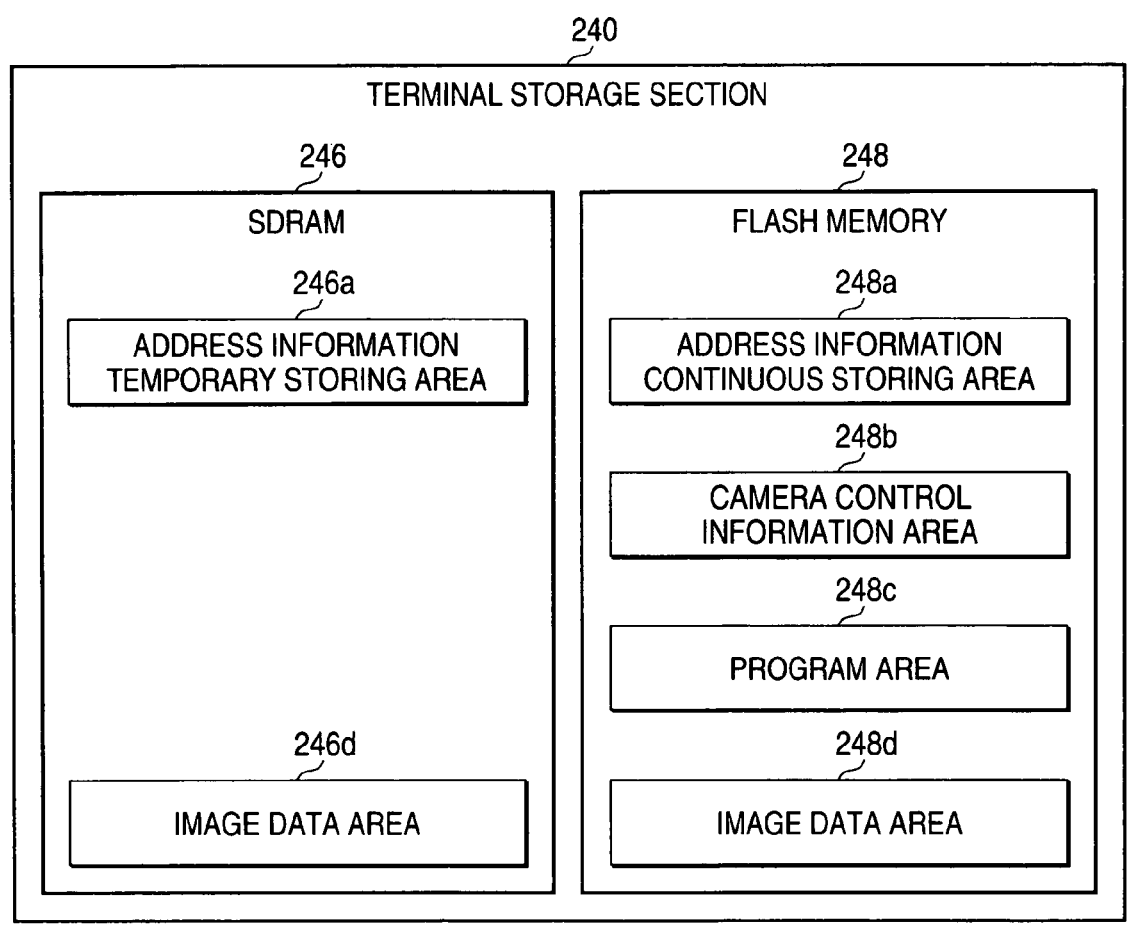
FIG. 11 is a conceptual drawing to show the configuration of a terminal storage section 240 in the second and third embodiments of the invention.

The terminal storage section 240 is made up of volatile SDRAM 246 (Synchronous Dynamic Random Access Memory) and nonvolatile flash memory 248 whose storage contents can be rewritten, as shown in FIG. 11. The SDRAM 246 is provided with the address information temporary storing area 246a, and the flash memory 248 is provided with an address information continuous storing area 248a.

The terminal storage section 240 immediately stores the address information received from the information acquisition section 232 in the address information temporary storing area 246a of the SDRAM 246 and also outputs the address information stored in the address information temporary storing area 246a and the address information stored in the address information continuous storing area 248a of the flash memory 248 to the comparison section 241, as shown in FIG. 10.

Here, the address information stored in the address information continuous storing area 248a of the flash memory 248 is address information stored by performing the processing operation of the terminal control section 236 as described later.

Upon reception of the address information stored in the address information temporary storing area 246a of the SDRAM 246 and the address information stored in the address information continuous storing area 248a of the flash memory 248 from the terminal storage section 240, the comparison section 241 compares them to determine whether or not they differ, and outputs the comparison result to the terminal control section 236.

The communication section 242 enables the mobile telephone to connect to a network such as a public switched phone network by conducting radio communications with the nearest base station (not shown). Conversation communications may be conducted using the microphone 27 and the loudspeaker 211.

The communication section 242 reads the address information stored in the address information temporary storing area 246a of the SDRAM 246 of the terminal storage section 240 based on an instruction from the terminal control section 236, starts communications with the communication destination indicated by the address information, and acquires camera control information and a control program from the communication destination.

The communication section 242 stores the acquired camera control information and control program in a camera control information area 248b and a program area 248c of the flash memory 248 of the terminal storage section 240 respectively, as shown in FIG. 11.

Here, the camera control information refers to control information concerning image processing of AE processing, AWB processing, etc., optimized for the camera unit 24 connected to the mobile telephone 22, and also contains the image brightness reference value, the shutter MAX value, the gain MAX value, etc.

When conversation communications are conducted using the microphone 27 and the loudspeaker 211 shown in FIG. 10, if the communication section 242 is instructed by the terminal control section 236 to conduct communications with the communication destination indicated by the address information stored in the address information temporary storing area 246a, the communication section 242 starts communications with the communication destination indicated by the address information after completion of the conversation communications.

Next, the terminal control section 36 determines whether or not the camera unit 24 is attached to the mobile telephone 22 based on whether or not an attachment signal is received from the detection section 234. If the user operates the operation section 26 to start a camera mode with the camera unit 24 attached to the mobile telephone 22, the terminal control section 236 instructs the information acquisition section 232 to perform predetermined processing operation.

Upon reception of the comparison result from the comparison section 241 indicating that the address information stored in the address information temporary storing area 246a of the SDRAM 246 of the terminal storage section 240 and the address information stored in the address information continuous storing area 248a of the flash memory 248 differ, the terminal control section 236 instructs the communication section 242 to conduct communications with the communication destination indicated by the address information in the address information temporary storing area 246a.

Then, the terminal control section 236 changes the address information stored in the address information continuous storing area 248a of the flash memory 248 of the terminal storage section 240 to the same as the address information stored in the address information temporary storing area 246a of the SDRAM 246 for storage (see FIG. 11).

After the user operates the operation section 26 to start the camera mode, the terminal control section 236 controls the camera control section 230 of the camera unit 24 so as to perform the processing operation based on the camera control information stored in the terminal storage section 240.

The terminal control section 236 also instructs the image data acquisition section 238 to perform image data processing based on the camera control information retained in the camera control information area 248b of the terminal storage section 240.

Upon reception of the instruction from the terminal control section 236, the image data acquisition section 238 calculates the data corresponding to the camera control information stored in the terminal storage section 240, and selects and fetches the program, etc., corresponding to the camera control information from among the programs, etc., stored in the terminal storage section 240. Upon reception of image data from the camera unit 24, the image data acquisition section 238 performs image data processing based on the camera control information, the program, etc.

That is, the image data acquisition section 238 changes, etc., the image data fetch clock frequency, JPEG compression rate, electronic zoom ratio, the thinning-out rate in displaying on the display section 210, etc., corresponding to the camera control information and processes the image data.

The image data acquisition section 238 displays the image data received from the camera unit 24 or data provided by performing predetermined processing for the image data on the display section 210 or stores the image data or the data in the terminal storage section 240. The image data can also be stored in an external storage section (not shown) and can also be retained in an external server through the communication section 242.

To store the image data in the terminal storage section 240, the image data acquisition section 238 once stores the image data received from the camera unit 24 in the image data area 246d of the SDRAM 246 as shown in FIG. 11 and then performs JPEG compression processing for the image data in the image data area 246d before storage in the image data area 248d of the flash memory 248.

Next, the processing operation of the terminal control section 236, etc., after the user operates the operation section 26 of the mobile telephone 22 to start the camera mode will be explained based on a flowchart of FIG. 12.

If the user operates the operation section 26 to select the camera mode from among various functions of the mobile telephone 22, the terminal control section 236 determines whether or not the camera unit 24 is attached to the mobile telephone 22 based on whether or not an attachment signal is received from the detection section 234 (step S101).

If an attachment signal is received from the detection section 234 (YES at step S101), the camera mode is started and the process goes to step S102. If an attachment signal is not received (NO at step S101), the camera mode is not started and the processing operation is terminated.

At step S102 at which the camera mode is started, the terminal control section 236 shown in FIG. 10 instructs the information acquisition section 232 to read the address information in the camera storage section 228 through the camera control section 230 of the camera unit 24 and store the read address information in the address information temporary storing area 246a of the SDRAM 246 of the terminal storage section 240 shown in FIG. 11.

Figure 12:
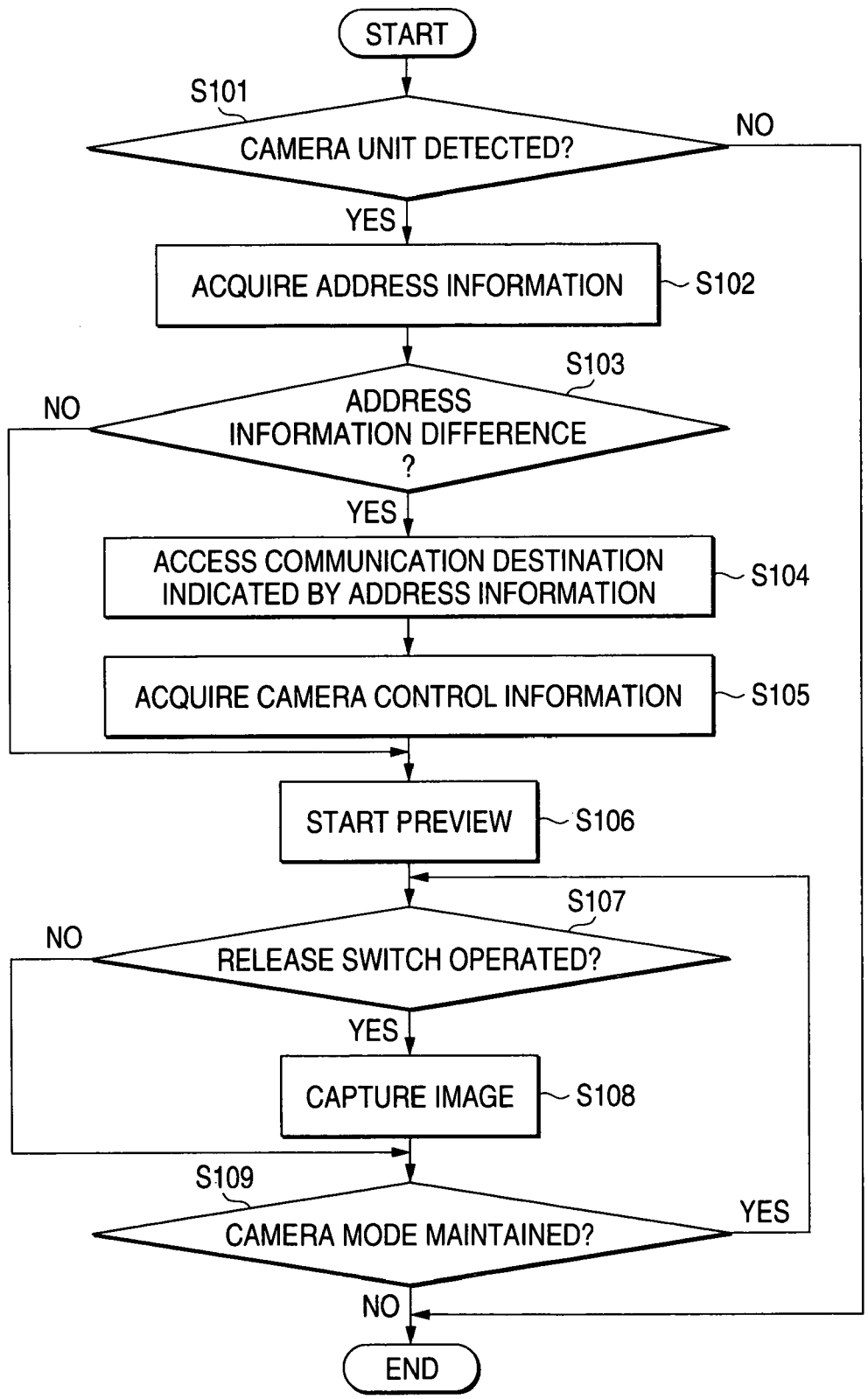
FIG. 12 is a flowchart to show an operation procedure of the mobile telephone 22 and the camera unit 24 in the second embodiment of the invention.

The comparison section 41 shown in FIG. 10 makes a comparison between the address information stored in the address information temporary storing area 246a of the SDRAM 246 of the terminal storage section 240 and the address information stored in the address information continuous storing area 248a of the flash memory 248 (step S103 in FIG. 12). If they do not differ (NO at step S103), the process goes to step S106.

If they differ (YES at step S103), the terminal control section 236 instructs the communication section 242 to start communications with the communication destination indicated by the address information stored in the address information temporary storing area 246a of the SDRAM 246 of the terminal storage section 240 (step S104).

The communication section 242 acquires the camera control information, the control program, etc., and stores the camera control information, the control program, etc., in the camera control information area 248b, the program area 248c, etc., of the flash memory 248 (step S105).

At steps S106 to S109, the terminal control section 236 causes the image data acquisition section 238 and the camera control section 230 of the camera unit 24 shown in FIG. 10 to perform the processing operation based on the camera control information, the control program, etc., stored in the flash memory 248.

That is, at step S106, preview of the display section 210 is started and the image data of an image picked up by the image pickup section 226 of the camera unit 24 is subjected to predetermined image processing by the camera control section 230 and the image data acquisition section 238 for display on the display section 210 until the user operates the operation section 26 to terminate the camera mode at step S109 (YES at step S109).

When the user operates the release switch 214 (YES at step S107), the terminal control section 236 stores the current image data in the terminal storage section 240 (step S108). Unless the user operates the operation section 26 to terminate the camera mode (NO at step S109), the mobile telephone 22 repeats steps S107 and S108.

According to the mobile telephone camera unit system and the mobile telephone 22 and the camera unit 24 used with the mobile telephone camera unit system according to the second embodiment, even when the mobile telephone 22 cannot perform the optimum processing operation for a different type of new attached camera unit 24, communications can be conducted with the communication destination indicated by the address information stored in the camera storage section 228 of the camera unit 24 for newly acquiring the camera control information, etc., corresponding to the camera unit 24 from the communication destination, so that the optimum processing operation corresponding to the camera unit 24 can be performed.

A comparison is made between the address information in the camera unit 24 and the address information retained in the mobile telephone 22 and new camera control information and control program are acquired only if the former address information and the latter address information differ, so that the number of communication times can be minimized.

The second object of the second embodiment of the invention is to provide a terminal camera unit system, a camera unit, and a terminal to which and from which the camera unit can be attached and can be detached, wherein the terminal can perform the optimum processing operation according to a camera unit attached to the terminal.

Third Embodiment

Next, a mobile telephone camera unit system (corresponding to portable terminal camera unit system) and a mobile telephone 250 (corresponding to portable terminal) and a camera unit 252 used with the mobile telephone camera unit system according to the third embodiment of the invention will be explained based on FIGS. 7 to 9, 13, and 14. Parts similar to those of the mobile telephone 22 and the camera unit 24 according to the second embodiment previously described with reference to the accompanying drawings are denoted by the same reference numerals and a similar configuration will not be explained again.

Figure 13:
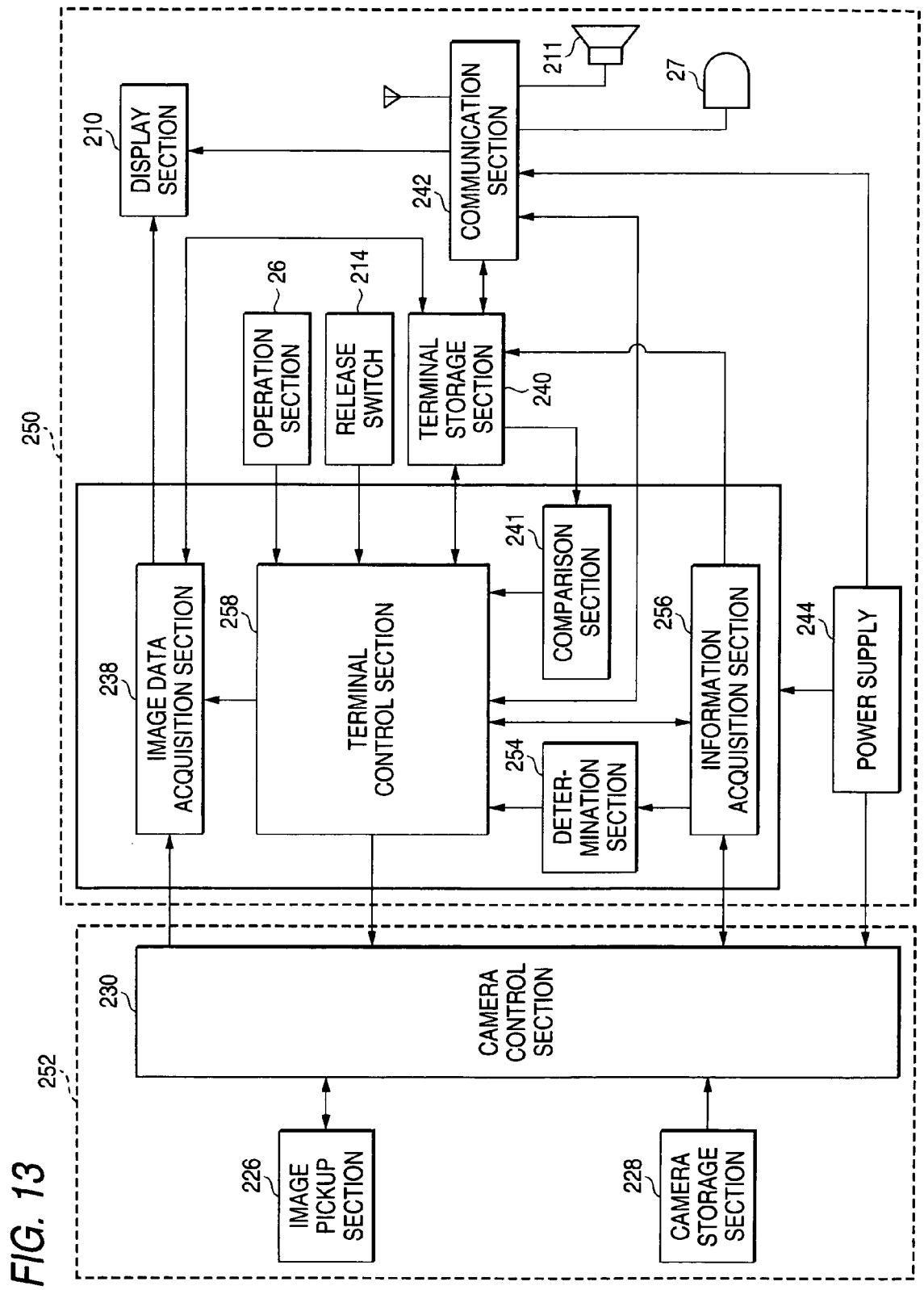
FIG. 13 is a circuit block diagram of the mobile telephone 250 and the camera unit 252 according to the third embodiment of the invention.

The mobile telephone 250 according to the third embodiment differs from the mobile telephone 22 according to the second embodiment in that it includes a determination section 254 in place of the detection section 234 in the second embodiment, as shown in FIG. 13.

An information acquisition section 256 and a terminal control section 258 of the mobile telephone 250 according to the third embodiment differ in part of the processing operation from the information acquisition section 232 and the terminal control section 236 in the second embodiment.

That is, the information acquisition section 256 reads address information from camera storage section 228 of the camera unit 252 based on an instruction of the terminal control section 258 and then retains the address information unlike the information acquisition section in the second embodiment.

Therefore, if the camera unit 252 is attached to the mobile telephone 250, the information acquisition section 256 can read and retain the address information from the camera storage section 228 of the camera unit 252, but if the camera unit 252 is not attached to the mobile telephone 250, the information acquisition section 256 cannot read the address information for storing.

When the information acquisition section 256 can retain the address information, the determination section 254 determines that the camera unit 252 is attached to the mobile telephone 250, and outputs an attachment signal to the effect that the camera unit 252 is attached to the mobile telephone 250 to the terminal control section 258. When the information acquisition section 256 cannot retain the address information, no signal is output to the terminal control section 258.

When the user operates operation section 26 to start a camera mode, immediately the terminal control section 258 instructs the information acquisition section 256 to read the address information from the camera storage section 228 of the camera unit 252.

Upon reception of the attachment signal to the effect that the camera unit 252 is attached to the mobile telephone 250 from the determination section 254, the terminal control section 258 instructs the information acquisition section 256 to store the retained address information in the terminal storage section 240.

Figure 14:
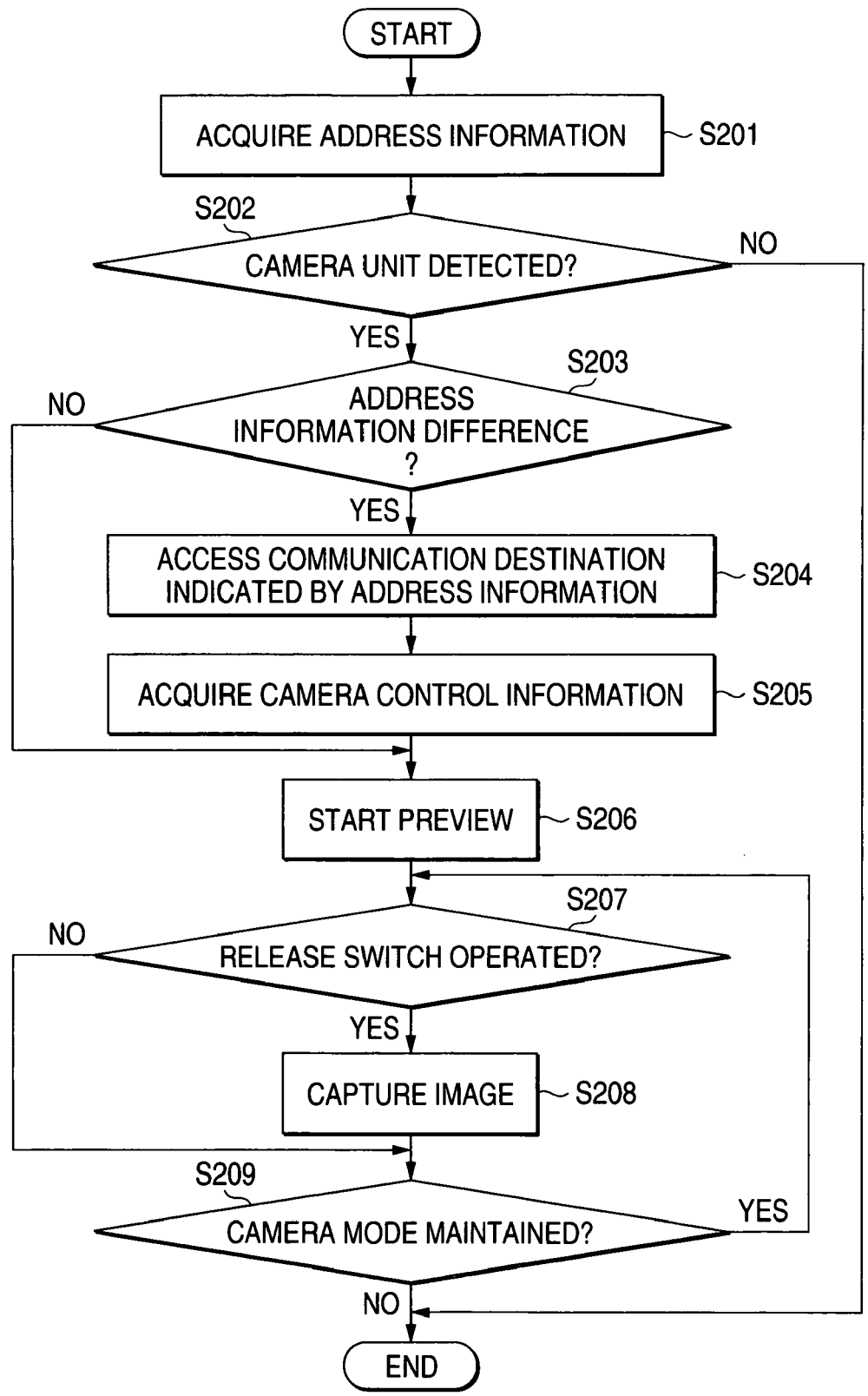
FIG. 14 is a flowchart to show an operation procedure of the mobile telephone 250 and the camera unit 252 in the third embodiment of the invention.

Next, the processing operation of the terminal control section 258, etc., after the user operates the operation section 26 of the mobile telephone 250 to start the camera mode will be explained based on a flowchart of FIG. 14.

If the user operates the operation section 26 to select the camera mode from among various functions of the mobile telephone 250, immediately the information acquisition section 256 reads the address information from the camera storage section 228 of the camera unit 252 based on an instruction of the terminal control section 258 (step S201).

Upon reception of an attachment signal from the determination section 254 (YES at step S202), the terminal control section 258 causes the information acquisition section 256 to store the address information stored in the information acquisition section 256 in the terminal storage section 240 and a transition to the camera mode is made and the process goes to step S203. If an attachment signal is not received (NO at step S202), the processing operation is terminated without making a transition to the camera mode.

The mobile telephone 250 and the camera unit 252 perform similar processing operation to that at steps S103 to S109 in FIG. 12 in the second embodiment at steps S203 to S209 after making the transition to the camera mode.

According to the mobile telephone camera unit system and the mobile telephone 250 and the camera unit 252 used with the mobile telephone camera unit system according to the third embodiment, even when the mobile telephone 250 cannot perform the optimum processing operation for a new attached camera unit 252, communications can be conducted with the communication destination indicated by the address information stored in the camera storage section 228 of the camera unit 252 for newly acquiring the camera control information, etc., corresponding to the camera unit 252 from the communication destination, so that the portable terminal 250 can perform the optimum processing operation corresponding to the camera unit 252 as in the third embodiment.

Fourth Embodiment

Next, a mobile telephone camera unit system (corresponding to portable terminal camera unit system) and a mobile telephone 260 (corresponding to portable terminal) and a camera unit 262 used with the mobile telephone camera unit system according to the fourth embodiment of the invention will be explained based on FIGS. 7 to 10, 15, and 16. Parts similar to those of the mobile telephone 22 and the camera unit 24 according to the second embodiment previously described with reference to the accompanying drawings are denoted by the same reference numerals and a similar configuration will not be explained again.

As shown in FIG. 10, the circuit configuration of the mobile telephone 260 and the camera unit 262 according to the fourth embodiment is similar to that of the mobile telephone 22 and the camera unit 24 according to the second embodiment, but the camera storage section 228 of the camera unit 262 according to the fourth embodiment stores not only address information similar to that in the second embodiment, but also identification information corresponding to the type of camera unit 262.

Figure 15:
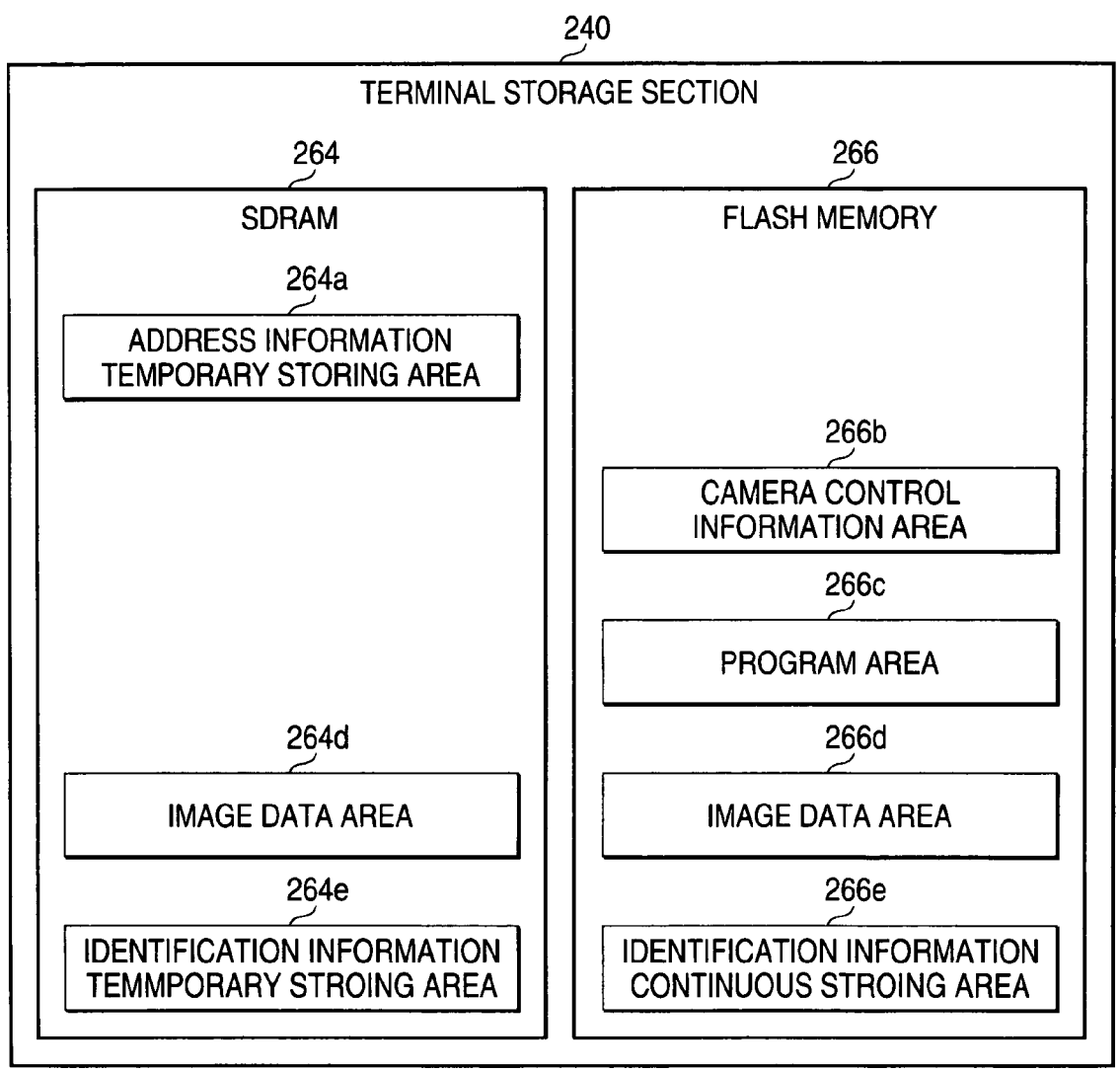
FIG. 15 is a conceptual drawing to show the configuration of a terminal storage section 240 in the fourth and fifth embodiments of the invention.

The terminal storage section 240 of the mobile telephone 260 is made up of SDRAM 264 and flash memory 266 as shown in FIG. 15. The SDRAM 264 is provided not only with an address information temporary storing area 264a and an image data area 264d similar to those in the second embodiment, but also with an identification information temporary storing area 264e.

The flash memory 266 is provided not only with a camera control information area 266b, a program area 266c, and an image data area 266d similar to those in the second embodiment, but also with an identification information continuous storing area 266e. The flash memory 266 is not provided with a storage area corresponding to the address information continuous storing area 248a in the second embodiment (see FIG. 11).

The information acquisition section 232 shown in FIG. 10 reads not only the address information, but also the identification information from the camera storage section 228 of the camera unit 262 and stores the address information and the identification information in the terminal storage section 240. The identification information is stored in the identification information temporary storing area 264e of the SDRAM 264 as shown in FIG. 15.

Unlike the comparison section 241 in the second embodiment, a comparison section 241 in the fourth embodiment shown in FIG. 10 makes a comparison between the identification information stored in the identification information temporary storing area 264e of the SDRAM 264 and the identification information stored in the identification information continuous storing area 266e of the flash memory 266 instead of comparing the address information.

Upon reception of the comparison result from the comparison section 241 indicating that the identification information stored in the identification information temporary storing area 264e of the SDRAM 264 shown in FIG. 15 and the identification information stored in the identification information continuous storing area 266e of the flash memory 266 differ, the terminal control section 236 changes the identification information stored in the identification information continuous storing area 266e of the flash memory 266 to the same as the identification information in the identification information temporary storing area 264e of the SDRAM 264 for storage.

Next, the processing operation of the terminal control section 260, etc., after the user operates operation section 26 of the mobile telephone 260 to start a camera mode will be explained based on a flowchart of FIG. 16.

Steps S301 and S304 to S309 are performed like steps S101 and S104 to S109 in FIG. 12 in the second embodiment.

At step S302, the information acquisition section 232 reads the address information and the identification information in the camera storage section 228 through the camera control section 230 of the camera unit 262 based on an instruction from the terminal control section 236 as shown in FIG. 10 and stores the address information and the identification information in the address information temporary storing area 264a and the identification information temporary storing area 264e of the SDRAM 264, respectively, as shown in FIG. 15.

Figure 16:
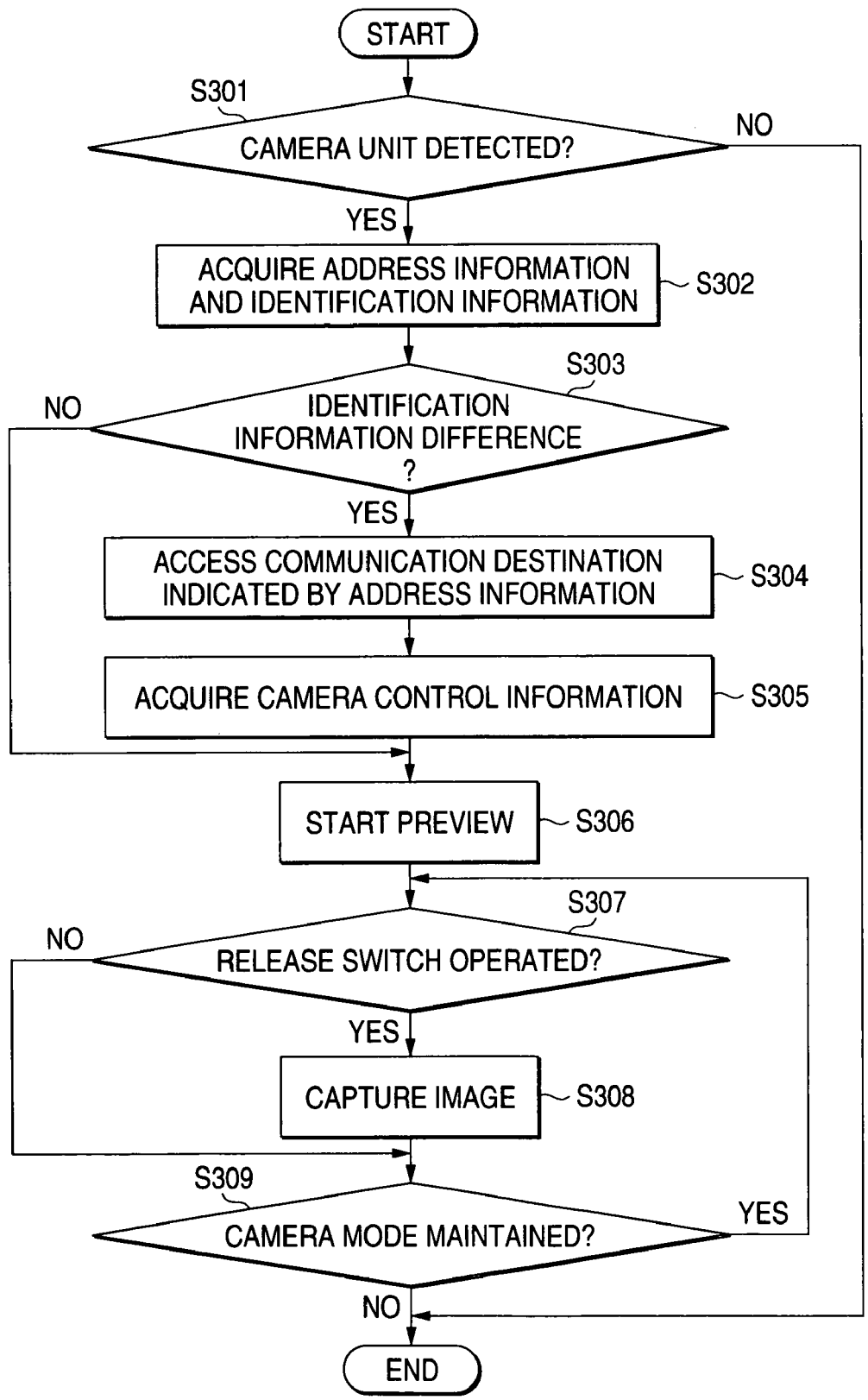
FIG. 16 is a flowchart to show an operation procedure of the mobile telephone 260 and the camera unit 262 in the fourth embodiment of the invention.

At step S303 in FIG. 16, the comparison section 241 makes a comparison between the identification information stored in the identification information temporary storing area 264e of the SDRAM 264 of the terminal storage section 240 and the identification information stored in the identification information continuous storing area 266e of the flash memory 266.

According to the mobile telephone camera unit system and the mobile telephone 260 and the camera unit 262 used with the mobile telephone camera unit system according to the fourth embodiment, even when the mobile telephone 260 cannot perform the optimum processing operation for a new attached camera unit 262, communications can be conducted with the communication destination indicated by the address information stored in the camera storage section 228 of the camera unit 262 for newly acquiring the camera control information, etc., corresponding to the camera unit 262 from the communication destination, so that the optimum processing operation corresponding to the camera unit 262 can be performed as in the second and third embodiments.

In the fourth embodiment, by way of example, the address information is stored in the camera storage section 228 of the camera unit 262, but the invention is not limited to it. The address information may be stored in the terminal storage section 240 of the mobile telephone 260.

Fifth Embodiment

Next, a mobile telephone camera unit system (corresponding to portable terminal camera unit system) and a mobile telephone 2100 (corresponding to portable terminal) and a camera unit 2101 used with the mobile telephone camera unit system according to the fifth embodiment of the invention will be explained based on FIGS. 7 to 10 and 17. Parts similar to those of the mobile telephone 22 and the camera unit 24 according to the second embodiment previously described with reference to the accompanying drawings are denoted by the same reference numerals and a similar configuration will not be explained again.

As shown in FIG. 10, the circuit configuration of the mobile telephone 2100 and the camera unit 2101 according to the fifth embodiment is similar to that of the mobile telephone 22 and the camera unit 24 according to the second embodiment, but the terminal storage section 240 of the mobile telephone 2100 according to the fifth embodiment stores not only address information shown in the second embodiment, but also portable terminal model information corresponding to the model of mobile telephone.

The camera storage section 228 of the camera unit 2101 according to the fifth embodiment stores not only address information similar to that in the second embodiment, but also camera model information corresponding to the model of camera unit 2101.

Further, the terminal storage section 240 of the mobile telephone 2100 is made up of SDRAM 264 and flash memory 266 like the terminal storage section previously described with reference to FIG. 15 in the fourth embodiment. In the fifth embodiment, however, the SDRAM 264 is provided with a camera model information temporary storing area (not shown) and the flash memory 266 is provided with a camera model information storing area (not shown).

The information acquisition section 232 shown in FIG. 10 reads not only the address information, but also the camera model information from the camera storage section 228 of the camera unit 2101 and stores the address information and the camera model information in the terminal storage section 240. The camera model information is stored in the camera model information temporary storing area of the SDRAM 264.

Figure 17:
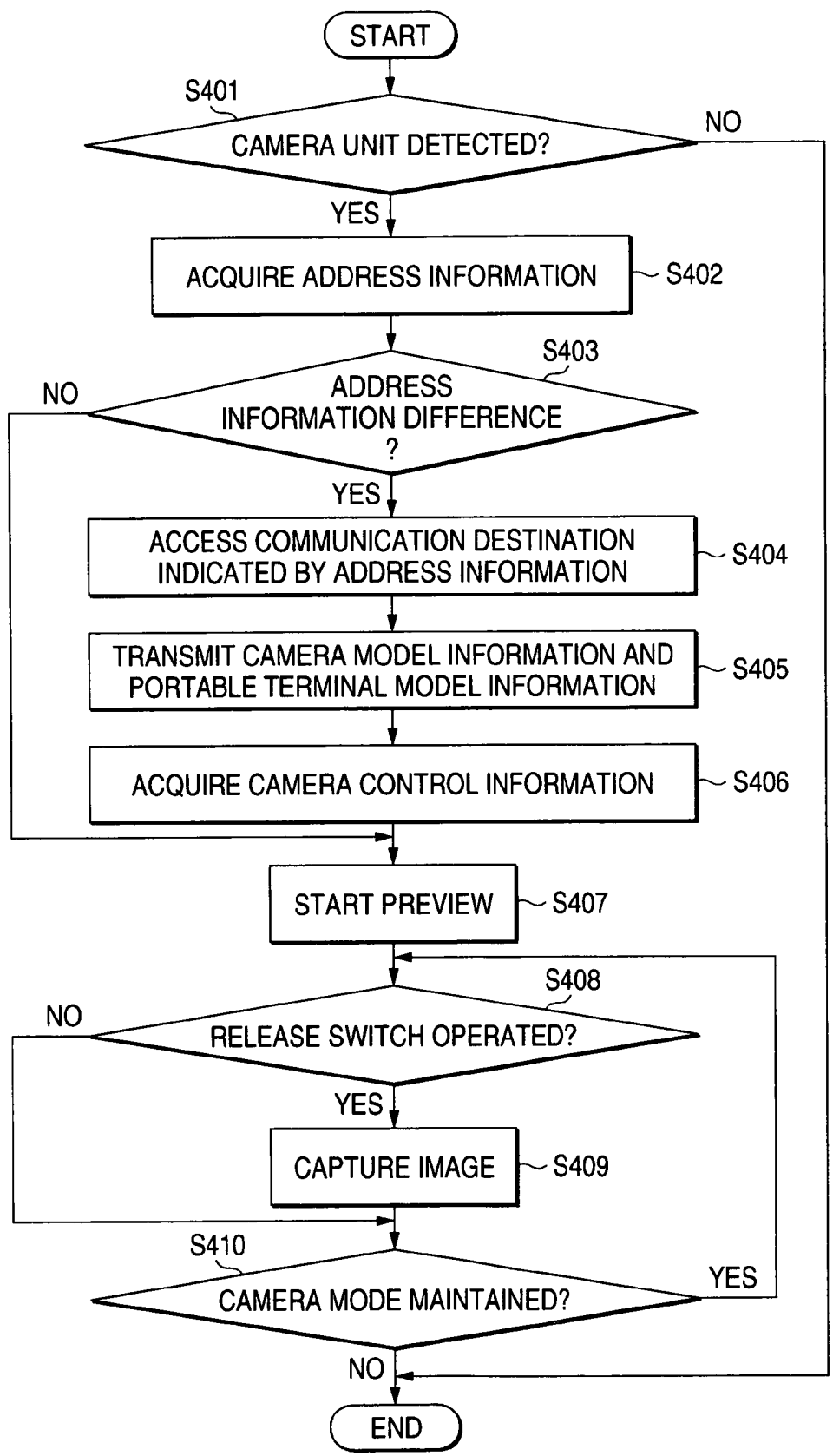
FIG. 17 is a flowchart to show an operation procedure of the mobile telephone 2100 and the camera unit 2101 in the fifth embodiment of the invention.
Figure 18:
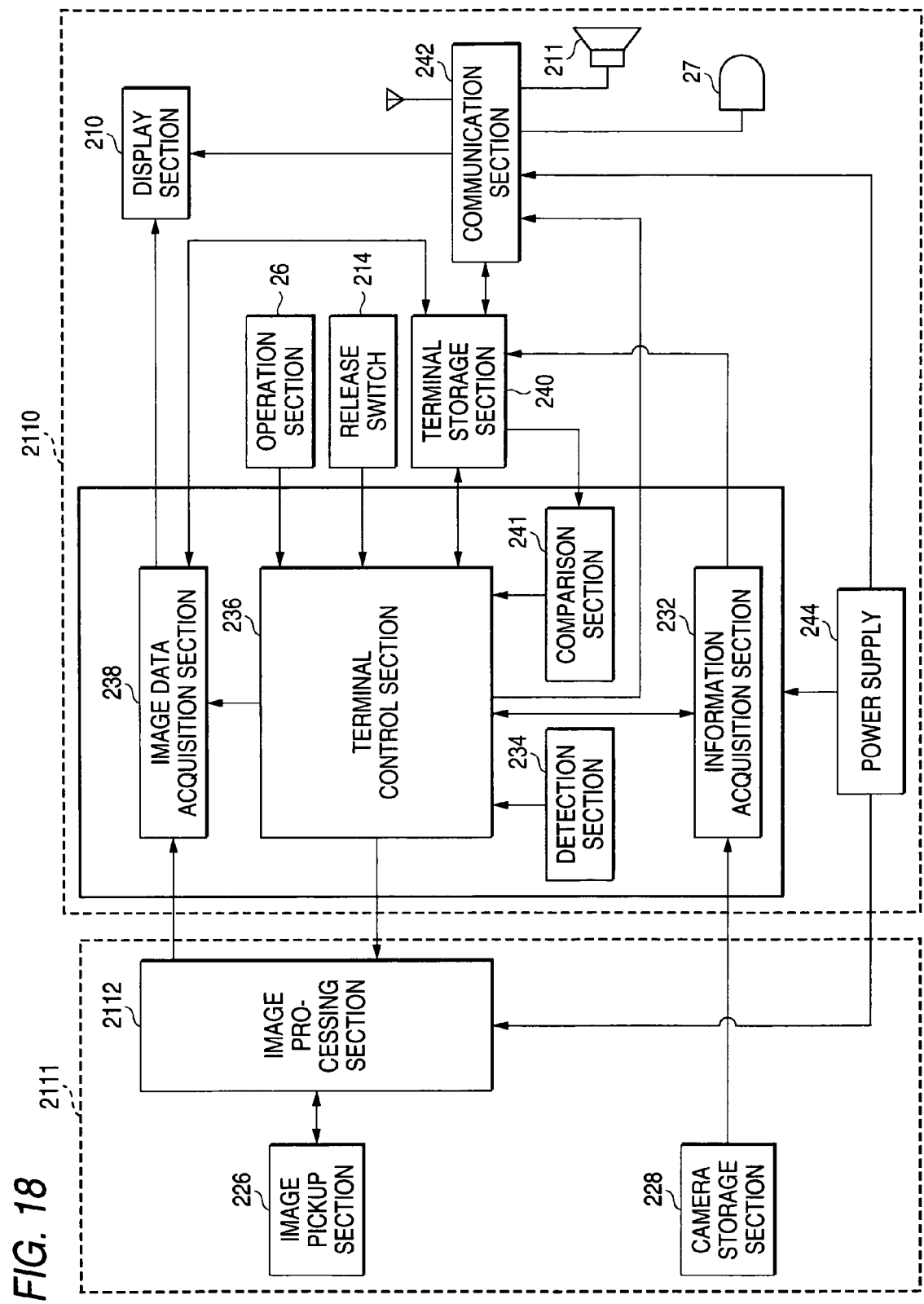
FIG. 18 is a circuit block diagram of a mobile telephone 2110 and a camera unit 2111 according to a different embodiment from the second to fifth embodiments of the invention.

Next, the processing operation of the terminal control section 236, etc., after the user operates operation section 26 of the mobile telephone 2100 to start a camera mode will be explained based on a flowchart of FIG. 17.

Steps S401, S403, S404, and S407 to S410 are performed like steps S101, S103, S104, and S106 to S109 in FIG. 12 in the second embodiment.

At step S402, the information acquisition section 232 reads the address information and the camera model information in the camera storage section 228 through the camera control section 230 of the camera unit 2101 based on an instruction from the terminal control section 236 as shown in FIG. 10 and stores the address information and the camera model information in an address information temporary storing area 264a of the SDRAM 264 and the camera model information temporary storing area (not shown).

At step S405, the communication section 242 reads the camera model information stored in either the camera model information temporary storing area of the SDRAM 264 (not shown) or the camera model information storing area of the flash memory 266 (not shown) or indirectly reads the camera model information through the terminal control section 236, and transmits the camera model information to the communication destination indicated by the address information. The communication section 242 also reads the portable terminal model information stored in the terminal storage section 240 and transmits the portable terminal model information to the communication destination indicated by the address information.

Various pieces of camera control information and various control programs corresponding to a plurality of camera unit models and a plurality of mobile telephone models are retained in the communication destination indicated by the address information, and the optimum camera control information and control program are selected and transmitted to the mobile telephone 2100 in response to the camera model information and the portable terminal model information transmitted according to a configuration not shown.

At step S406, the communication section 242 acquires the camera control information and the control program and stores the camera control information and the control program in a camera control information area 266*b* and a program area 266*c* of the flash memory 266.

According to the mobile telephone camera unit system and the mobile telephone 2100 and the camera unit 2101 used with the mobile telephone camera unit system according to the fifth embodiment, even when the mobile telephone 2100 cannot perform the optimum processing operation for a new attached camera unit 2101, communications can be conducted with the communication destination indicated by the address information stored in the camera storage section 228 of the camera unit 2101 for newly acquiring the camera control information, etc., corresponding to the camera unit 2101 from the communication destination, so that the mobile telephone 2100 can perform the optimum processing operation corresponding to the camera unit 2101 as in the second to fourth embodiments.

Since the optimum camera control information is acquired in response to the model of camera unit 2101 and the model of mobile telephone 2100, for example, camera units 2101 compatible with various mobile telephones provided by different carriers can be provided and it is not necessary to provide transmission destinations of different addresses in response to the type of camera unit or the model of mobile telephone.

In the third embodiment described above, the comparison section 241 shown in FIG. 13 compares the address information, but may compare the identification information as in the fourth embodiment.

In such a case, the camera storage section 228 of the camera unit 252 stores not only the address information, but also the identification information, the SDRAM 246 and the flash memory 248 of the terminal storage section 240 of the mobile telephone 250 are provided with an identification information temporary storing area and an identification information continuous storing area, and the information acquisition section 256 reads both the address information and the identification information from the camera storage section 228 and stores the address information and the identification information in the terminal storage section 240.

In the fourth embodiment described above, at step S303 in FIG. 16, the comparison section 241 compares the identification information and if the identification information differs (YES at step S303), at steps S304 and S305, the communication section 242 conducts communications with the communication destination indicated by the address information stored in the address information temporary storing area 264*a* of the SDRAM 264 shown in FIG. 15. However, predetermined address information may be previously stored in the flash memory 266 and communications may be conducted with the communication destination indicated by the predetermined address information stored in the flash memory 266.

In the second or fifth embodiment described above, by way of example, the mobile telephone 22 or 2100 of the portable terminal camera unit system of the invention is provided with the detection section 234 for detecting attachment of the camera unit 24 or 2101. However, the invention is not limited to it. For example, the camera unit 24 or 2101 may be provided with similar detection section for sending the detection result directly to the mobile telephone 22 or 2100 or detection section for once sending the detection result to the camera unit 24 or 2101, which then sends the detection result to the mobile telephone 22 or 2100.

Further, when the camera unit 24 or 2101 is attached to the mobile telephone 22 or 2100, as the camera unit 24 or 2101 receives power supply from the power supply 244 and is energized, the camera control section 230 (which may be a microcomputer, etc., for example) of the camera unit 24 or 2101 may notify the terminal control section 236 that the camera unit 24 or 2101 is attached to the mobile telephone 22 or 2100 through a communication pass or a port.

In the second to fifth embodiments described above, by way of example, the mobile telephone 22, 250, 260, 2100 of the portable terminal camera unit system of the invention retains the address information in the address information temporary storing area 246*a*, 264*a* of the volatile SDRAM 246, 264 of the terminal storage section 240, but the invention is not limited to it. The address information may be retained in nonvolatile memory. For example, the address information may be retained in storage section only for storing the address information provided uniquely in the mobile telephone 22, 250, 260, 2100 or a storage medium such as a memory card that can be attached to and detached from the terminal.

In the second to fifth embodiments described above, by way of example, the portable terminal camera unit system of the invention acquires the address information from the camera storage section 228 through the camera control section 230 by the information acquisition section 232, 256 of the mobile telephone 22, 250, 260, 2100 as shown in FIGS. 10 and 13, but the invention is not limited to it.

For example, as a different embodiment from the second to fifth embodiments described above, a camera unit 2111 may include an image processing section 2112 not connected to the camera storage section 228 in place of the camera control section 230 in the second embodiment and information acquisition section 232 of a mobile telephone 2110 may acquire the address information directly from the camera storage section 228 of the camera unit 2111 or the camera storage section 228 may directly provide the information acquisition section 232 with the address information.

Alternatively, the address information may be sent from the camera storage section 228 of the camera unit 24 indirectly to the information acquisition section 232 through the camera control section 230 in FIG. 10 used to describe the second embodiment. The information acquisition section 232, 256, the comparison section 241, and the terminal storage section 240 may be implemented as a microcomputer, etc., integral with the terminal control section 236, 258.

In the second to fifth embodiments described above, by way of example, in the portable terminal camera unit system of the invention, the camera control information and the control program acquired from the outside are stored in the flash memory 248, 266 of the terminal storage section 240 of the mobile telephone 22, 250, 260, 2100, but the invention is not limited to it. For example, the camera unit may be provided with storage section for storing the camera control information and the control program and the camera control section 230 may control the image pickup section 226 or the image data acquisition section 238 according to the camera control information and the control program stored in the storage section.

In the second to fifth embodiments described above, by way of example, in the portable terminal camera unit system of the invention, the image data acquisition section 238 is provided in the mobile telephone 22, 250, 260, 2100 and the camera control section 230 is provided in the camera unit 24, 252, 262, 2101, but the invention is not limited to it. The image data acquisition section 238 may be placed in the camera unit 24, 252, 262, 2101; in addition, only the image pickup section 226 and the camera storage section 228 may be placed in the camera unit 24, 252, 262, 2101 and the camera control section 230 may be placed in the mobile telephone 22, 250, 260, 2100.

In the second to fifth fourth embodiments described above, the portable terminals used with the portable terminal camera unit system of the invention are the mobile telephones 22, 250, 260, and 2100. However, the portable terminals that can be used with the portable terminal camera unit system of the invention are not limited to the mobile telephone 22, 250, 260, 2100; for example, any other portable terminal such as a PDA including a communication function may be used.

Sixth to twelfth embodiments of a terminal camera unit system and a terminal and a camera unit used with the terminal camera unit system according to the invention will be specifically explained based on the accompanying drawings.

Sixth Embodiment

FIGS. 19 to 24 are drawings referenced for describing a mobile telephone camera unit system (corresponding to terminal camera unit system) and a mobile telephone 32 (corresponding to terminal) and a camera unit 34 used with the mobile telephone camera unit system according to the sixth embodiment of the invention.

Figure 19:
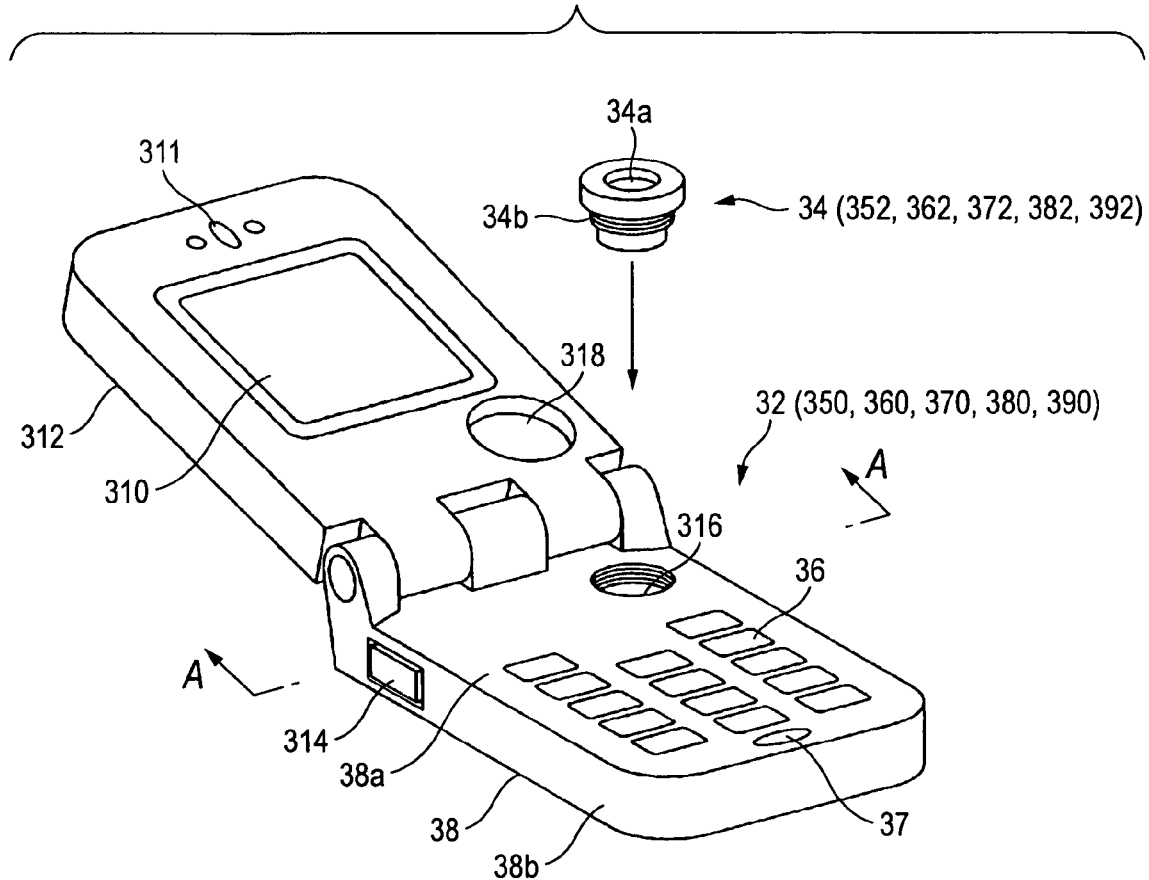
FIG. 19 is a perspective view to show mobile telephone 32, 350, 360, 370, 380, 390 and camera unit 34, 352, 362, 372, 382, 392 according to sixth to eleventh embodiments of the invention.

As shown in FIG. 19, the mobile telephone 32 according to the sixth embodiment includes a first housing 38 having an operation section 36 made up of a ten-key numeric pad, etc., and a microphone 37 and a second housing 312 having a display section 310 such as an LCD (liquid crystal display) and a loudspeaker 311, the first and second housings being joined to each other in a foldable manner.

The operation section 36 is placed on an operation face 38a of the first housing 38. A release switch 314 for causing the camera unit 34 to perform the photographing operation is provided on a side face 38b parallel in the length direction of the first housing 38 and adjacent with the operation face 38a.

Although not shown, when the first housing 38 and the second housing 312 are placed in a fold state, the operation face 38a and the display face of the display section 310 face each other and are prevented from being exposed to the outside.

As shown in FIG. 19, the camera unit 34 can be attached to and detached from the mobile telephone 32 and the mobile telephone 32 also enables the user to replace the camera unit 34 with another type of camera unit.

The camera unit 34 has an image pickup device such as a CCD (not shown) and an image pickup lens 34a, and the image pickup device is placed inside the camera unit 34. The image pickup lens 34a is placed on one end face of the length of the camera unit 34 on the image pickup axis of the image pickup device and in the image pickup axis direction and is exposed to the outside. The camera unit 34 has a male screw part 34b (corresponding to engagement part) on the outer periphery of the intermediate part of the length in the image pickup axis direction.

A female screw part 316 (corresponding to attachment part) corresponding to the male screw part 34b of the camera unit 34 is provided in the first housing 38 so as to open to the operation face 38a. The camera unit 34 is inserted into the female screw part 316 from the end part opposite to the end part on the side of the image pickup lens 34a and the male screw part 34b and the female screw part 316 are fastened, whereby the camera unit 34 is attached to the first housing 38.

Figure 20:
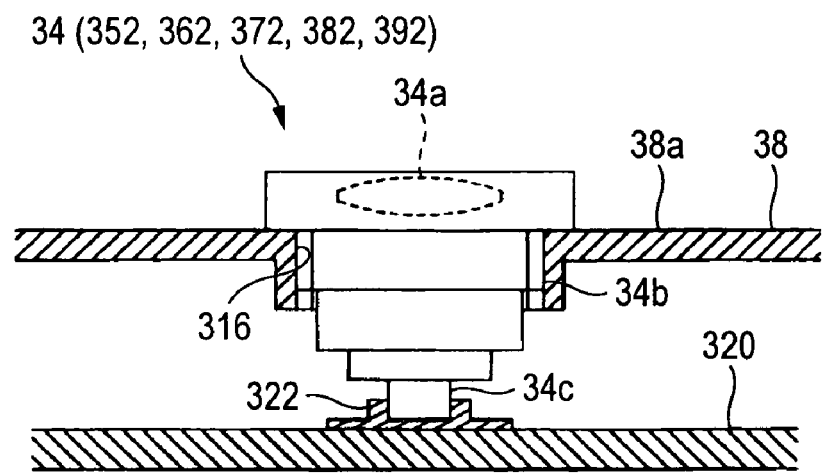
FIG. 20 is a sectional view taken on line A-A in FIG. 19 to show a state in which the camera unit 34, 352, 362, 372, 382, 392 is attached to a female screw part 316 of the mobile telephone 32, 350, 360, 370, 380, 390 according to the sixth to eleventh embodiments of the invention.

When the camera unit 34 is attached to the first housing 38, the end part on the side of the image pickup lens 34a in the image pickup axis direction is fixed in a state in which the end part projects from the operation face 38a (see FIG. 20). Thus, the second housing 312 is formed with a recess part 318 of a predetermined shape at the position corresponding to the female screw part 316 on the face opposed to the operation face 38a of the first housing 38 when the mobile telephone is folded, as shown in FIG. 19. The internal space of the recess part 318 is formed so as to be able to house the end part on the side of the image pickup lens 34a projecting from the operation face 38a of the camera unit 4 when the first housing 38 and the second housing 312 are folded mutually.

As shown in FIG. 20, the camera unit 34 has a connector 34c at the end part opposite to the end part on the side of the image pickup lens 34a in the image pickup axis direction, and the connector 34c engages with a connector 322 provided on a wiring board 320 in the first housing 38 for conduction of electricity.

Figure 21:
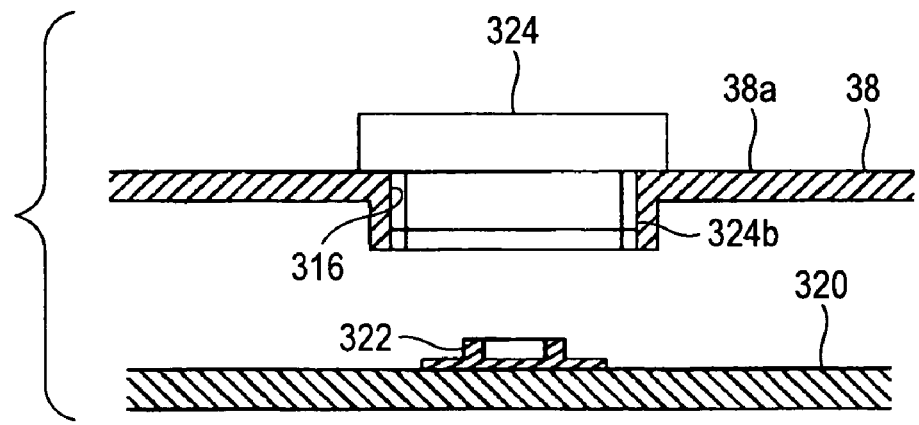
FIG. 21 is a sectional view taken on line A-A in FIG. 19 to show a state in which a cover unit 324 is attached to the female screw part 316 of the mobile telephone 32, 350, 360, 370, 380, 390 according to the sixth to eleventh embodiments of the invention.

As shown in FIG. 21, if the user does not attach the camera unit 34 to the first housing 38 because of not using the image pickup function, the user can attach a cover unit 324 to the first housing 38 in place of the camera unit 34.

The cover unit 324 is formed with a male screw part 324b (corresponding to engagement part) which is the same as the male screw part 34b of the camera unit 34 and thus can be fastened to the female screw part 316 of the first housing 38 by the screw as with the camera unit 34.

Figure 22:
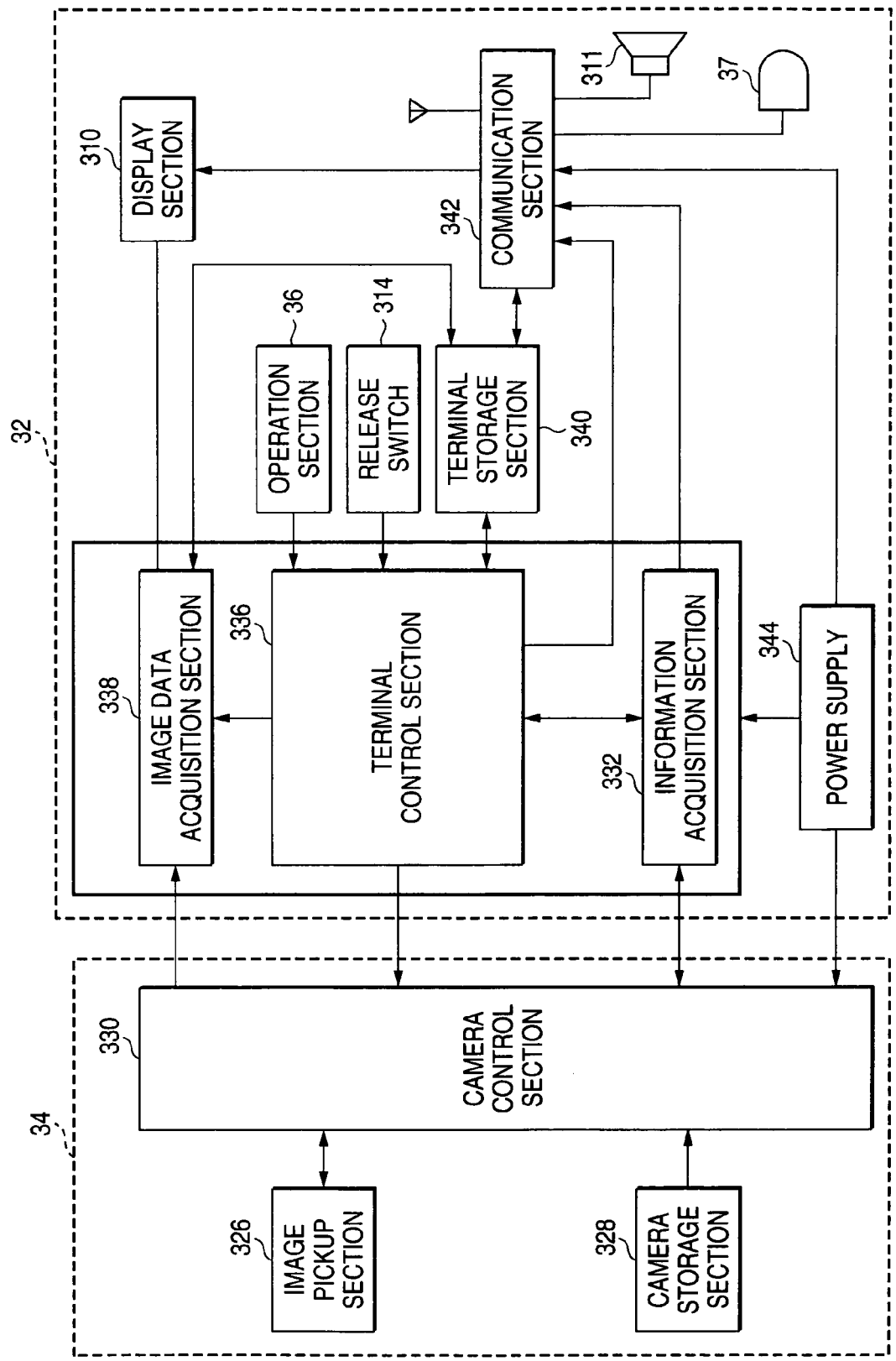
FIG. 22 is a circuit block diagram of the mobile telephone 32 and the camera unit 34 according to the sixth embodiment of the invention.

Next, the circuit configuration of the mobile telephone 32 and the camera unit 34 will be explained. FIG. 22 is a block diagram to show the circuit configuration in a state in which the camera unit 34 is attached to the mobile telephone 32.

The camera unit 34 includes an image pickup section 326, a camera storage section 328, and a camera control section 330 for controlling them. The image pickup section 326 is made up of the image pickup lens 34a previously described with reference to FIG. 19, an image pickup device (not shown), etc.

The camera storage section 328 shown in FIG. 22 is nonvolatile memory for storing address information to specify a predetermined communication destination (called party). For example, address information desired by the user of the owner of the camera unit 34 can be set in the camera storage section 328.

The address information contains not only information specifying the location of a home page on the Internet such as URL (Uniform Resource Locator), but also a specific telephone number and any other notation to specify the location of an information source that can be connected via a communication network like specification of a specific server, etc., connected to the communication network. URL, etc., may be incomplete representation of the communication destination if it can identify the communication destination.

If the camera control section 330 receives a signal for making a request to transfer the address information in the camera storage section 328 from an information acquisition section 332 of the mobile telephone 32 (described later), the camera control section 330 performs first processing operation of reading the address information from the camera storage section 328 and outputting the address information to the information acquisition section 332.

If the camera control section 330 receives an instruction from a terminal control section 336 of the mobile telephone 32 (described later), the camera control section 330 performs second processing operation of controlling the image pickup section 326 based on the instruction.

The camera control section 330 also performs third processing operation of performing AE (Auto Exposure) processing or AWB (Auto White Balance) processing for RGB raw data concerning color output as data for each pixel from the image pickup section 326 and outputting the processing result to an image data acquisition section 338 of the mobile telephone 32 (described later) based on an instruction of the terminal control section 336.

The AE processing refers to processing of optimizing exposure, and the AWB processing refers to processing of preventing display of white in an image from taking on any other color with reception of the effect of a light source, etc., by adjusting a red gain, a blue gain, etc.

The mobile telephone 32 includes the information acquisition section 332, the terminal control section 336, the image data acquisition section 338, a terminal storage section 340, a communication section 342, and a power supply 344 in addition to the operation section 36, the microphone 37, the display section 310, the loudspeaker 311, and the release switch 14 previously described.

As shown in FIG. 20, the camera unit 34 is attached to the female screw part 316 of the mobile telephone 32 (first housing 38), the connector 34c of the camera unit 34 engages with the connector 322 of the wiring board 320, and the information acquisition section 332, the terminal control section 336, and the image data acquisition section 338 are connected to the camera control section 330 of the camera unit 34 as circuitry. When the camera unit 34 is attached to the mobile telephone 32, the power supply 344 is connected to the camera unit 34 for supplying a current thereto in addition to the circuitry in the mobile telephone 32.

Upon reception of an instruction from the terminal control section 336, the information acquisition section 332 of the mobile telephone 32 shown in FIG. 22 outputs a signal to the camera control section 330 for requesting the camera control section 330 to transfer (output) the address information in the camera storage section 328.

That is, the information acquisition section 332 reads (acquires) the address information in the camera storage section 328 through the camera control section 330. The information acquisition section 332 outputs the read address information to the communication section 342.

Figure 23:
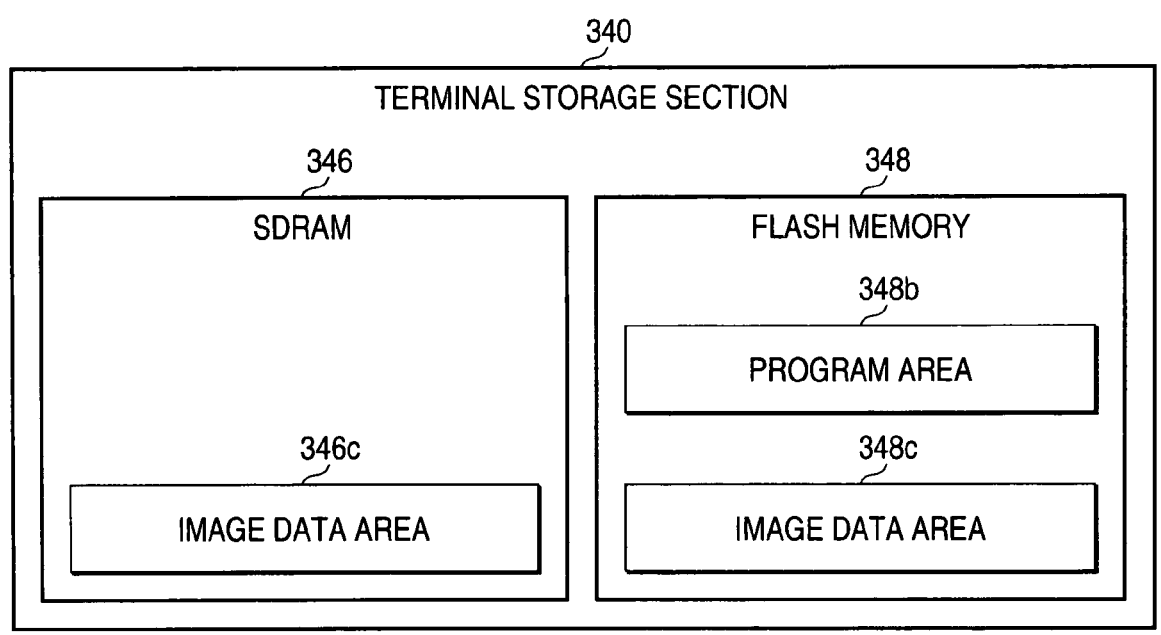
FIG. 23 is a conceptual drawing to show the configuration of a terminal storage section 340 in the sixth and seventh embodiments and twelfth embodiment of the invention.

The terminal storage section 340 is made up of volatile SDRAM 346 (Synchronous Dynamic Random Access Memory) and nonvolatile flash memory 348 whose storage contents can be rewritten, as shown in FIG. 23. The SDRAM 346 is provided with an image data area 346c, and the flash memory 348 is provided with a program area 348b and an image data area 348c.

After the user operates the operation section 36 for starting a camera mode, the terminal control section 336 shown in FIG. 22 causes the camera control section 330 of the camera unit 34 to perform the second processing operation of the camera control section 330 for operating the image pickup section 326.

When the camera mode is started, the terminal control section 336 instructs the image data acquisition section 338 to acquire the image data output from the image pickup section 326 through the camera control section 330 and causes the image data acquisition section 338 to perform predetermined processing operation (as described later) for the image data.

If the user operates the operation section 36 for terminating the camera mode during the camera mode operation, the terminal control section 336 instructs the information acquisition section 332 to acquire the address information in the camera storage section 328 of the camera unit 34.

Upon reception of an instruction from the terminal control section 336, the image data acquisition section 338 performs predetermined processing for the image data based on a program stored in the program area 348b of the terminal storage section 340 (see FIG. 23) and the like.

That is, the image data acquisition section 338 changes, etc., the image data fetch clock frequency, JPEG compression rate, electronic zoom ratio, the thinning-out rate in displaying on the display section 310, etc., as shown in FIG. 22.

The image data acquisition section 338 displays the image data received from the camera unit 34 or data provided by performing predetermined processing for the image data on the display section 310 or stores the image data or the data in the terminal storage section 340. The image data can also be stored in external storage section (not shown).

To store the image data in the terminal storage section 340, the image data acquisition section 338 once stores the image data received from the camera unit 34 in the image data area 346c of the SDRAM 346 as shown in FIG. 23 and then performs JPEG compression processing for the image data in the image data area 46c before storage in the image data area 348c of the flash memory 348.

The communication section 342 shown in FIG. 22 enables the mobile telephone to connect to a network such as a public switched phone network by conducting radio communications with the nearest base station (not shown). Conversation communications may be conducted using the microphone 37 and the loudspeaker 311.

The communication section 342 starts communications with the communication destination indicated by the address information received from the information acquisition section 332 based on an instruction from the terminal control section 336, and reads and transmits the image data in the image data area 348c of the flash memory 348 of the storage section 340 shown in FIG. 23.

When conversation communications are conducted using the microphone 37 and the loudspeaker 311 shown in FIG. 22, if the communication section 342 is instructed by the terminal control section 336 to transmit the image data to the communication destination indicated by the address information acquired by the information acquisition section 332, the communication section 342 starts communications with the communication destination indicated by the address information and transmits the image data in the terminal storage section 340 after completion of the conversation communications.

Next, the processing operation of the terminal control section 336, etc., after the user operates the operation section 36 of the mobile telephone 32 to start the camera mode will be explained based on a flowchart of FIG. 24.

If the user operates the operation section 36 shown in FIG. 22 to select the camera mode from among various functions of the mobile telephone 32, the terminal control section 336 starts the camera mode. If the camera unit 34 is not attached to the mobile telephone 32, the camera mode cannot be started and therefore the processing operation according to the flowchart of FIG. 24 is not performed.

After the mode makes a transition to the camera mode, preview of the display section 310 is started and the image data of an image picked up by the image pickup section 326 of the camera unit 34 is subjected to predetermined image processing by the camera control section 330 and the image data acquisition section 338 for display on the display section 310 until the user operates the operation section 36 to terminate the camera mode at step S1102 (YES at step S1102).

Unless the user operates the operation section 36 to terminate the camera mode (YES at step S1102), the terminal control section 336 stores the current image data in the terminal storage section 340 corresponding to operation of the release switch 314 (step S1101).

Figure 24:
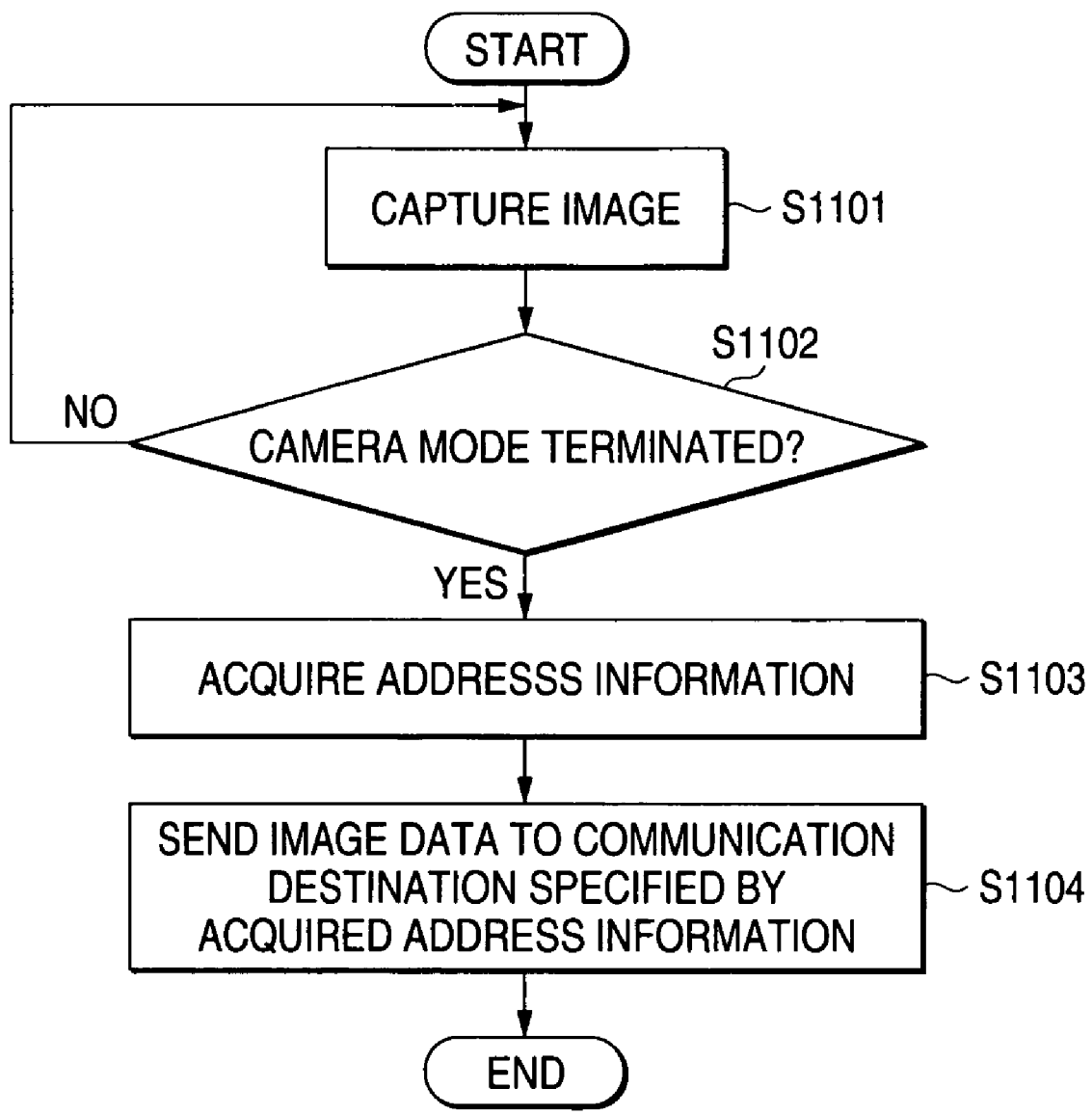
FIG. 24 is a flowchart to show an operation procedure of the mobile telephone 32 and the camera unit 34 in the sixth and seventh embodiments of the invention.

When the user operates the operation section 36 to terminate the camera mode (YES at step S1102), the terminal control section 336 instructs the information acquisition section 332 to acquire the address information in the camera storage section 328 of the camera unit 34 as shown in FIG. 22 (step S1103 in FIG. 24).

The terminal control section 336 causes the communication section 342 to transmit the image data stored in the image data area 348c of the flash memory 348 shown in FIG. 23 to the communication destination indicated by the address information acquired by the information acquisition section 332 (step S1104).

According to the mobile telephone camera unit system and the mobile telephone 32 and the camera unit 34 used with the mobile telephone camera unit system according to the sixth embodiment, the image data obtained by the camera unit 34 is always transmitted to the communication destination indicated by the address information stored in the camera storage section 328, so that the photographed image can be prevented from leaking or dispersing against user's will.

For example, if the user of the owner of the camera unit 34 takes a photograph using the mobile telephone 32 owned by another person, when the user of the owner of the camera unit 34 transmits the image photographed by him or her, the user can reliably transmit the image to the communication destination indicated by the address information stored in the camera storage section 328 of the camera unit 34, so that the photographed image can be prevented from dispersing against user's will.

The third object of the sixth embodiment of the invention is to provide a terminal camera unit system, a camera unit, and a terminal to which and from which the camera unit can be attached and can be detached, wherein a photographed image is prevented from leaking or dispersing against the user's will.

Seventh Embodiment

Next, a mobile telephone camera unit system (corresponding to terminal camera unit system) and a mobile telephone 350 (corresponding to terminal) and a camera unit 352 used with the mobile telephone camera unit system according to the seventh embodiment of the invention will be explained based on FIGS. 19 to 21 and FIGS. 23 to 25. Parts similar to those of the mobile telephone 32 and the camera unit 34 according to the sixth embodiment previously described with reference to the accompanying drawings are denoted by the same reference numerals and a similar configuration, similar processing operation, etc., will not be explained again.

In the sixth embodiment, the camera control section 330 shown in FIG. 22 performs the first processing operation of outputting the address information in the camera storage section 328 to the information acquisition section 332, the second processing operation of controlling the image pickup section 326 based on the instruction of the terminal control section 336, and the third processing operation of outputting the image data provided by performing the predetermined processing for the RGB raw data output from the image pickup section 326 to the image data acquisition section 338.

Figure 25:
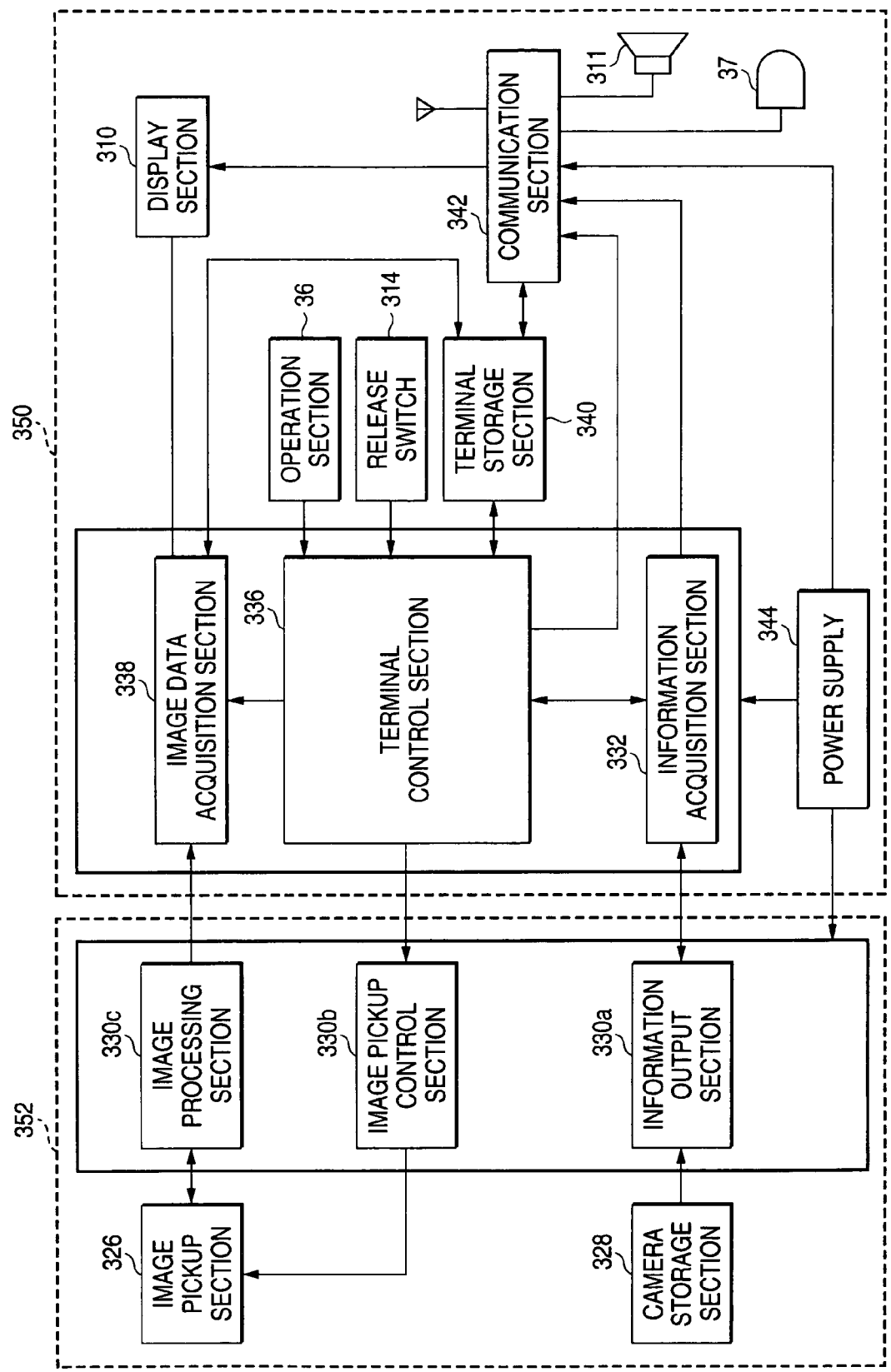
FIG. 25 is a circuit block diagram of the mobile telephone 350 and the camera unit 352 according to the seventh embodiment of the invention.

In contrast, in the seventh embodiment, the camera unit 352 includes an information output section 330a for performing only the first processing operation performed by the camera control section 330 in the sixth embodiment, an image pickup control section 330b for performing only the second processing operation, and an image processing section 330c for performing only the third processing operation in place of the camera control section 330, as shown in FIG. 25.

According to the mobile telephone camera unit system and the mobile telephone 350 and the camera unit 352 used with the mobile telephone camera unit system according to the seventh embodiment, the image data obtained by the camera unit 352 is always transmitted to the communication destination indicated by the address information stored in a camera storage section 328, so that the photographed image can be prevented from leaking or dispersing against user's will as in the sixth embodiment.

For example, if the user of the owner of the camera unit 352 takes a photograph using the mobile telephone 350 owned by another person, when the user of the owner of the camera unit 352 transmits the image photographed by him or her, the user can reliably transmit the image to the communication destination indicated by the address information stored in the camera storage section 328 of the camera unit 352, so that the photographed image can be prevented from dispersing against user's will as in the sixth embodiment.

In the seventh embodiment, the image pickup control section 330b performs the second processing operation of the camera control section 330 in the sixth embodiment, but a terminal control section 336 of the mobile telephone 350 can also perform the second processing operation so that the image pickup control section 330b is not provided.

In the eighth to twelfth embodiments described later, the camera control section 330 can also be replaced with an information output section 330a, an image pickup control section 330b, and an image processing section 330c as in the seventh embodiment, and a terminal control section 336 can perform the second processing operation performed by the image pickup control section 330b in place of the image pickup control section 330b.

Eighth Embodiment

Next, a mobile telephone camera unit system (corresponding to terminal camera unit system) and a mobile telephone 360 (corresponding to terminal) and a camera unit 362 used with the mobile telephone camera unit system according to the eighth embodiment of the invention will be explained based on FIGS. 19 to 21 and FIGS. 26 to 28. Parts similar to those of the mobile telephone 32 and the camera unit 34 according to the sixth embodiment previously described with reference to the accompanying drawings are denoted by the same reference numerals and a similar configuration will not be explained again.

Figure 26:
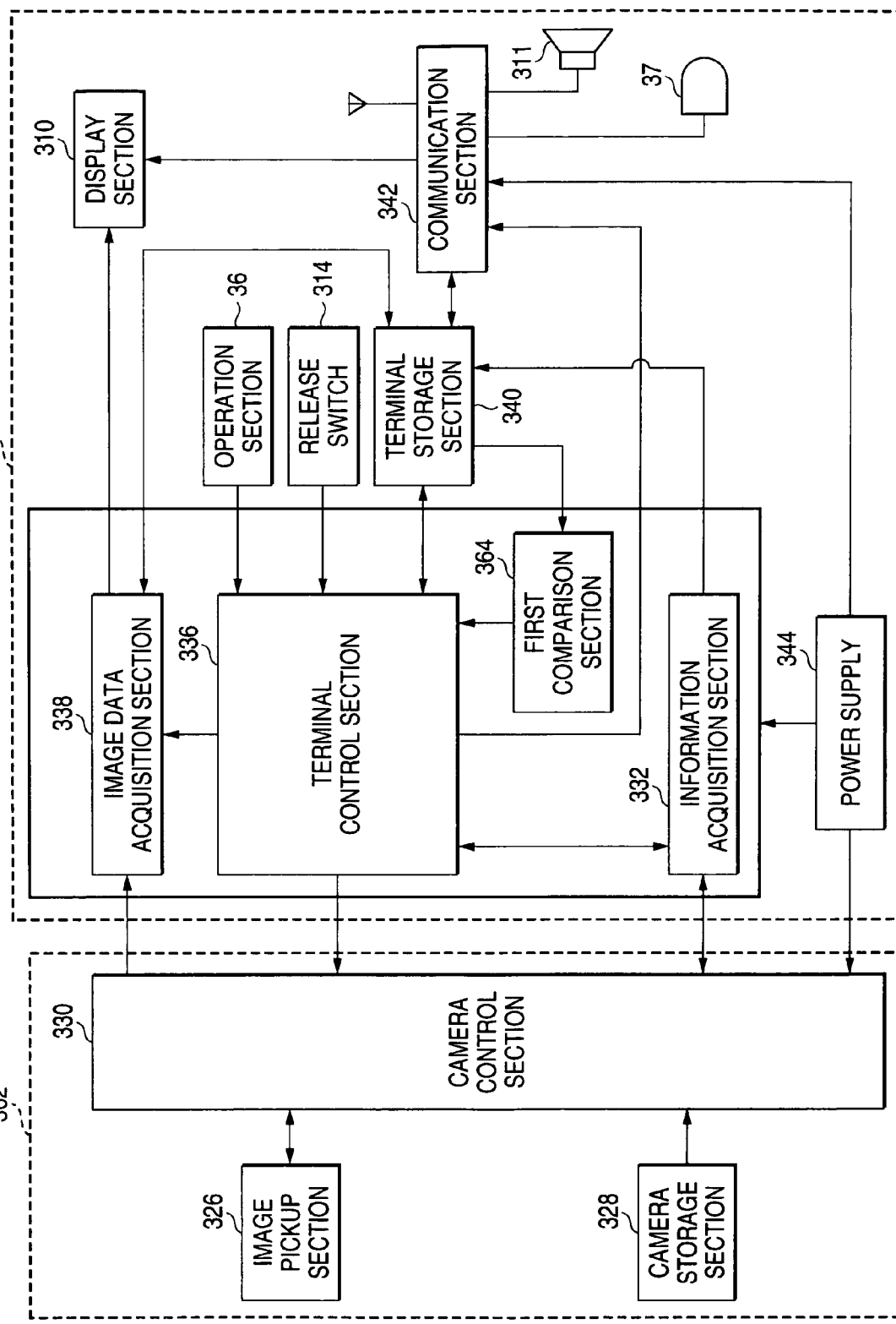
FIG. 26 is a circuit block diagram of the mobile telephone 360 and the camera unit 362 according to the eighth embodiment of the invention.

The mobile telephone 360 according to the eighth embodiment differs from the mobile telephone 32 according to the sixth embodiment in that it includes a first comparison section 364, as shown in FIG. 26.

Unlike the information acquisition section 332 in the sixth embodiment, after reading address information in a camera storage section 328 through a camera control section 330 based on an instruction from a terminal control section 336, an information acquisition section 332 in the eighth embodiment stores the address information in an address information temporary storing area 346a of a terminal storage section 340 later described with reference to FIG. 27.

Figure 27:
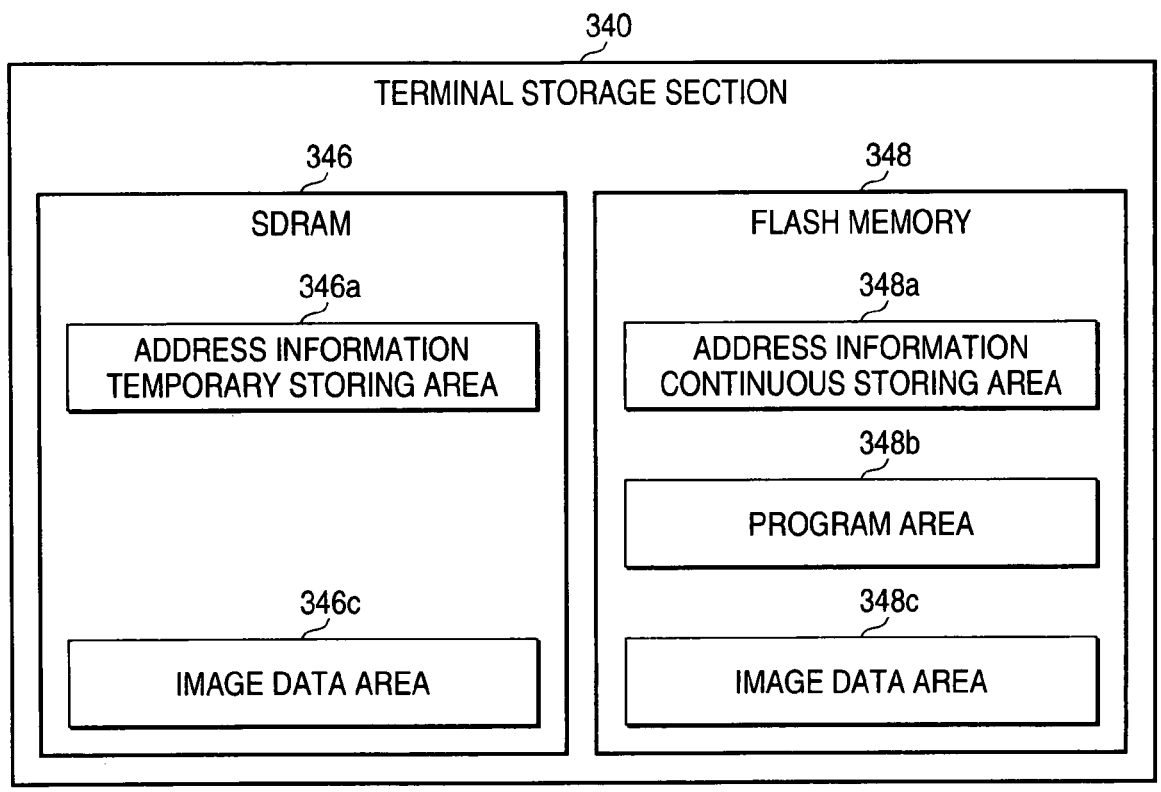
FIG. 27 is a conceptual drawing to show the configuration of a terminal storage section 340 in the eighth and tenth embodiments of the invention.

SDRAM 346 of the terminal storage section 340 is provided with the address information temporary storing area 346a in addition to an image data area 46c similar to that in the sixth embodiment, and flash memory 348 is provided with an address information continuous storing area 348a in addition to a program area 348b and an image data area 348c, as shown in FIG. 27.

The terminal storage section 340 immediately stores the address information received from the information acquisition section 332 in the address information temporary storing area 346a of the SDRAM 346 and also outputs the address information stored in the address information temporary storing area 346a and the address information stored in the address information continuous storing area 348a of the flash memory 348 to the first comparison section 364, as shown in FIG. 26.

Here, the address information stored in the address information continuous storing area 348a of the flash memory 348 is address information stored by performing the processing operation of the terminal control section 336 as described later.

Upon reception of the address information stored in the address information temporary storing area 346a of the SDRAM 346 and the address information stored in the address information continuous storing area 348a of the flash memory 348 from the terminal storage section 340, the first comparison section 364 compares them to determine whether or not they differ, and outputs the comparison result to the terminal control section 336.

Upon reception of an instruction from the terminal control section 336 as described later, the communication section 342, unlike the communication section 342 in the sixth embodiment, reads the address information stored in either the address information temporary storing area 346a of the SDRAM 346 or the address information continuous storing area 348a of the flash memory 348 shown in FIG. 27 and transmits the image data stored in the image data area 348c of the flash memory 348 (see FIG. 27) to the communication destination indicated by the address information.

Next, upon reception of the comparison result from the first comparison section 364 indicating that the address information stored in the address information temporary storing area 346a of the SDRAM 346 of the terminal storage section 340 and the address information stored in the address information continuous storing area 348a of the flash memory 348 differ, the terminal control section 336 shown in FIG. 26 instructs the communication section 342 to transmit the image data in the image data area 348c to the communication destination indicated by the address information in the address information temporary storing area 346a.

Then, the terminal control section 336 changes the address information stored in the address information continuous storing area 348a of the flash memory 348 of the terminal storage section 340 to the same as the address information stored in the address information temporary storing area 346a of the SDRAM 346 for storage (see FIG. 27).

Upon reception of the comparison result from the first comparison section 364 indicating that the address information stored in the address information temporary storing area 346a of the SDRAM 346 of the terminal storage section 340 and the address information stored in the address information continuous storing area 348a of the flash memory 348 match, the terminal control section 336 instructs the communication section 342 to transmit the image data in the image data area 348c to the communication destination indicated by the address information continuous storing area 348a.

Next, the processing operation of the terminal control section 336, etc., after the user operates operation section 36 of the mobile telephone 360 to start a camera mode will be explained based on a flowchart of FIG. 28.

Figure 28:
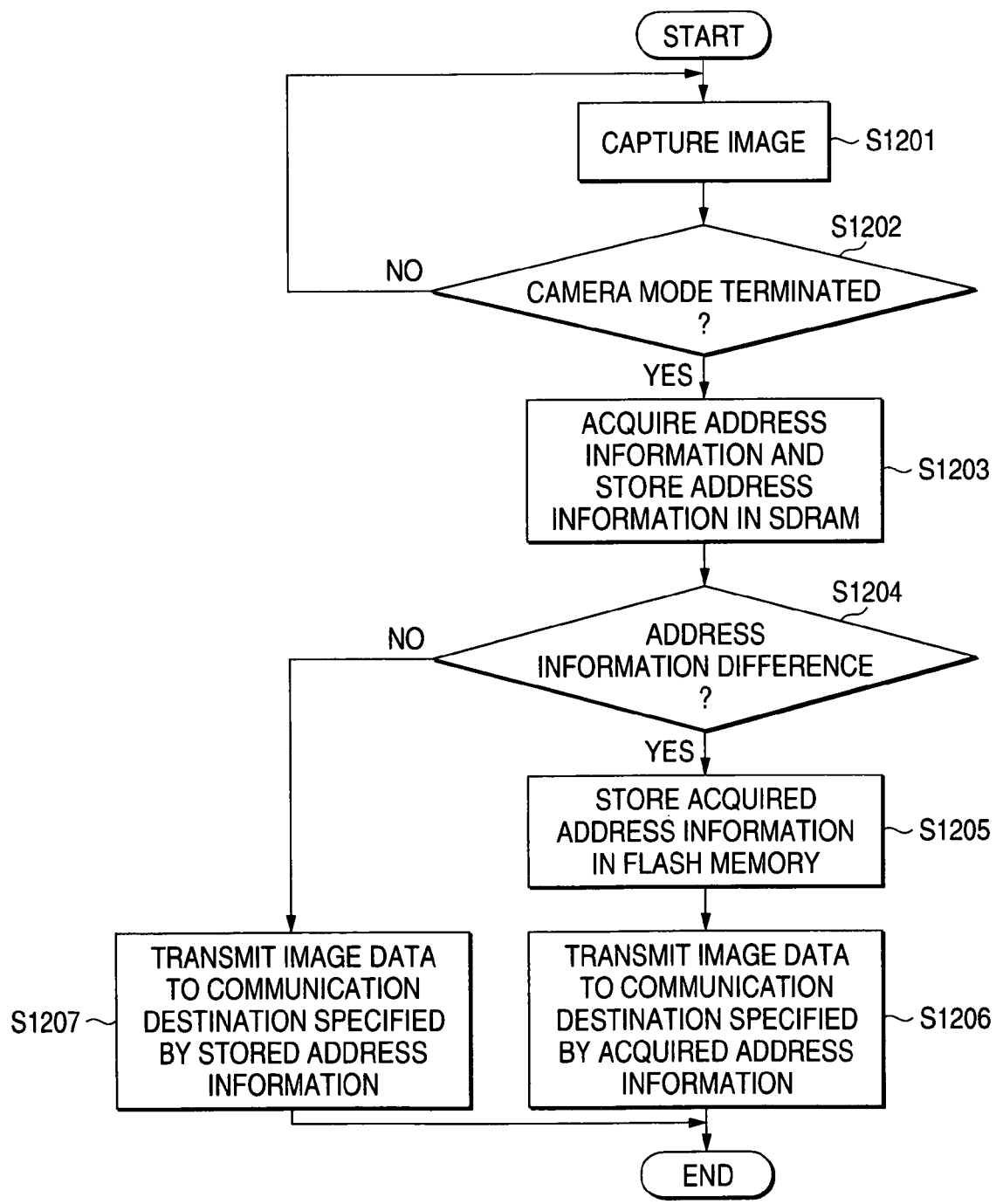
FIG. 28 is a flowchart to show an operation procedure of the mobile telephone 360 and the camera unit 362 in the eighth embodiment of the invention.

The processing operation to step S1202 after the processing operation in the flowchart of FIG. 28 is started is performed like the processing operation to step S1102 in FIG. 24 in the sixth embodiment.

When the camera mode is terminated (YES at step S1202 in FIG. 28), processing for transmitting image data is started at step S1203. At step S1203, the terminal control section 336 shown in FIG. 26 instructs an information acquisition section 332 to read the address information in the camera storage section 328 of the camera unit 362 and store the read address information in the address information temporary storing area 346a of the SDRAM 346 of the terminal storage section 340 shown in FIG. 27.

The first comparison section 364 shown in FIG. 26 makes a comparison between the address information stored in the address information temporary storing area 346a of the SDRAM 346 and the address information stored in the address information continuous storing area 348a of the flash memory 348 (see FIG. 27) (step S1204 in FIG. 28).

If they differ (YES at step S1204), the terminal control section 36 changes the address information stored in the address information continuous storing area 348a of the flash memory 348 of the terminal storage section 340 shown in FIG. 27 to the same as the address information stored in the address information temporary storing area 346a of the SDRAM 346 for storage at step S1205.

The terminal control section 336 shown in FIG. 26 instructs the communication section 342 to transmit the image data in the image data area 348c to the communication destination indicated by the address information stored in the address information temporary storing area 346a shown in FIG. 27 (step S1206 in FIG. 28).

If the address information stored in the address information temporary storing area 346a shown in FIG. 27 and the address information stored in the address information continuous storing area 348a match (NO at step S1204 in FIG. 28), the terminal control section 336 causes the communication section 342 to transmit the image data in the image data area 348c to the communication destination indicated by the address information stored in the address information continuous storing area 348a shown in FIG. 27 (step S1207 in FIG. 28).

According to the mobile telephone camera unit system and the mobile telephone 360 and the camera unit 362 used with the mobile telephone camera unit system according to the eighth embodiment, the image data obtained by the camera unit 362 is always transmitted to the communication destination indicated by the address information stored in the camera storage section 328, so that the photographed image can be prevented from leaking or dispersing against user's will as in the sixth and seventh embodiments.

For example, if the user of the owner of the camera unit 362 takes a photograph using the mobile telephone 360 owned by another person, when the user of the owner of the camera unit 362 transmits the image photographed by him or her, the user can reliably transmit the image to the communication destination indicated by the address information stored in the camera storage section 328 of the camera unit 362, so that the photographed image can be prevented from dispersing against user's will as in the sixth and seventh embodiments.

Ninth Embodiment

Next, a mobile telephone camera unit system (corresponding to terminal camera unit system) and a mobile telephone 370 (corresponding to terminal) and a camera unit 372 used with the mobile telephone camera unit system according to the ninth embodiment of the invention will be explained based on FIGS. 19 to 21 and FIGS. 29 to 31. Parts similar to those of the mobile telephone 360 and the camera unit 362 according to the eighth embodiment previously described with reference to the accompanying drawings are denoted by the same reference numerals and a similar configuration will not be explained again.

Figure 29:
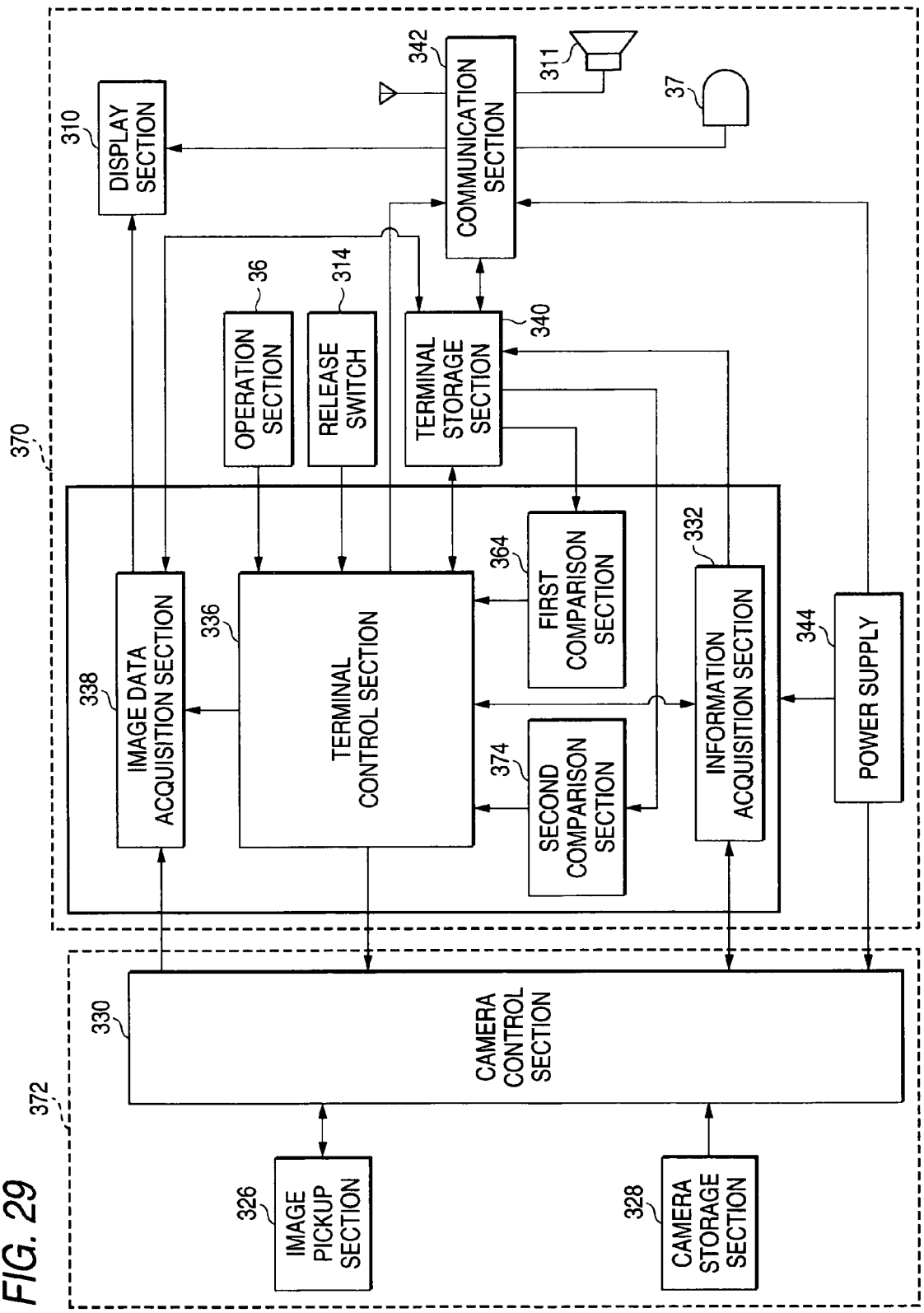
FIG. 29 is a circuit block diagram of the mobile telephone 370 and the camera unit 372 according to the ninth embodiment of the invention.

The mobile telephone 370 according to the ninth embodiment differs from the mobile telephone 360 according to the eighth embodiment in that it includes a second comparison section 374, as shown in FIG. 29.

SDRAM 346 of a terminal storage section 340 is provided with an input address temporary storing area 346d in addition to an address information temporary storing area 46a and an image data area 346c similar to those in the eighth embodiment.

The address on the network entered by the user through an operation section 36 is stored in the input address temporary storing area 346d of the SDRAM 346 by performing processing operation of a terminal control section 336 as described later.

When the address is stored in the input address temporary storing area 346d as the terminal control section 336 performs the processing operation, immediately the terminal storage section 340 outputs the address stored in the input address temporary storing area 346d and the address information stored in the address information temporary storing area 346a to the second comparison section 374 shown in FIG. 29.

Upon reception of the address stored in the input address temporary storing area 346d and the address information stored in the address information temporary storing area 346a from the terminal storage section 340, the second comparison section 374 compares them to determine whether or not they differ, and outputs the comparison result to the terminal control section 336.

Upon reception of the comparison result from the second comparison section 374 indicating that the address stored in the input address temporary storing area 346d and the address information stored in the address information temporary storing area 346a match, the terminal control section 336 instructs a communication section 342 to transmit the image data in the image data area 348c to the communication destination indicated by the address information in the address information temporary storing area 346a.

Next, the processing operation of the terminal control section 336, etc., after the user operates the operation section 36 of the mobile telephone 370 to start a camera mode will be explained based on a flowchart of FIG. 31.

Figure 31:
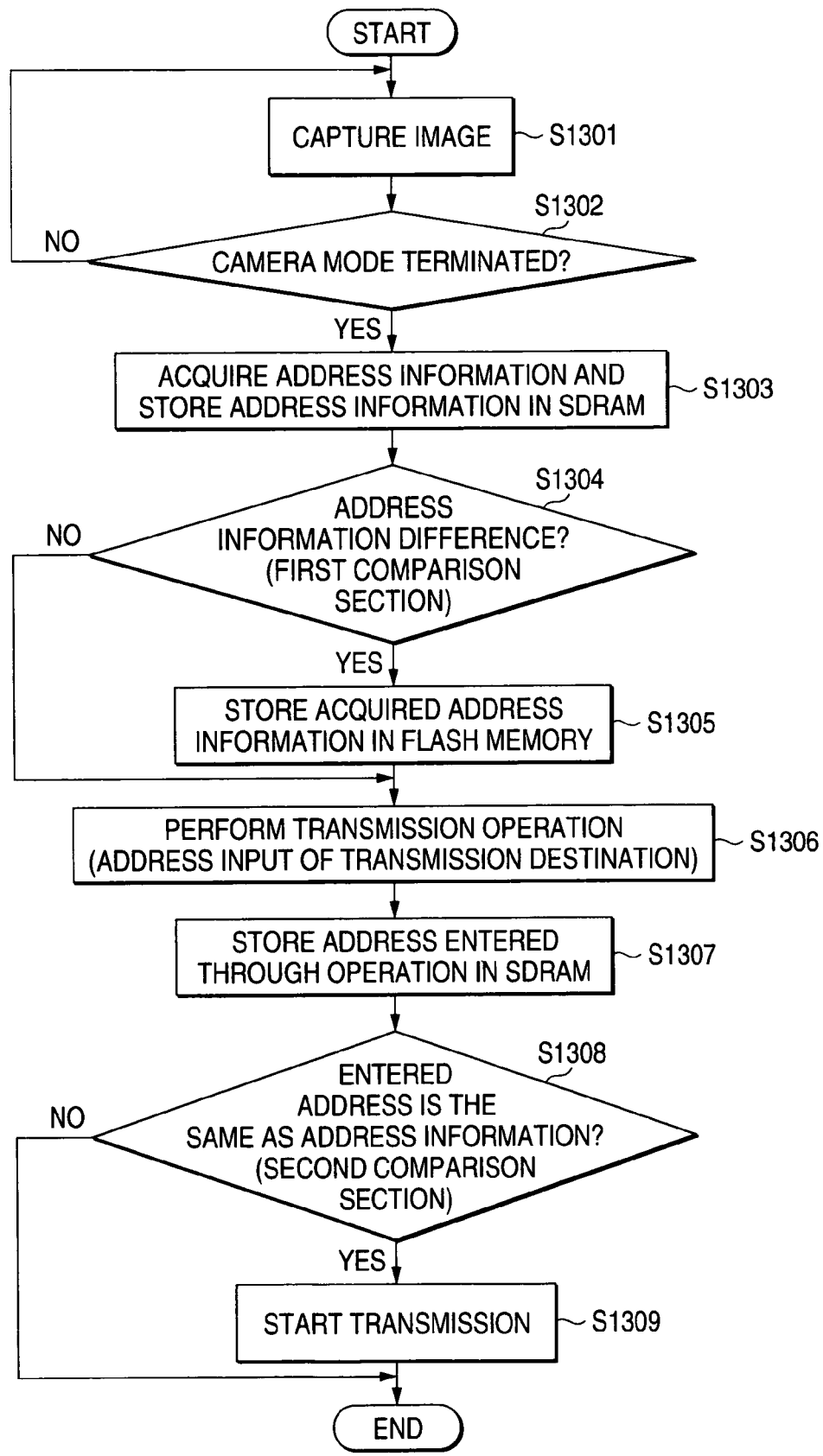
FIG. 31 is a flowchart to show an operation procedure of the mobile telephone 370 and the camera unit 372 in the ninth embodiment of the invention.

The processing operation to step S1305 after the processing operation in the flowchart of FIG. 31 is started is performed like the processing operation to step S1205 in FIG. 28 in the eighth embodiment.

If a first comparison section 364 determines that the address information stored in the address information temporary storing area 346a of the SDRAM 346 of the terminal storage section 340 and the address information stored in the address information continuous storing area 348a of the flash memory 348 match (No at step S1304 in FIG. 31), the process goes to step S1306 unlike the flow in the eighth embodiment.

At step S1306, the terminal control section 336 causes a display section 310 to display a prompt for requesting the user to enter the address of the transmission destination. If the user enters the address of the transmission destination through the operation section 36 at step S1306, the terminal control section 336 stores the address in the input address temporary storing area 346d of the SDRAM 346 of the terminal storage section 340 (see FIG. 30) (step S1307 in FIG. 31).

The second comparison section 374 shown in FIG. 29 makes a comparison between the address stored in the input address temporary storing area 346d and the address information stored in the address information temporary storing area 346a at step S1303 (step S1308 in FIG. 31). If they match (YES at S308), the terminal control section 336 causes the communication section 342 to transmit the image data in the image data area 348c to the communication destination indicated by the address information stored in the address information temporary storing area 346a shown in FIG. 30 at step S1309.

If the address stored in the input address temporary storing area 346d and the address information stored in the address information temporary storing area 346a at step S1303 differ (NO at step S1308 in FIG. 31), the terminal control section 336 does not cause the communication section 342 to transmit the image data and terminates the processing operation sequence.

According to the mobile telephone camera unit system and the mobile telephone 370 and the camera unit 372 used with the mobile telephone camera unit system according to the ninth embodiment, the image data obtained by the camera unit 372 is always transmitted to the communication destination indicated by the address information stored in the camera storage section 328, so that the photographed image can be prevented from leaking or dispersing against user's will as in the sixth to eighth embodiments.

For example, if the user of the owner of the camera unit 372 takes a photograph using the mobile telephone 370 owned by another person, when the user of the owner of the camera unit 372 transmits the image photographed by him or her, the user can reliably transmit the image to the communication destination indicated by the address information stored in the camera storage section 328 of the camera unit 372, so that the photographed image can be prevented from dispersing against user's will as in the sixth to eighth embodiments.

If a third person other than the user injuriously attaches the camera unit 372 owned by the user to the mobile telephone 370 of the third person and takes a photograph, unless the third person enters the same address as the address information retained in the camera unit 372 just before transmitting the image data with the camera mode terminated, the image data cannot be transmitted, so that transmitting the image not required for the user of the owner of the camera unit 372 can be prevented.

Tenth Embodiment

Next, a mobile telephone camera unit system (corresponding to terminal camera unit system) and a mobile telephone 380 (corresponding to terminal) and a camera unit 382 used with the mobile telephone camera unit system according to the tenth embodiment of the invention will be explained based on FIGS. 19 to 21 and FIGS. 32 and 33. Parts similar to those of the mobile telephone 360 and the camera unit 362 according to the eighth embodiment previously described with reference to the accompanying drawings are denoted by the same reference numerals and a similar configuration will not be explained again.

Figure 32:
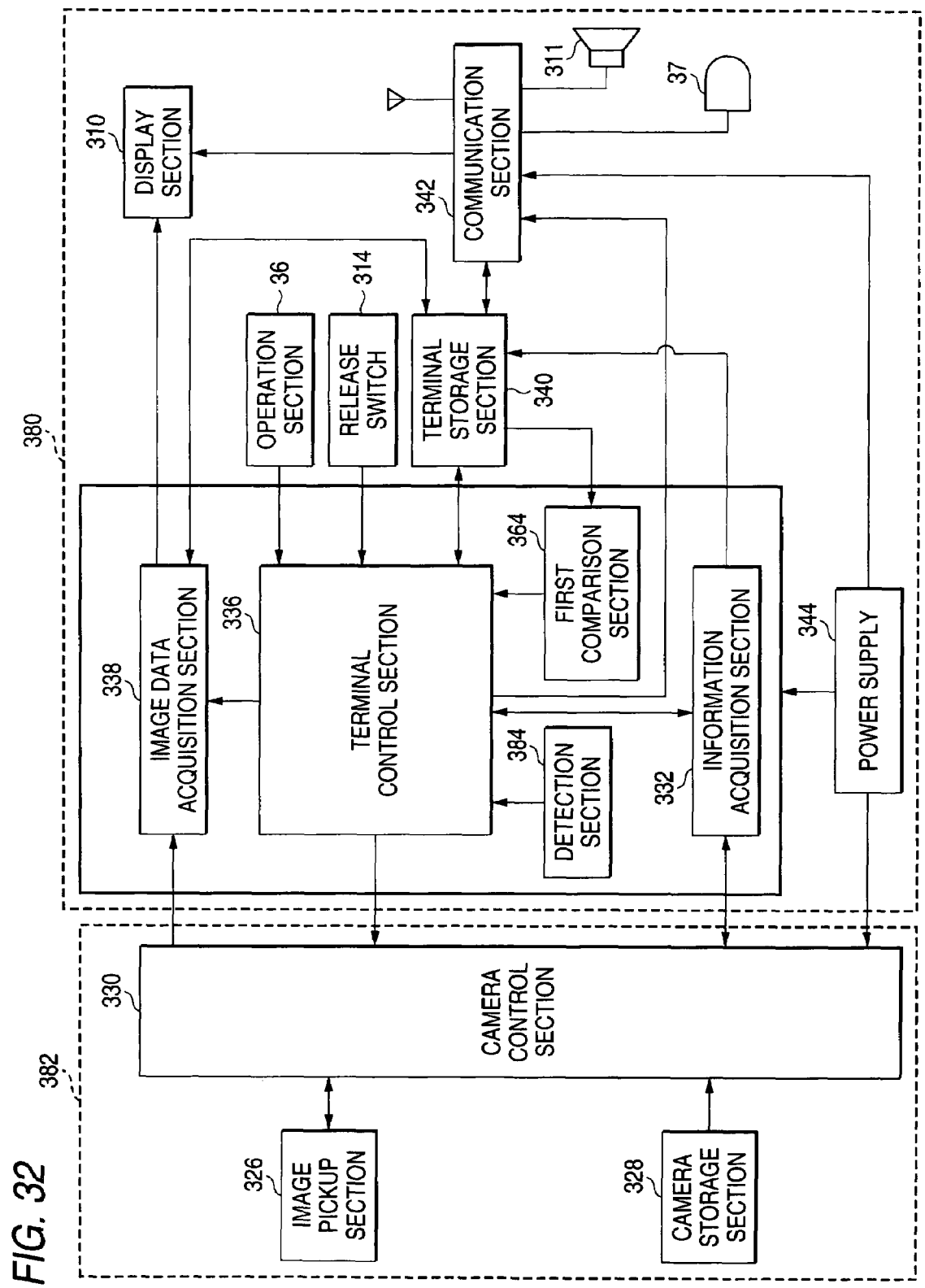
FIG. 32 is a circuit block diagram of the mobile telephone 380 and the camera unit 382 according to the tenth embodiment of the invention.

The mobile telephone 380 according to the tenth embodiment differs from the mobile telephone 360 according to the eighth embodiment in that it includes a detection section 384, as shown in FIG. 32. When the camera unit 382 is attached to a first housing 38 of the mobile telephone 380 as shown in FIG. 20 although not shown in FIG. 21, the detection section 384 detects the camera unit 382 being attached to the first housing 38 and outputs an attachment signal to the effect that the camera unit 382 has been attached to a terminal control section 336, as shown in FIG. 32. An optical sensor, a magnetic sensor, a mechanical switch, or the like can be used as the detection section 384 for performing the operation.

The terminal control section 336 in the eighth embodiment instructs the information acquisition section 332 to acquire the address information in the camera storage section 328 when the camera mode is terminated. In contrast, the terminal control section 336 in the tenth embodiment instructs the information acquisition section 332 to acquire the address information in the camera storage section 328 upon reception of the attachment signal to the effect that the camera unit 382 has been attached from the detection section 384. Thus, if the camera unit 382 is lost, another person cannot use the camera unit 382 and therefore it is considered that the camera unit 382 will be often returned to the owner of the camera unit 382.

The terminal control section 336 in the eighth embodiment causes the communication section 342 to transmit the image data after reception of the result indicating whether or not the address information stored in the address information temporary storing area 346a shown in FIG. 27 and the address information stored in the address information continuous storing area 348a differ from the first comparison section 364. In contrast, the terminal control section 336 in the tenth embodiment starts the camera mode after receiving the result from the first comparison section 364 and before causing the communication section 342 to transmit image data.

Next, the processing operation of the terminal control section 336, etc., after the camera unit 382 is attached to the mobile telephone 380 will be explained based on a flowchart of FIG. 33.

Figure 33:
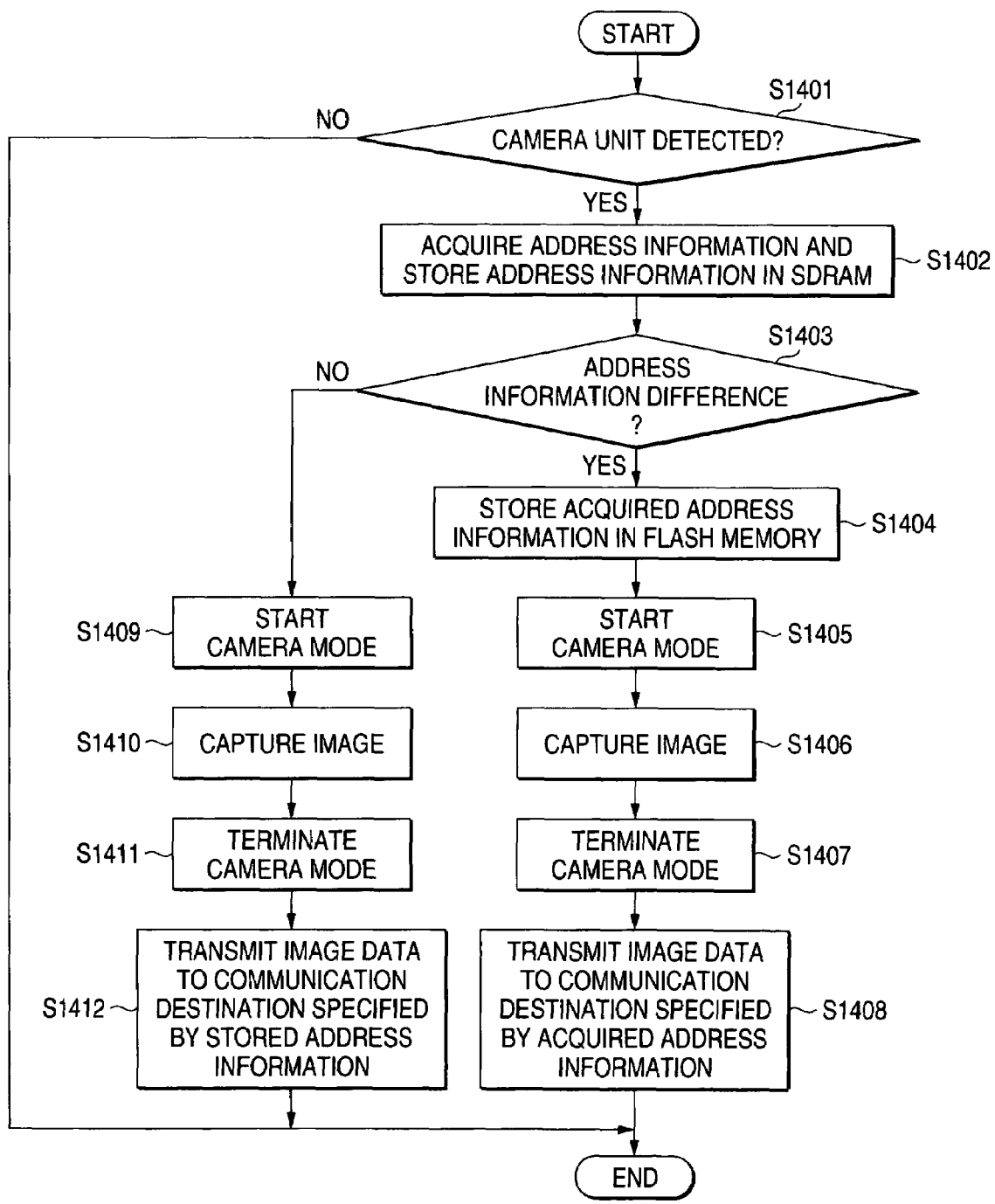
FIG. 33 is a flowchart to show an operation procedure of the mobile telephone 380 and the camera unit 382 in the tenth embodiment of the invention.

Upon reception of the attachment signal to the effect that the camera unit 382 has been attached to the mobile telephone 380 from the detection section 384 (YES at step S1401), the terminal control section 336 instructs the information acquisition section 332 to acquire the address information from the camera storage section 328 of the camera unit 382 as shown in FIG. 32 and store the acquired address information in an address information temporary storing area 346a of SDRAM 346 of terminal storage section 340 as shown in FIG. 27 (step S1402 in FIG. 33).

The first comparison section 364 shown in FIG. 32 makes a comparison between the address information stored in the address information temporary storing area 346a of the SDRAM 346 of the terminal storage section 340 shown in FIG. 27 and the address information stored in an address information continuous storing area 348a of flash memory 348 shown in FIG. 32 (step S1403 in FIG. 33).

If they differ (YES at step S1403), the terminal control section 336 changes the address information stored in the address information continuous storing area 348a of the flash memory 348 of the terminal storage section 340 to the same as the address information stored in the address information temporary storing area 346a of the SDRAM 346 for storage at step S1404 (see FIG. 27).

Then, the terminal control section 336 starts the camera mode at step S1405. The user can take a photograph during the operation in the camera mode (step S1406). When the camera mode is terminated (step S1407), the terminal control section 336 instructs the communication section 342 to transmit the image data in an image data area 348c photographed at step S1406 to the communication destination indicated by the address information stored in the address information temporary storing area 346a shown in FIG. 27 (step S1408 in FIG. 33).

If the address information stored in the address information temporary storing area 346a shown in FIG. 27 and the address information stored in the address information continuous storing area 348a match (No at step S1403 in FIG. 33), the process goes to step S1409.

At step S1409, the camera mode is automatically started as at step S1405, and the user can take a photograph (step S1410). After the operation in the camera mode is terminated at step S1411, the terminal control section 336 causes the communication section 342 to transmit the image data in the image data area 348c photographed at step S1410 to the communication destination indicated by the address information stored in the address information temporary storing area 346a shown in FIG. 27 (step S1412 in FIG. 33).

According to the mobile telephone camera unit system and the mobile telephone 380 and the camera unit 382 used with the mobile telephone camera unit system according to the tenth embodiment, the image data obtained by the camera unit 382 is always transmitted to the communication destination indicated by the address information stored in the camera storage section 328, so that the photographed image can be prevented from leaking or dispersing against user's will as in the sixth to ninth embodiments.

For example, if the user of the owner of the camera unit 382 takes a photograph using the mobile telephone 380 owned by another person, when the user of the owner of the camera unit 382 transmits the image photographed by him or her, the user can reliably transmit the image to the communication destination indicated by the address information stored in the camera storage section 328 of the camera unit 382, so that the photographed image can be prevented from dispersing against user's will as in the sixth to ninth embodiments.

If the camera unit 382 attached to the mobile telephone 380 is replaced and the address information indicating the transmission destination of the image data needs to be changed to different address information, the detection section 384 of the mobile telephone 380 detects replacement of the camera unit 382, etc., and automatically changes the address information, etc., so that it is made possible to reliably transmit the image data obtained by a specific camera unit only to a specific transmission destination.

Eleventh Embodiment

Next, a mobile telephone camera unit system (corresponding to terminal camera unit system) and a mobile telephone 390 (corresponding to terminal) and a camera unit 392 used with the mobile telephone camera unit system according to the eleventh embodiment of the invention will be explained based on FIGS. 19 to 21 and FIGS. 34 to 36. Parts similar to those of the mobile telephone 360 and the camera unit 362 according to the eighth embodiment previously described with reference to the accompanying drawings are denoted by the same reference numerals and a similar configuration will not be explained again.

Figure 34:
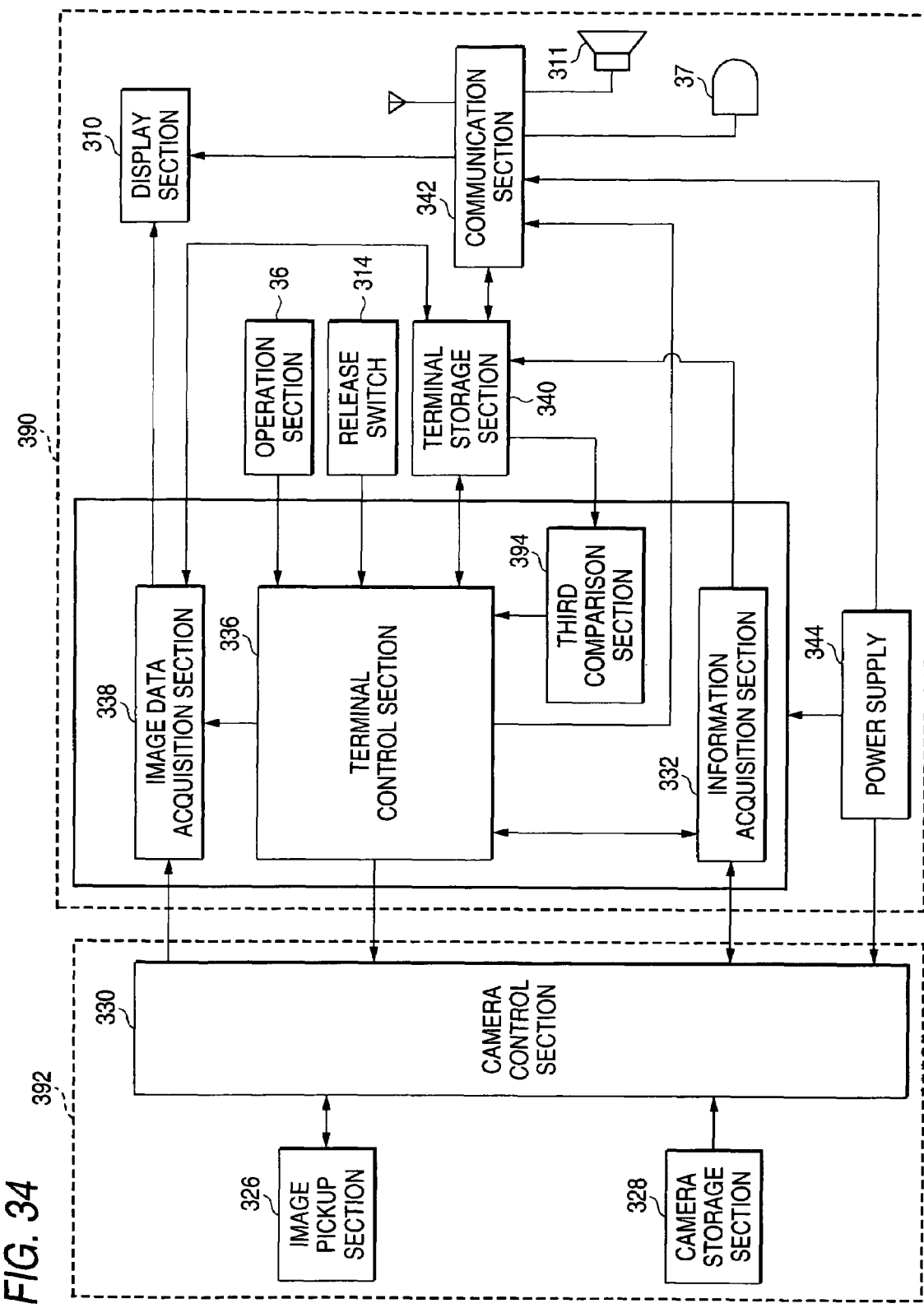
FIG. 34 is a circuit block diagram of the mobile telephone 390 and the camera unit 392 according to the eleventh embodiment of the invention.

In the camera unit 392 according to the eleventh embodiment, camera storage section 328 shown in FIG. 34 stores not only address information similar to that in the eighth embodiment, but also identification information that can be set by the user.

Figure 35:
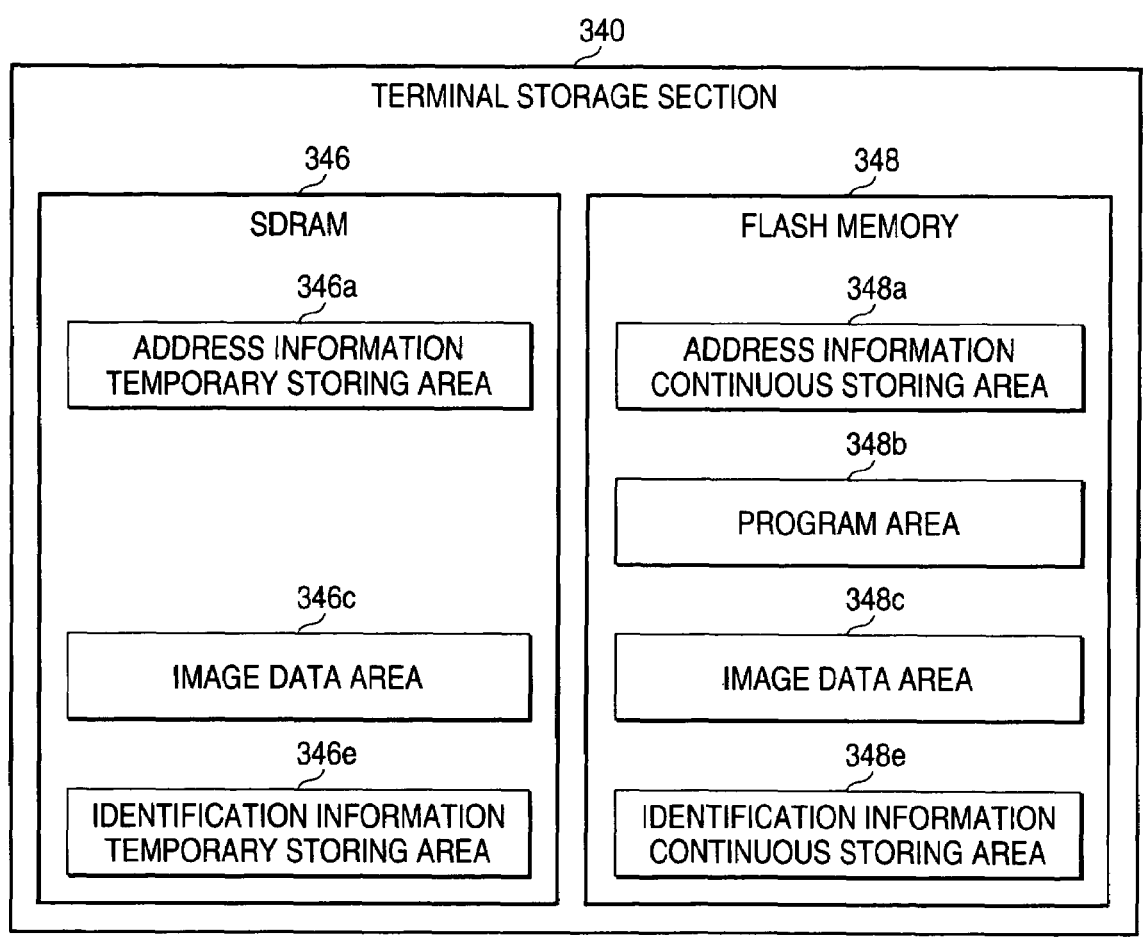
FIG. 35 is a conceptual drawing to show the configuration of a terminal storage section 340 in the eleventh embodiment of the invention.

SDRAM 346 of terminal storage section 340 of the mobile telephone 390 is provided not only with an address information temporary storing area 346a and an image data area 346c similar to those in the eighth embodiment, but also with an identification information temporary storing area 346e, as shown in FIG. 35.

Flash memory 348 is provided not only with an address information continuous storing area 348a, a program area 348b, and an image data area 348c similar to those in the eighth embodiment, but also with an identification information continuous storing area 348e.

Information acquisition section 332 shown in FIG. 34 can acquire not only the address information, but also the identification information from the camera storage section 328 of the camera unit 392, and stores the address information and the identification information in the terminal storage section 340. The identification information acquired by the information acquisition section 332 is stored in the identification information temporary storing area 346*e* of the SDRAM 346, as shown in FIG. 35.

In the eighth embodiment, the mobile telephone 360 includes the first comparison section 364 (see FIG. 26). In contrast, in the eleventh embodiment, the mobile telephone 390 includes third comparison section 394 in place of the first comparison section 364, as shown in FIG. 34. The first comparison section 364 according to the eighth embodiment makes a comparison between one piece of address information and another; while, the third comparison section 394 according to the eleventh embodiment makes a comparison between the identification information stored in the identification information temporary storing area 346*e* of the SDRAM 346 shown in FIG. 35 and the identification information stored in the identification information continuous storing area 348*e* of the flash memory 348.

The identification information stored in the identification information continuous storing area 348*e* of the flash memory 348 is stored by performing processing operation of terminal control section 336 as described later.

After a camera mode is started, if the user terminates the camera mode, the terminal control section 336 instructs the information acquisition section 332 to acquire the identification information in the camera storage section 328 of the camera unit 392.

Upon reception of the result from the third comparison section 394 indicating that the identification information stored in the identification information temporary storing area 346*e* of the SDRAM 346 shown in FIG. 35 and the identification information stored in the identification information continuous storing area 348*e* of the flash memory 348 differ, the terminal control section 336 shown in FIG. 34 instructs the information acquisition section 332 to acquire the address information in the camera storage section 328 of the camera unit 392 and also store the address information in the address information temporary storing area 346*a* of the SDRAM 346.

The address information stored in the address information continuous storing area 348*a* of the flash memory 348 and the identification information stored in the identification information continuous storing area 348*e* are changed to the same as the address information in the address information temporary storing area 346*a* of the SDRAM 346 and the identification information in the identification information temporary storing area 346*e*, respectively, for storage.

Next, the processing operation of the terminal control section 336, etc., after the user operates operation section 36 of the mobile telephone 390 to start the camera mode will be explained based on a flowchart of FIG. 36.

Figure 36:
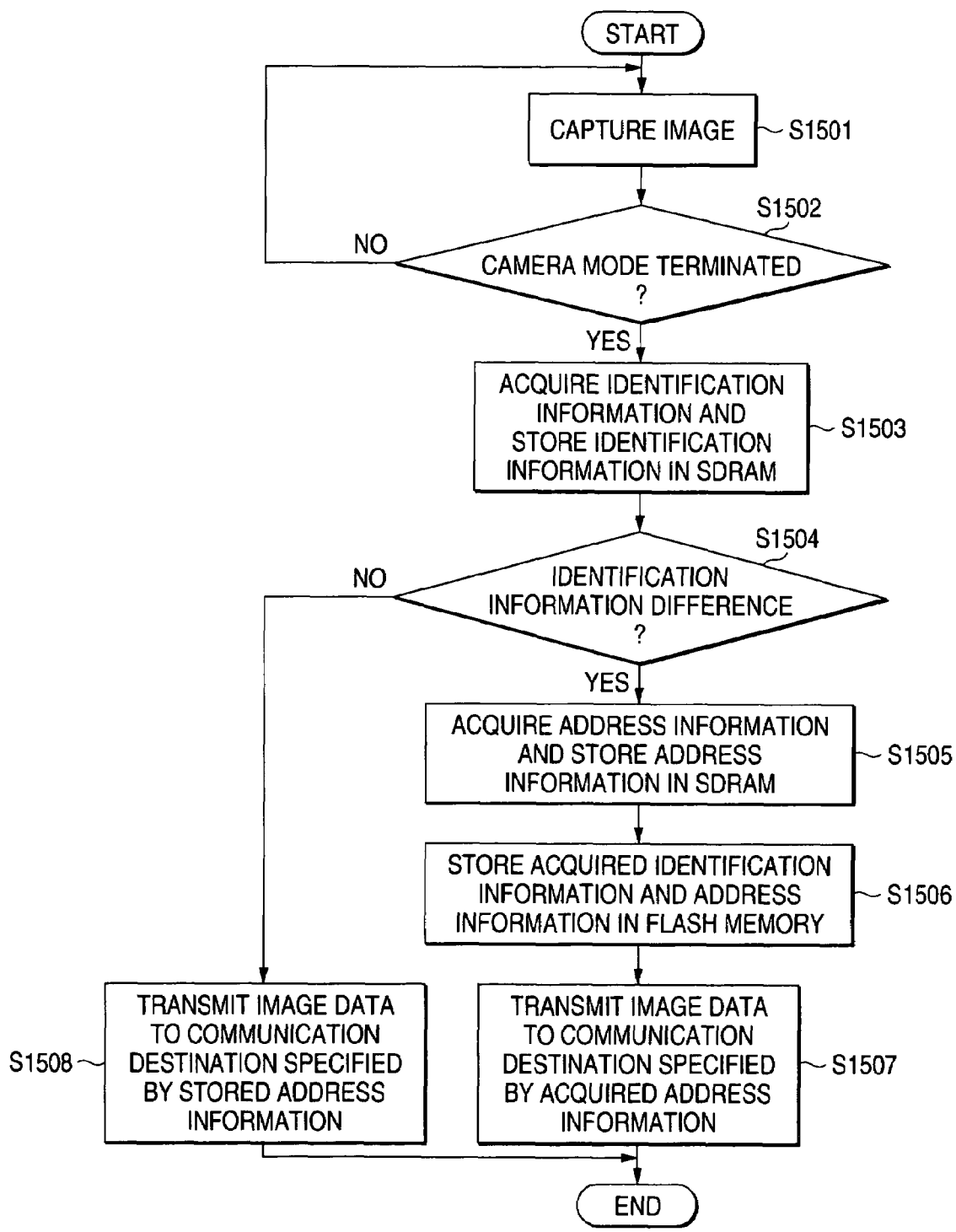
FIG. 36 is a flowchart to show an operation procedure of the mobile telephone 390 and the camera unit 392 in the eleventh embodiment of the invention.

The processing operation to step S1502 after the processing operation in the flowchart of FIG. 36 is started is performed like the processing operation to step S1202 in FIG. 28 in the eighth embodiment.

At step S1503 after the camera mode is terminated (YES at step S1502 in FIG. 36), the terminal control section 336 shown in FIG. 34 instructs the information acquisition section 332 to read the identification information in the camera storage section 328 and store the read identification information in the identification information temporary storing area 346*e* of the SDRAM 346 of the terminal storage section 340 shown in FIG. 35.

At step S1504 in FIG. 36, the terminal storage section 340 outputs the identification information stored in the identification information temporary storing area 346*e* of the SDRAM 346 and the identification information stored in the identification information continuous storing area 348*e* of the flash memory 348 to the third comparison section 394 shown in FIG. 34, and the third comparison section 394 compares them.

If they differ (YES at step S1504 in FIG. 36), at step S1505, the terminal control section 336 instructs the information acquisition section 332 to acquire the address information in the camera storage section 328 of the camera unit 392 and also store the address information in the address information temporary storing area 346*a* of the SDRAM 346.

The address information stored in the address information continuous storing area 348*a* of the flash memory 348 and the identification information stored in the identification information continuous storing area 348*e* are changed to the same as the address information in the address information temporary storing area 346*a* of the SDRAM 346 and the identification information in the identification information temporary storing area 346*e*, respectively, for storage (step S1506 in FIG. 36).

The terminal control section 336 causes the communication section 342 to transmit the image data in the image data area 348*c* to the communication destination indicated by the address information stored in the address information temporary storing area 346*a* shown in FIG. 35 (step S1507 in FIG. 36).

If the identification information stored in the identification information temporary storing area 46*e* shown in FIG. 35 and the identification information stored in the identification information continuous storing area 348*e* match (NO at step S1504 in FIG. 36), the terminal control section 336 causes the communication section 342 to transmit the image data in the image data area 348*c* to the communication destination indicated by the address information stored in the address information continuous storing area 348*a* shown in FIG. 35 (step S1508 in FIG. 36).

According to the mobile telephone camera unit system and the mobile telephone 390 and the camera unit 392 used with the mobile telephone camera unit system according to the eleventh embodiment, the image data obtained by the camera unit 392 is always transmitted to the communication destination indicated by the address information stored in the camera storage section 328, so that the photographed image can be prevented from leaking or dispersing against user's will as in the sixth to tenth embodiments.

For example, if the user of the owner of the camera unit 392 takes a photograph using the mobile telephone 390 owned by another person, when the user of the owner of the camera unit 392 transmits the image photographed by him or her, the user can reliably transmit the image to the communication destination indicated by the address information stored in the camera storage section 328 of the camera unit 392, so that the photographed image can be prevented from dispersing against user's will as in the sixth to tenth embodiments.

Twelfth Embodiment

Next, a camera unit system for monitor camera (corresponding to terminal camera unit system) and a monitor camera main body 3100 (corresponding to terminal) and a camera unit 3102 used with the camera unit system for monitor camera according to the twelfth embodiment of the invention will be explained based on FIGS. 23, 37, and 38. Parts similar to those of the mobile telephone 32 and the camera unit 34 according to the sixth embodiment previously described with reference to the accompanying drawings are denoted by the same reference numerals and a similar configuration will not be explained again.

The appearances, etc., of the monitor camera main body 3100 and the camera unit 3102 according to the twelfth embodiment are not shown; the camera unit 3102 can be attached to and detached from the monitor camera main body 3100 and can be replaced as with the mobile telephone 32 and the camera unit 34 according to the sixth embodiment. The monitor camera main body 3100 according to the twelfth embodiment can be installed in a store, a factory, a building, etc., but can also be installed in any other place.

Figure 37:
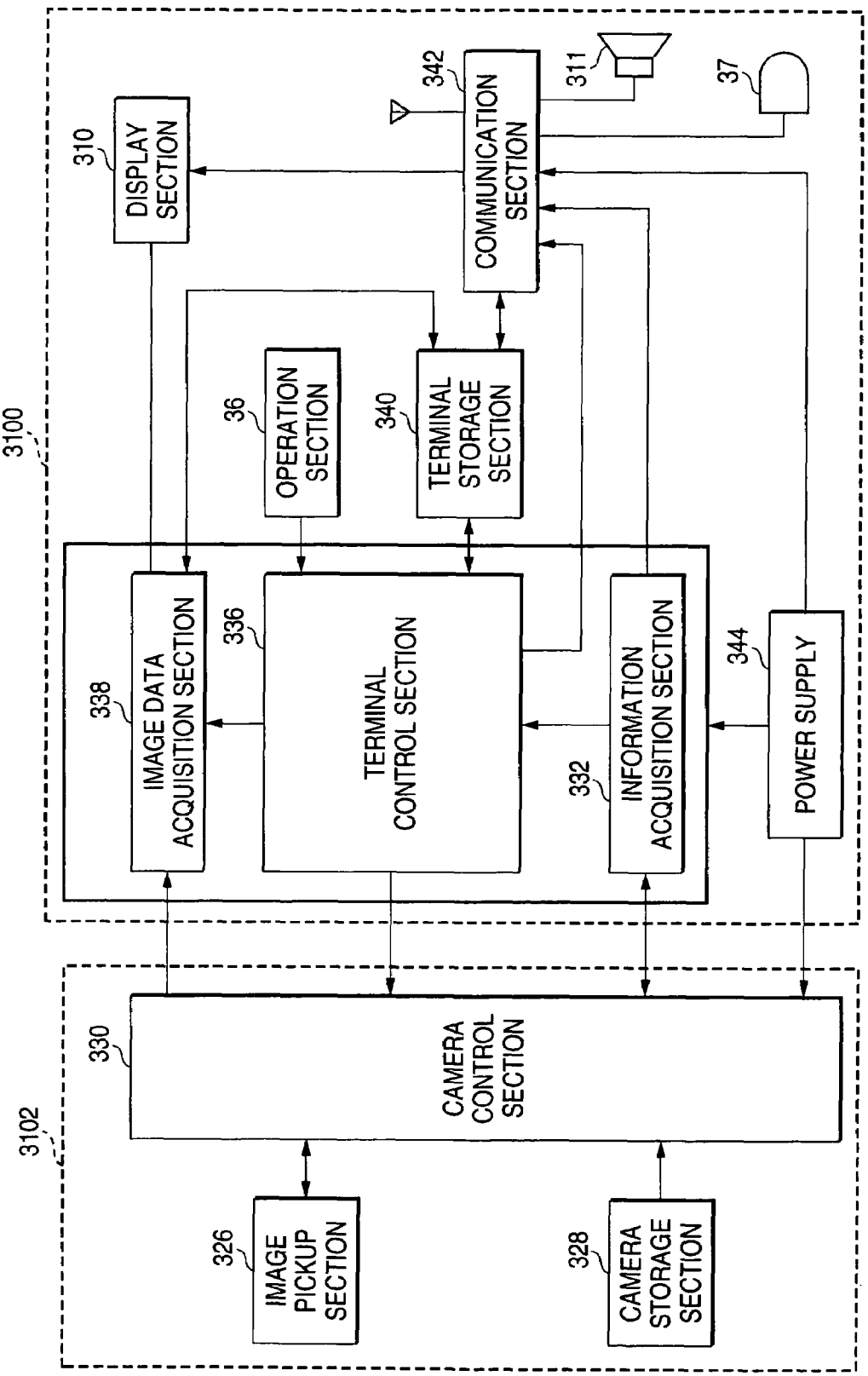
FIG. 37 is a circuit block diagram of a monitor camera main body 3100 and a camera unit 3102 according to twelfth embodiment of the invention.

The monitor camera main body 3100 according to the twelfth embodiment differs from the mobile telephone 32 according to the sixth embodiment in that it does not include the release switch 314, as shown in FIG. 37. When the camera unit 3102 is attached to the monitor camera main body 3100 for conduction of electricity with camera control section 330, information acquisition section 332 acquires address information stored in camera storage section 328.

Next, the processing operation of the terminal control section 336, etc., after the camera unit 3102 is attached to the monitor camera main body 3100 will be explained based on a flowchart of FIG. 38.

Figure 38:
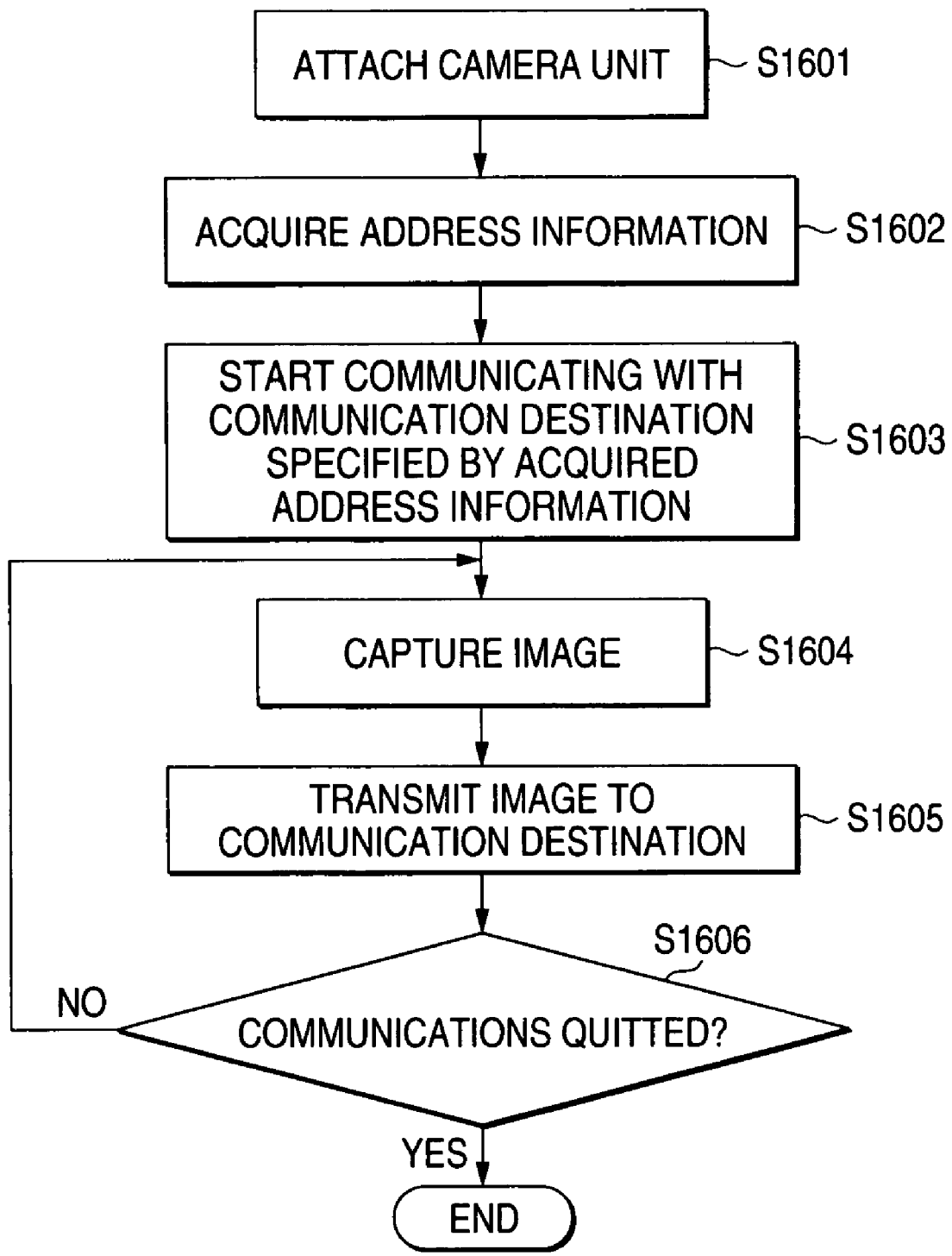
FIG. 38 is a flowchart to show an operation procedure of the monitor camera main body 3100 and the camera unit 3102 in the twelfth embodiment of the invention.

When the camera unit 3102 is attached to the monitor camera main body 3100 (step S1601), the information acquisition section 332 acquires the address information stored in the camera storage section 328 and outputs the acquired address information to the communication section 342 as shown in FIG. 37 (step S1602 in FIG. 38).

The communication section 342 starts communicating with the communication destination indicted by the address information received from the information acquisition section 332 (step S1603) and continues communicating until the user terminates the communications (YES at step S1606).

When communications are started at step S1603, the terminal control section 336 controls so as to repeat steps S604 and S605 every predetermined time until the user terminates the communications (YES at step S1606).

At step S1604, the terminal control section 336 instructs the image data acquisition section 338 to store the image data received from the camera unit 3102 or data provided by performing predetermined processing for the image data in terminal storage section 340.

Here, the image data stored in terminal storage section 340 is once stored in image data area 346c of SDRAM 346 shown in FIG. 23 and then the image data acquisition section 338 performs JPEG compression processing for the image data in the image data area 346c before storage in image data area 348c of flash memory 348 as in the sixth embodiment, as shown in FIG. 37.

The terminal control section 336 instructs the communication section 342 to transmit the image data stored in the image data area 348c of the flash memory 348 to the communication destination communicating with (step S1605 in FIG. 38).

According to the camera unit system for monitor camera and the monitor camera main body 3100 and the camera unit 3102 used with the camera unit system for monitor camera according to the embodiment, the image data obtained by the camera unit 3102 is always transmitted to the communication destination indicated by the address information stored in the camera storage section 328, so that the photographed image can be prevented from leaking or dispersing against user's will as in the sixth to eleventh embodiments.

In the tenth embodiment described above, the acquired address information is compared at steps S1402 and S1403 in the flowchart of FIG. 33, but the identification information may be compared as in the eleventh embodiment described above.

In such a case, third comparison section is provided in place of the first comparison section 364 shown in FIG. 32 and the terminal storage section 340 is provided with identification information temporary storing area 346e and identification information continuous storing area 348e. Steps S1505 and S1506 shown in FIG. 36 are executed in place of step S1404 in the flowchart of FIG. 33.

In the tenth embodiment described above, the image data is transmitted at step S1408 just after the camera mode is terminated at step S1407 in the flowchart of FIG. 33, but steps S1306 to S1309 in FIG. 31 as in the ninth embodiment may be executed in place of the step S1408.

That is, the image data may be transmitted only if the address entered by the user matches the address information stored in the address information temporary storing area 346a of the SDRAM 346 of the terminal storage section 340.

Figure 30:
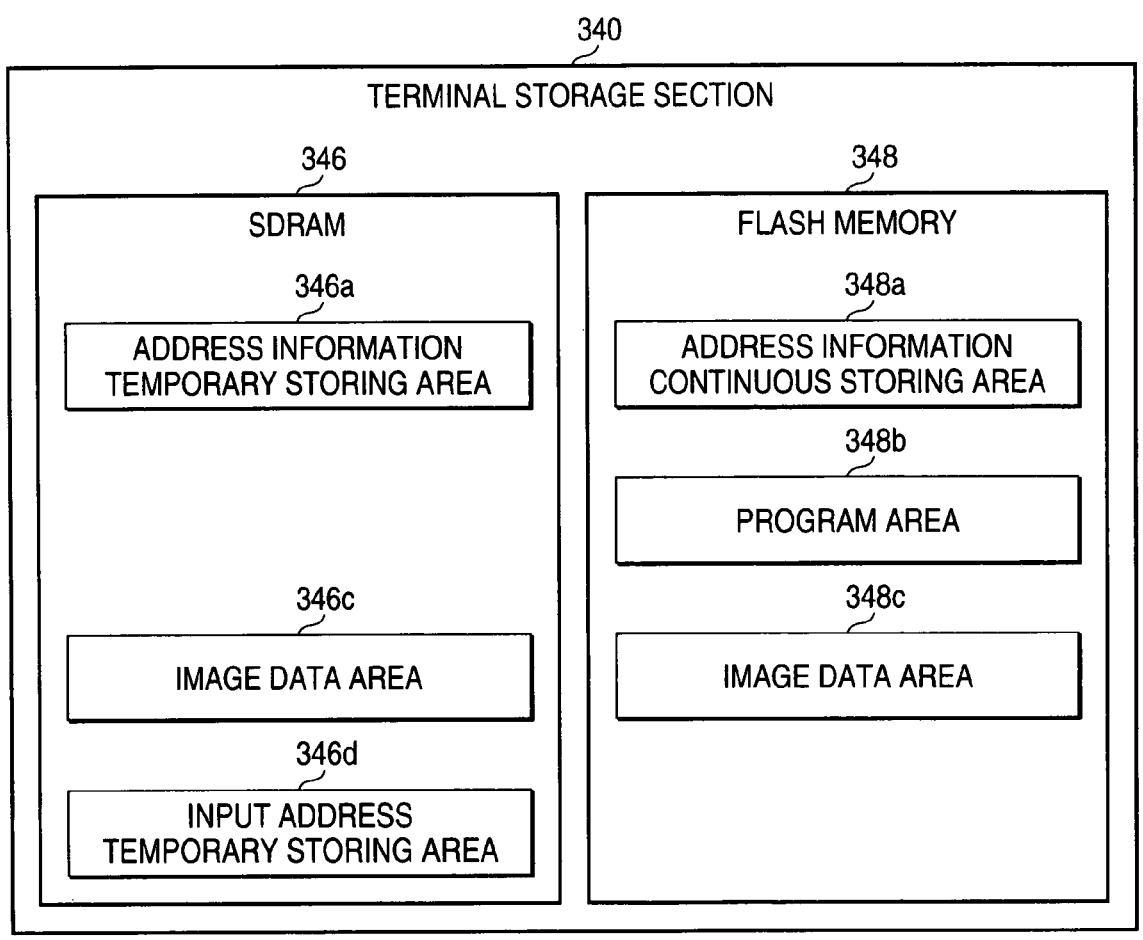
FIG. 30 is a conceptual drawing to show the configuration of a terminal storage section 340 in the ninth embodiment of the invention.

To execute steps S1306 to S1309 in FIG. 31 as in the ninth embodiment, second comparison section 374 similar to the second comparison section 374 in the ninth embodiment (see FIG. 29) is provided and the terminal storage section 340 is provided with the input address temporary storing area 346d (see FIG. 30).

In the eleventh embodiment described above, if the identification information differs (YES at step S1504) in the flowchart of FIG. 36, the image data is transmitted at the later step S1507, but steps S1306 to S1309 in FIG. 31 in the ninth embodiment may be executed in place of the step S1507.

That is, the image data may be transmitted only if the address entered by the user matches the address information stored in the address information temporary storing area 346a of the SDRAM 346 of the terminal storage section 340.

To execute steps S1306 to S1309 in FIG. 31 as in the ninth embodiment, second comparison section 374 similar to the second comparison section 374 in the ninth embodiment (see FIG. 29) is provided and the terminal storage section 340 is provided with the input address temporary storing area 346d (see FIG. 30).

In the twelfth embodiment described above, at steps S1601 and S1602 in the flowchart of FIG. 38, when the camera unit 3102 is attached to the monitor camera main body 3100 for conduction of electricity with the camera control section 330, the information acquisition section 332 acquires the address information stored in the camera storage section 328. However, the monitor camera main body 3100 may be provided with detection section 384 similar to the detection section 384 in the tenth embodiment and attachment of the camera unit 3102 is detected, the information acquisition section 332 may acquire the address information based on the detection.

In the twelfth embodiment described above, the information acquisition section 332 outputs the acquired address information to the communication section 342 as shown in FIG. 37. However, first comparison section 364 may be provided and the terminal storage section 340 may have address information temporary storing area 346a and address information continuous storing area 348a and the address information acquired by the information acquisition section 332 may be stored in the address information temporary storing area 346a.

In such a case, the acquired address information can be stored in the address information temporary storing area 346a at step S1602 in the flowchart of FIG. 38 and address information comparison as at step S1204 in FIG. 28 in the eighth embodiment described above can be executed just after the step S1602.

In the comparison, if the address information stored in the address information temporary storing area 346a and the address information stored in the address information continuous storing area 348a differ, communications with the communication destination indicated by the address information acquired at step S1602 can be started as at step S1603; if they match, communications with the communication destination indicated by the address information stored in the address information continuous storing area 348a can be started and the process can go to step S1604.

Comparison can be made to see if the address information differs as at step S1204 in the eighth embodiment described above just after step S1602 in FIG. 38 in the twelfth embodiment described above; instead, identification information may be compared as in the eleventh embodiment described above.

In the tenth embodiment, etc., described above, by way of example, the mobile telephone 380 of the terminal camera unit system of the invention is provided with the detection section 384 for detecting attachment of the camera unit 382. However, the invention is not limited to it. For example, the camera unit 382 may be provided with similar detection section for sending the detection result directly to the mobile telephone 380 or detection section for once sending the detection result to the camera unit 382, which then sends the detection result to the mobile telephone 380.

Further, when the camera unit 382 is attached to the mobile telephone 380, as the camera unit 82 receives power supply from the power supply 344 and is energized, the camera control section 330 (which may be a microcomputer, etc., for example) of the camera unit 382 may notify the terminal control section 336 that the camera unit 382 is attached to the mobile telephone 380 through a communication pass or a port.

In the tenth embodiment, etc., described above, when the camera unit 382 is attached to the mobile telephone 380, the detection section 384 detects attachment of the camera unit 382 and the processing operation shown in the flowchart of FIG. 33 is performed. However, when power of the mobile telephone 380 is turned on, the processing operation starting at step S1401 in the flowchart may be performed.

In the sixth to ninth and eleventh embodiments, etc., described above, the detection section 384 similar to the detection section 384 in the tenth embodiment may be provided and when the user starts the camera mode, the detection section 384 may detect whether or not the camera unit 34, 352, 362, 372, 392 is attached.

In the seventh to eleventh embodiments, etc., described above, by way of example, the mobile telephone 350, 360, 370, 380, 390 of the terminal camera unit system of the invention retains the address information in the address information temporary storing area 346a of the volatile SDRAM 346 of the terminal storage section 340, but the invention is not limited to it. The address information may be retained in nonvolatile memory. For example, the address information may be retained in a storage section only for storing the address information provided uniquely in the mobile telephone 350, 360, 370, 380, 390 or a storage medium such as a memory card that can be attached to and detached from the terminal.

In the sixth to twelfth embodiments, etc., described above, by way of example, the terminal camera unit system of the invention acquires the address information from the camera storage section 328 through the camera control section 330 or the information output section 330a by the information acquisition section 332 of the mobile telephone 32, 350, 360, 370, 380, 390, the monitor camera main body 3100 as shown in FIGS. 22, 25, 26, 29, 32, 34, and 37, but the invention is not limited to it.

For example, the camera unit 34, 362, 372, 382, 392, 3102 may include only the image pickup control section 330b and the image processing section 330c in the seventh embodiment described above as shown in FIG. 25 in place of the camera control section 330 and the information acquisition section 332 of the mobile telephone 32, 360, 370, 380, 390, the monitor camera main body 3100 may acquire the address information directly from the camera storage section 328 of the camera unit 34, 362, 372, 382, 392, 3102 or the camera storage section 328 may directly provide the information acquisition section 332 with the address information.

Alternatively, the address information may be sent from the camera storage section 328 of the camera unit 34, 362, 372, 382, 392, 3102 indirectly to the information acquisition section 332 through the camera control section 330. The information acquisition section 332, the terminal storage section 340, the first comparison section 364, the second comparison section 374, and the third comparison section 394 may be implemented as a microcomputer, etc., integral with the terminal control section 336.

In the sixth to eighth and twelfth embodiments described above, by way of example, in the terminal camera unit system of the invention, the image data acquisition section 338 is provided in the mobile telephone 32, 360, 370, 380, 390, the monitor camera main body 3100 and the camera control section 330 is provided in the camera unit 34, 362, 372, 382, 392, 3102, but the invention is not limited to it. The image data acquisition section 338 may be placed in the camera unit 34, 362, 372, 382, 392, 3102; in addition, only the image pickup section 326 and the camera storage section 328 may be placed in the camera unit 34, 362, 372, 382, 392, 3102 and the camera control section 330 may be placed in the mobile telephone 32, 360, 370, 380, 390, the monitor camera main body 3100.

In the sixth to twelfth embodiments described above, the terminals used with the terminal camera unit system of the invention are the mobile telephones 32, 360, 370, 380, and 390 and the monitor camera main body 3100. However, the terminals that can be used with the terminal camera unit system of the invention are not limited to the mobile telephone 32, 360, 370, 380, 390, the monitor camera main body 3100.

What is claimed is:

1. A camera unit system comprising a camera unit and a terminal to which the camera unit enables to be attached,
  wherein the camera unit includes:
  an image pickup section; and
  a camera storage section for storing a first address information specifying a predetermined communication destination, and
  the terminal includes:
  a communication section;
  an information acquisition section for acquiring the first address information from the camera storage section; and
  a terminal storage section for storing a second address information, and
  wherein if the second address information stored in the terminal storage section is different from the first address information acquired by the information acquisition section, the communication section of the terminal performs a communication processing with the communication destination indicated by the first address information acquired by the information acquisition section.

2. The camera unit system according to claim 1, wherein
the terminal includes a comparison section for comparing the second address information stored in the terminal storage section with the first address information acquired by the information acquisition section.

3. The camera unit system according to claim 1,
wherein the terminal further includes a control section for controlling the camera unit,
the communication section acquires a program or data for controlling the camera unit by performing a communication processing with the first communication destination indicated by the address information acquired by the information acquisition section, and
the control section controls the camera unit based on the acquired program or data.

4. The camera unit system according to claim 1,
wherein the terminal further includes a detection section for detecting attachment of the camera unit, and
if the detection section detects attachment of the camera unit, if power of the terminal is turned on, or if a processing for transmitting the image data is started, the terminal determines whether or not the address information or the identification information stored in the terminal storage section is different from the address information or the identification information acquired by the information acquisition section.

5. A terminal to which a camera unit enables to be attached for a camera unit system comprising the camera unit and the terminal to which the camera unit enables to be attached, comprising:
a communication section;
an information acquisition section for acquiring a first address information specifying a predetermined communication destination stored in the camera unit; and
a terminal storage section for storing a second address information, and
wherein if the second address information stored in the terminal storage section is different from the first address information acquired by the information acquisition section, the communication section of the terminal performs a communication processing with the communication destination indicated by the first address information acquired by the information acquisition section.

6. The terminal according to claim 5,
further comprising,
a comparison section for comparing the second address information stored in the terminal storage section with the first address information acquired by the information acquisition section.

7. The terminal according to claim 5, further comprising a control section for controlling the camera unit,
wherein the communication section acquires a program or data for controlling the camera unit by performing a communication processing with the first communication destination indicated by the address information acquired by the information acquisition section, and
the control section controls the camera unit based on the acquired program or data.

8. The terminal according to claim 5, further comprising a detection section for detecting attachment of the camera unit,
wherein if the detection section detects attachment of the camera unit, if power of the terminal is turned on, or if a processing for transmitting the image data is started, the terminal determines whether or not the second address information or the identification information stored in the terminal storage section is different from the first address information or the identification information acquired by the information acquisition section.

* * * * *